US007085739B1

(12) United States Patent
Winter et al.

(10) Patent No.: US 7,085,739 B1
(45) Date of Patent: Aug. 1, 2006

(54) METHOD AND SYSTEM FOR FACILITATING, COORDINATING AND MANAGING A COMPETITIVE MARKETPLACE

(75) Inventors: Larry A. Winter, Chandler, AZ (US); Francis X. Shields, Media, PA (US); Robert L. Northcutt, Phoenix, AZ (US)

(73) Assignee: Accenture LLP, Chicago, IL (US)

( * ) Notice: Subject to any disclaimer, the term of this patent is extended or adjusted under 35 U.S.C. 154(b) by 0 days.

(21) Appl. No.: 09/421,713

(22) Filed: Oct. 20, 1999

(51) Int. Cl.
*G06F 17/60* (2006.01)
*H04K 1/00* (2006.01)

(52) U.S. Cl. .............................. 705/37; 705/1; 705/26; 705/27; 705/37; 705/80; 235/378

(58) Field of Classification Search .................. 705/1, 705/26–28, 35–40, 80; 235/378
See application file for complete search history.

(56) References Cited

U.S. PATENT DOCUMENTS

| | | | | |
|---|---|---|---|---|
| 5,710,887 A | * | 1/1998 | Chelliah et al. ............. | 395/226 |
| 5,794,212 A | * | 8/1998 | Mistr, Jr. ...................... | 705/26 |
| 5,794,219 A | * | 8/1998 | Brown .......................... | 705/37 |
| 5,873,071 A | * | 2/1999 | Ferstenberg et al. .......... | 705/37 |
| 6,047,274 A | * | 4/2000 | Johnson et al. .............. | 705/412 |
| 6,115,698 A | * | 9/2000 | Tuck et al. .................... | 705/37 |
| 6,285,989 B1 | * | 9/2001 | Shoham ........................ | 705/37 |
| 6,321,212 B1 | * | 11/2001 | Lange .......................... | 705/37 |
| 6,343,277 B1 | * | 1/2002 | Gaus et al. .................... | 705/37 |

OTHER PUBLICATIONS

Jack Ellis, Automated Power Exchange (APX) Announces Contract to Provide Automated Interface Between Scheduling Coordinators and California ISO, Oct. 22, 1997, APX, Press Release□□www.energy- exchange.com/pressinfo/z_apx_signs_with_iso.htm.*

Jack Ellis, Automated Power Exchange (APX) Opens Electricity Markets with 35 Signed Participants, Mar. 31, 1998, APX, Press Release□□www.energy-exchange.com/pressinfo/z_apx_opens.htm.*

Jack Ellis, Automated Power Exchange (APX) Participation in the APX California Markets, Apr. 22, 1998, APX, Press Release□□www.energy-exchange.com/pressinfo/z_avizta_announces_participation.htm.*

Web site"www.energy-exchange.com" located at the "www.archive.org" realting to practices and operations of the APX, www.archive.org,Dec. 4, 1998, all the pages.*

CellNet Data Systems, Web Site, Apr. 23, 1998, http://web.archive.org/web/19980506185806/www.cellnet.com/default.htm.*

Samuel C. Thomas,"An East Coast View: The right price for PJM", Oct. 1, 1997, Public Utilities Fortnight, v135n18, p. 40-44.*

"Nortel (Nortel Networks) to Offer Innovative Energy Management applications for Utilities TeCom and Whisper to Provide Key Enabling Products and Technologies", http//www.teco.net/tecom/INNwsNortelUtil.html, updated Jan. 25, 2000, pp. 1-3.

* cited by examiner

*Primary Examiner*—Kambiz Abdi
(74) *Attorney, Agent, or Firm*—Brinks Hofer Gilson & Lione

(57) ABSTRACT

A system and method for facilitating, coordinating and managing the operation of a competitive marketplace via the Internet. The system and method collect bids for market services from a plurality of customers, calculators a clearing piece for the market service and calculates settlement information based on the clearing piece calculated and the bids collected.

41 Claims, 81 Drawing Sheets

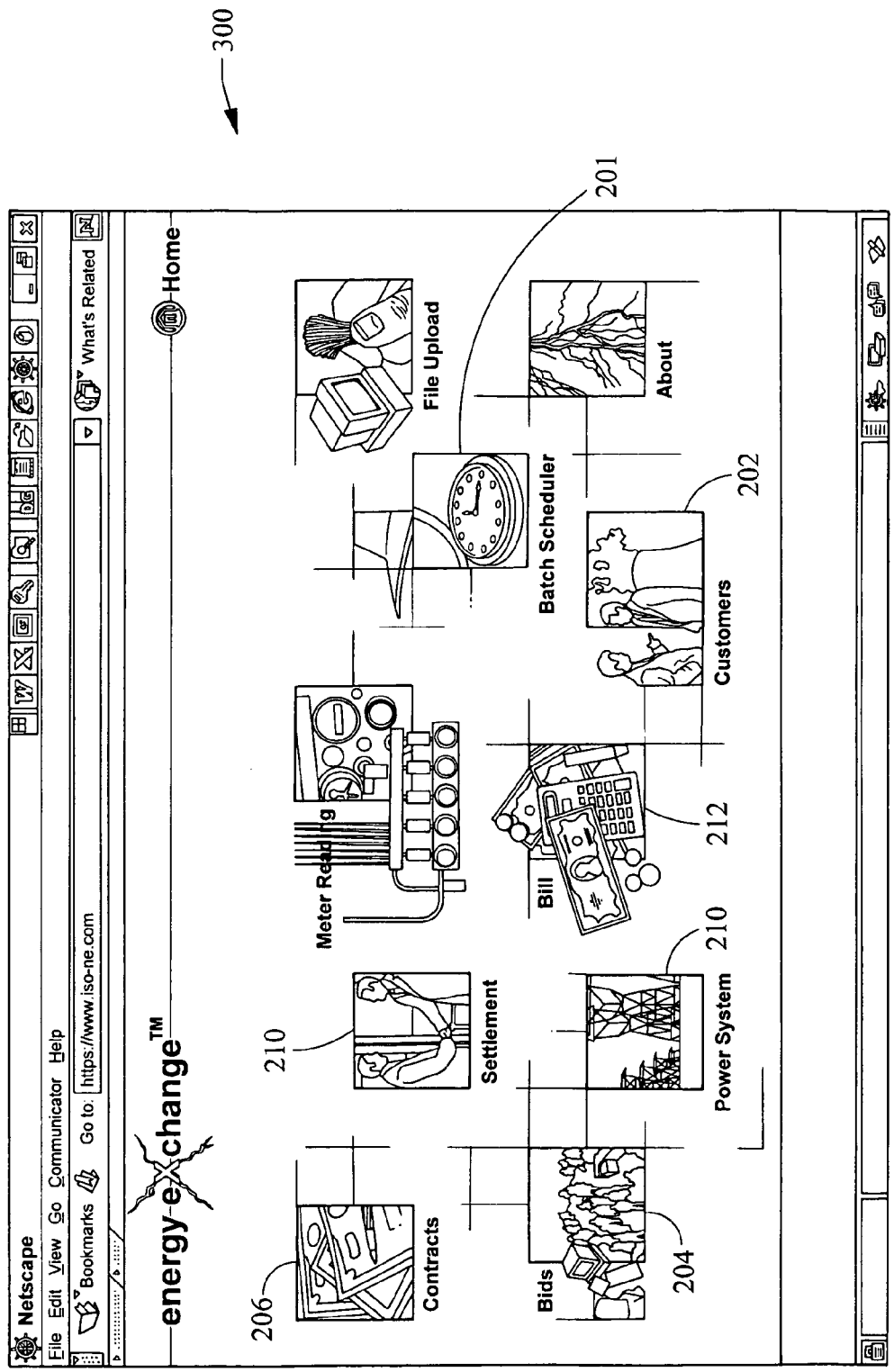
Fig. 4 - Home page as seen in Netscape browser energy-exchange™

Bid Information | Energy | AGC | Reserve | Capability | Resource Characteristics | Maintenance

Participant: Cadillac Gen Co.

Current Date: Nov 10, 1998

Bid Submission Deadlines

| | | Date Range |
|---|---|---|
| Energy Market | 12:00 | Nov 12, 1998 - Nov 21, 1998 |
| AGC Market | 12:00 | Nov 12, 1998 - Nov 21, 1998 |
| Reserve market | 12:00 | Nov 12, 1998 - Nov 21, 1998 |
| Operable Capability Market | 12:00 | Dec 1, 1998 - Sep 1, 1999 |
| Installed Capability Market | 12:00 | Nov 12, 1998 - Nov 21, 1998 |
| Resource Characteristics | 12:00 | Nov 12, 1998 - Nov 21, 1998 |

1. Enter Customer Search Criteria
- ● Customer ID  *
- ○ Customer Name
- As of: 11/10/1998

2. Find

3. Select Customer

| Identifier | Name |
|---|---|
| 903 | Cadillac Gen Co. |
| 904 | Mustang Retail Co. |
| 905 | Rolls Royce Utility |

OK

Contracts | File Upload | Meter Readings | Bids | Bill
Batch Scheduler | Settlement | Power System | Customers | About

| Hr End | SS | LOL | HOL | | MW | | Total |
|---|---|---|---|---|---|---|---|
| 0100 | 0 | 60 | 534 | 100 | 15.0 | 434 | 534 |
| 0200 | 0 | 60 | 534 | | 15.0 | 25.0 | |
| 0300 | 0 | 60 | 534 | | 15.0 | 25.0 | |
| 0400 | 0 | 60 | 534 | | 15.0 | 25.0 | |
| 0500 | 0 | 60 | 534 | | 15.0 | 25.0 | |
| 0600 | 0 | 60 | 534 | | 15.0 | 25.0 | |
| 0700 | 0 | 60 | 534 | | 15.0 | 25.0 | |
| 0800 | 0 | 60 | 534 | | 15.0 | 25.0 | |
| 0900 | 0 | 60 | 534 | | 15.0 | 25.0 | |
| 1000 | 0 | 60 | 534 | | 15.0 | 25.0 | |

Enter Normal bid for Cadillac Gen Co., AVALANCHE GAS Unit for Nov. 12, 1998

701 702 703

Claimed Low Limit (MW) 60.0    Seasonal Claimed Capability (MW) 534.0

Netscape

File Edit View Go Communicator Help

Bookmarks | Go to: https://www.iso-ne.com | What's Related energy-eXchange™

Contracts — Home

| New | Search | Result | Helper |

1. Select Contract Type
- ○ Internal
- ⊙ External
- ○ Unit
- ○ System w/ Unit Char.
- ⊙ System     □ Firm

2. Select Market Product(s)
- □ ICAP
- ☑ Energy 1 (sold out of Op. Reserve & no OpCap)
- □ Energy 2 (not sold out of Op. Reserve & w/ OpCap)

3. Specify Contract Duration (Hour Ending)
- Begins: 12/15/1998  01:00
- Ends:   12/15/1998  24:00
- □ Life of the Unit/Load

[Clear All]  [Submit]  [Next]

General Info | Details | Schedule Info | Pre-Determined Cond | ICAP Adj

Contracts         File Upload        Meter Readings       Bids              Bill
Batch Scheduler   Settlement         Power System         Customers         About

Batch Scheduler

Select a Job:

Settle All Hourly Markets
Settle An Hourly Market
Settle Installed Capability Market
Confirm Settlement Data
Confirm All Hourly Settlement Data
Prepare Bill
Print Bill Invoice
Calculate Governance Variables
Calculate Voting Shares
Perform Monthly Meter Adjustment
Determine Hourly Entitlements Run on: / /

Market Service: Energy

- Energy
- AGC
- TMSR
- TMNSR
- TMOR
- Operable Capability

Begin Date: / /

Begin Time:

End Date: / /

End Time: 00:00

[Submit]  [Clear]

Priority
○ High
○ Medium
◉ Low

Contracts | File Upload | Meter Readings | Bids | Bill
Batch Scheduler | Settlement | Power System | Customers | About

Netscape
File Edit View Go Communicator Help
Bookmarks  Go to: https://www.iso-ne.com  What's Related energy-exchange™   Settlement   Home

| Administered Price | Parameter Maintenance |

Parameter: HQ FEC

| As Of | Until | Value |
|---|---|---|
| 01/01/1998 0:00 | 01/01/1999 0:00 | 0.0 |

Entering Hydro-Quebec Firm Energy Contract Rate Value

| As Of | | Until | | Value |
|---|---|---|---|---|
| 1/1/1998 | 00:00 | 1/1/1999 | 00:00 | 0.0 |

Add   Reset   Submit

Contracts       File Upload        Meter Readings    Bids          Bill
Batch Scheduler Settlement         Power System      Customers     About

Fig. 64

| Year | Nov | Dec | Jan | Feb | Mar | Apr | May | Jun | Jul | Aug | Sep | Oct |
|---|---|---|---|---|---|---|---|---|---|---|---|---|
| 1994-1995 | | | | | | | | | | | | |
| 1995-1996 | | | | | | | | | | | | |
| 1996-1997 | | | | | | | | | | | | |
| 1997-1998 | | | | | | | | | | | | |
| 1998-1999 | 5 | 10 | 15 | 20 | 25 | 30 | 35 | 40 | 45 | 50 | 55 | 60 |

Entering ISO Objective Capability Value

| Year | Nov | Dec | Jan | Feb | Mar | Apr | May | Jun | Jul | Aug | Sep | Oct |
|---|---|---|---|---|---|---|---|---|---|---|---|---|
| 1998-1999 | 5 | 10 | 15 | 20 | 25 | 30 | 35 | 40 | 45 | 50 | 55 | 60 |

| | Energy | AGC | TMSR | TMNSR | Receivables | Payables |
|---|---|---|---|---|---|---|
| Cadillac Gen Co. | $ 3,300.00 | $ 0.00 | $ 0.00 | $ 256.00 | | $ 7,011.00 |
| Mustang Retail Co. | $-1474.14 | $-2555.16 | $ 0.00 | $-327.58 | $ 6,977.58 | |
| Rolls Royce Utility | $-1024.14 | $-2555.16 | $ 0.00 | $ 56.41 | $ 3,548.57 | |
| Mercedes Utility | $-801.71 | $ 5,110.33 | $ 0.00 | $ 15.17 | | $ 3,515.16 |
| Hydro-Quebec | $ 0.00 | $ 0.00 | | $ 0.00 | | $ 0.00 |
| NEPOOL | $ 0.00 | | | | | $ 0.00 |
| Total | $ 0.00 | $ 0.00 | $ 0.00 | $ 0.00 | $ 10,526.16 | $ 10,526.16 |

Invoice Processing Date: 11-17-1998

Fig. 77 : Technical Architecture

Fig. 78 : Typical Hardware Configuration

Fig. 80 : Basic UI Design

METHOD AND SYSTEM FOR FACILITATING, COORDINATING AND MANAGING A COMPETITIVE MARKETPLACE

FIELD OF THE INVENTION

The present invention is directed to a method and system for facilitating, coordinating and managing a competitive marketplace and, more particularly, a method and system for facilitating, coordinating and managing a competitive energy market using the Internet.

BACKGROUND OF THE INVENTION

In recent years, the Federal Energy Regulatory Commission and other regulators have been mandating the deregulation and restructuring of the electricity industry in the United States. This follows a similar restructuring of the telecommunications industry and other regulated industries over the last two decades. It has become apparent to consumers, regulators, and industry experts alike that the electricity industry no longer fits the natural monopoly model that has thus far existed in this country, and that a new competitive model is necessary for the continued growth and health of this industry.

The restructuring of the electricity industry has driven significant change within the industry. Most significant of these changes are the separation of the physical flow of electricity from its financial flow, and the introduction of retail and wholesale competition. With the introduction of new types of transactions, the establishment of new markets, and the emergence of new market players, there is a growing need for a system and method to coordinate and manage this competitive marketplace.

The physical flow of electricity remains substantially unchanged from the traditional utility model. Electricity is still generated, transmitted over transmission and distribution wires, and consumed by end-users. In the traditional model of the electric industry, the money is routed through the same organizations as the electricity itself. In the new marketplace, however, transactions become considerably more complex. Money may trade hands several times and there may be any number of financial instruments related to a single physical delivery of energy. This suggests a need for additional capabilities to facilitate, coordinate and manage the increasing number and complexity of these financial transactions. FIG. 1 illustrates the separation of physical and financial flows concerning electricity in the new competitive marketplace. It can be seen from FIG. 1 that while the physical flow of electricity remains unchanged, the financial flow is now from the consumers to the energy merchant and onto the producers.

With ownership of physical infrastructure no longer a prerequisite for entering the energy marketplace, many new entities have begun to participate in the electricity trade. Also, utilities have begun to divest and separate their generation from their transmission and distribution. As a result, with reference to FIG. 2, the electricity marketplace must now accommodate producers such as generation companies; deliverers such as transmission distribution companies, and regional transmission groups; energy merchants such as energy traders, power marketers; and other new entities. Each organization within the industry may have any number of customers, but only in some cases is this customer the end-user or "consumer" of the electricity. In all cases, however, the various organizations must exchange information, money, energy, and energy-related services. The industry faces many challenges in facilitating, coordinating and managing the interactions of all of these new and transformed entities.

From this perspective, the area that has probably seen the most dramatic change over the last few years is the central operator. A central operator is a broad term grouping a variety of organizations that lie at the center of the value chain, as shown in FIG. 2. It describes the collective functions that facilitate, coordinate and manage the activities of participants in the electricity marketplace.

The traditional central operator's role has been to operate the transmission system, usually as a small division of a large utility or power pool (e.g., New England Power Pool). This is sometimes known as a system operator function. The system operator is responsible for planning, scheduling and dispatching generation; managing the interconnected transmission grid; and ensuring short-term and long-term system reliability. In the past, power pools, reliability councils, and traditional vertically integrated utilities have handled these tasks through coordinated efforts. In the competitive marketplace, however, the central operator has emerged as a leading alternative to support the combined roles and responsibilities of these traditional organizations.

Under deregulation, the roles played by central operators have expanded from coordinating the safe and reliable operation of a power system to implementing market rules, facilitating physical and financial transactions, and serving as a gatherer and central coordinator of market information. This is sometimes referred to as a market operator function.

As a market operator, the central operator may be responsible for conducting an auction of energy and accepting and managing competitive bids and contracts for energy and ancillary services. It provides for the financial settlement of energy and ancillary service markets, including billing and clearance for market trading.

To address the changing face of the energy marketplace, it is desirable to provide a system and method of facilitating, coordinating and managing the operation of that marketplace that is simple to use, manages competitive bids and contracts and financially settles the marketplace.

It is also desirable to provide a system that is flexible and can be modified to accommodate market growth and changing business rules.

SUMMARY OF THE INVENTION

According to a first aspect of the present invention there is provided a method of facilitating, managing and coordinating the operation of a competitive marketplace using the Internet. The method includes the steps of collecting bids for market services from a plurality of customers over the Internet, calculating a clearing price for a market service and calculating settlement information based upon the clearing price calculated and the bids collected.

According to a second aspect of the invention there is provided a system for managing and coordinating the operation of a competitive energy marketplace. The system includes a power system component that represents a network model of a physical power system including generating units, load facilities, transmission lines, and network areas. In addition, the system includes a customer component that manages all information about entities that have a business relationship with a market operator. The power system component and customer component are operatively coupled to a market operator to receive data from the market operator. The system includes a bid component that enables customers to submit bids for energy services and a meter reading component that stores meter readings submitted by customers. The bid component and meter reading component are operatively coupled to customers. A settlement component financially settles all markets based upon meter readings, operational information, bids and clearing prices. The settlement component is operatively coupled to the power system, customer, bid and meter reading components to receive data therefrom. A bill component operatively coupled to receive data from the customer and settlement components summarizes the financial activity for each customer to be used on an invoice for services provided and/or received.

According to a third aspect of the invention, there is provided a method of facilitating, managing and coordinating the operation of a competitive marketplace using the Internet. The method includes the steps of collecting bid and contract information for market services from a plurality of customers. The operation of units is then scheduled to provide the market services according to the bid and contract information collected. The operation of the units scheduled is next deployed and meter reading information from the units scheduled is collected. The market is then settled in accordance with the bid, contract and meter reading information collected.

According to a fourth aspect of the present invention, there is provided a computer program embodied on a computer readable medium for interfacing with a competitive marketplace. The computer program includes code for collecting bids for market services from a plurality of customers over the Internet, code for calculating a clearing price for a market service, and code for calculating settlement information based upon the clearing price calculated and the bids collected.

According to a fifth aspect of the present invention, there is provided an article of manufacture for facilitating the operation of a competitive marketplace. The article of manufacture includes a computer readable medium having a management interface for collecting bids for market services from a plurality of customers over the Internet, calculating a clearing price for a market service, and calculating settlement information based upon the clearing price calculated and the bids collected.

According to a sixth aspect of the present invention, there is provided a market information publishing component that supplies a variety of internal and external customer informational needs. More particularly, the market publishing component includes two independent components, a database population component and a report generation component. The database population component reorganizes data from many different sources into a common repository designed to suit customers' needs. The report generation component is then called upon whenever a customer requires a pre-defined report wherein the report generation component takes data from the database population component.

BRIEF DESCRIPTION OF THE DRAWINGS

FIG. 4 is the home page display screen according to a preferred embodiment of the present invention.

FIGS. 5–19 are various display screens for the bid component according to a preferred embodiment of the present invention.

FIGS. 20–31 are various display screens for the contract component according to a preferred embodiment of the present invention.

FIGS. 32–40 are various display screens for the customer component according to a preferred embodiment of the present invention.

FIGS. 41–53 are various display screens for the power system component according to a preferred embodiment of the present invention.

FIGS. 54–59 are various display screens for the batch scheduler component according to a preferred embodiment of the present invention.

FIGS. 60–69 are various display screens associated with the settlement component according to a preferred embodiment of the present invention.

FIGS. 70–72 are various display screens associated with the bill component according to a preferred embodiment of the present invention.

FIGS. 73–76 are various display screens associated with the meter reading component according to a preferred embodiment of the present invention.

DETAILED DESCRIPTION

Figure 1:
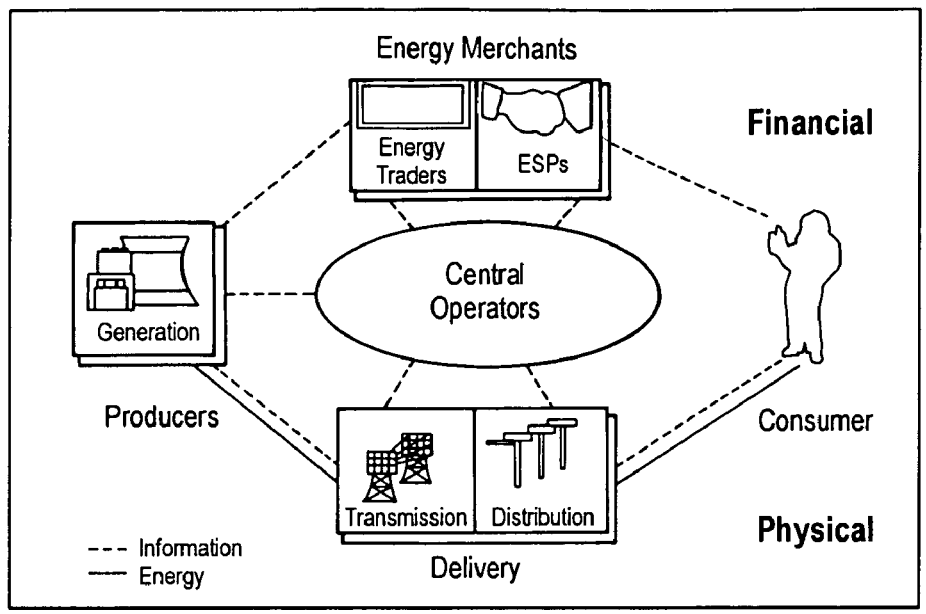
FIG. 1 is a schematic illustrating the separation of physical and financial flows in a competitive electricity marketplace.
Figure 2:
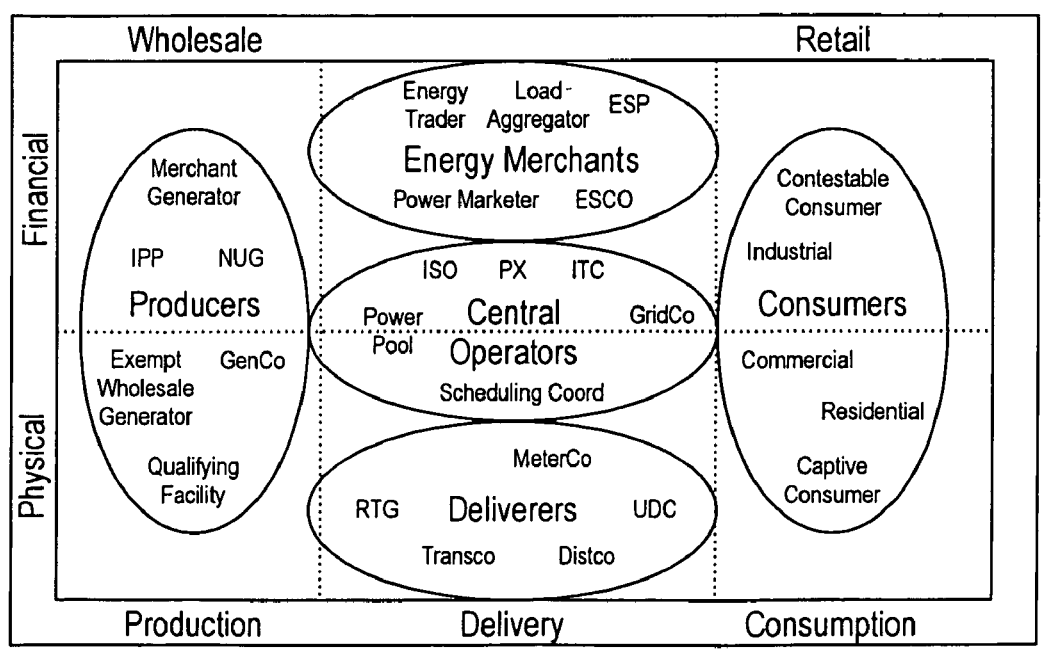
FIG. 2 is a schematic illustrating the participants in a competitive marketplace.

Facilitating, coordinating and managing the day-to-day operations of a competitive marketplace, such as the electricity market, is a complex task. While the present invention will be described in the context of managing an electricity marketplace, the present invention is not limited to such a market and may be applied to manage other competitive markets, such as a natural gas market. The facilitation, coordination and management of the day-to-day operation of the market are, for the most part, performed by a market operator and a system operator. The market operator conducts an auction for energy and ancillary services, collects contracts and bids for energy and ancillary services and provides for the financial settlement of the markets, including billing and clearance for market trading. Often, the market is settled in hourly or even sub-hourly trading intervals and the market operator must collect, coordinate, and distribute a vast amount of market information. The system operator takes information provided by the market operator and creates a dispatch schedule. The system operator uses the dispatch schedule to direct generators to operate their units accordingly.

The market operator is typically operating a spot market. The spot market is the core of a competitive electricity marketplace. The spot market is the mechanism responsible for setting the value of electricity or some ancillary service in an interval of time and facilitates the efficient operation of the physical power system. The actual operation of the spot market will vary depending on the prevailing market rules and procedures. However, in a pool model, the context in which the present invention will be described, the market will typically operate as follows.

In a pool model, generally, all producers generate into a common pool of energy and all customers take out of the same pool. Generators decide for themselves when they would like to commit their plant to generate electricity and bid each day for the opportunity to run their plant. In general, a bid consists of several bid blocks, including a price and a quantity for each trading interval of the day. In addition, bids can be submitted for ancillary services such as energy reserve or capability. The bid process can be generalized for any market service or commodity.

Bids may also be submitted by consumers of electricity. These demand-side bids of price and quantity represent the amount of load the consumer is willing to shed based on price. For example, a large industrial consumer may see economic benefits by reducing production levels at a large manufacturing plant if the spot price for electricity is high. Loads that bid their demand are often called dispatchable loads because the load is dispatched based on price. Additionally, customers submit other relevant forecasts about the characteristics and behavior of their units or dispatchable loads during the bidding process. Examples include high and low operating limits, the seasonal capability of units and scheduled maintenance outages.

The system operator addresses reliability concerns and often publishes a dispatch schedule that also takes into consideration additional information such as historical power system performance, weather forecasts, projected supply shortages, system maintenance and fuel costs, for example. The system operator uses the schedule to direct generators to load their units accordingly. At the actual time of dispatch, the generator with the lowest price bid will be dispatched first, with each subsequent generator dispatched as required until supply matches demand. Ancillary services are also designated as required to maintain real-time system reliability and stability.

The spot price, or clearing price, is equal to the lowest possible price at which supply meets demand. Preferably, the spot price is determined "ex-post", i.e., after the dispatch process. The final clearing prices in the pool are determined by what actually happens on the trading day, not what was projected at the time the original schedule was published. Alternatively, the spot price can be determined at the time the original schedule is published. This pricing information is shared with the market operator for settlement purposes. More particularly, once bids have been submitted and the bid deadline has passed, the system operator performs a unit commitment process. Unit commitment involves taking all of the bids, stacking them from lowest price to highest price and determining an economic merit order that should be followed at the time of dispatch. For example, Table 1, shown below, illustrates a bid stack for hour 10 of the next day.

TABLE 1

| QUANTITY | PRICE | ASSET |
| --- | --- | --- |
| 100 MWh | $50/MWh | Gen. Unit C |
| 200 MWh | $20/MWh | Gen. Unit B |
| 150 MWh | $15/MWh | Gen. Unit B |
| 50 MWh | $10/MWh | Gen. Unit C |
| 50 MWh | $10/MWh | Gen. Unit A |
| 200 MWh | $0/MWh | Gen. Unit B |
| 100 MWh | $0/MWh | Gen. Unit A |

The day ahead of the trading day, the system operator forecasts that for the next day the total system load for hour 10 will be 500 MWh based on historical data, the weather forecast, external contract sales to other power pools, etc. It can be seen from Table 1 that for supply to match demand, the 500th MWh will be provided by Unit B at a cost of $15. This forecasted clearing price allows customers to guess what their position might be in the market and hedge their risk with short-notice contracts, for example. The system operator also publishes a schedule of economic merit order for the units. This commits Unit A to run 150 MWh, Unit B to run 300 MWh, and Unit C to run 50 MWh. In some markets, this day ahead clearing price is used to settle the market. Everyone that consumed energy is charged at $15/MWh. For example, Gen Unit A would be paid $15*150=$2250, Gen Unit B $15*300=$4500, and Gen Unit C $15*50 MWh=$750. In other markets, there is no financial settlement ahead of the trading day.

On hour 10 of the actual trading day, the system operator determines that the real-time load is actually 600 MWh instead of 500 MWh. Perhaps there are more people running their air conditioner than this time last year or, perhaps, Gen Unit C has been shut down for emergency maintenance. This means that the system operator orders Gen Unit A to provide 150 MWh, and Gen Unit B 450 MWh. The actual load sets the clearing price at $20/MWh since the most expensive MWh was provided by Gen Unit B at its bid of $20/MWh. In most markets, this is the clearing price used for market settlement. It reflects the actual cost of the market service during the actual trading interval. While a particular example has been set forth, the clearing price may be determined either before or after the actual dispatch of the units, depending on the market rules. In either case, the price is used by the market operator in the settlement process to determine charges and payments as will be described hereinafter.

Clearing prices for each trading interval can be extremely volatile. In order to provide some certainty, customers in a market may create contracts for the purchase or sale of a market service to or from other customers or from an external source such as a neighboring control area. Although most contracts are negotiated bilaterally between customers, a great deal of the contract information is captured by the system operator for scheduling and by the market operator for use in settlement of the marketplace. In a preferred embodiment, these contracts can be for assets that transfer a percentage of a unit or load to another customer, or they can be system contracts that are simply a quantity of electricity or other market service. For either type of contract, buyers and sellers can attach pre-determined conditions (PDCs) to the contract that stipulate additional conditions that make the contract active or inactive. The PDCs can be based on a unit's availability or actual performance of a generating unit, or it can be based on the scheduled or available quantity of another contract. Contracts can also be dispatchable based on clearing price, thus taking on a different percentage or value depending on the clearing price. Each percentage and clearing price or value and clearing price pair is known as a contract block.

The following is an example of an asset contract. Customer A owns 100% of Generating Unit #1. However, Customer A has previously reported to the market operator that Customer A and Customer B have entered into a contract where Customer B has purchased a dispatchable unit contract with two dispatchable blocks. One block is for 25% of generating unit #1 if the clearing price reaches $10, and the other block is for an additional 25% of generating unit #1 if the clearing price reaches $15. There is also a pre-determined condition on the contract indicating that generating unit #1 must be dispatched for at least 50 MWh before the contract becomes active. In the contract, Customer A and B agree that Customer B would pay $50,000/year to Customer A for the duration of the contract. This part of the transaction is not handled by the market operator. However, the conditions and terms of the contract are reported to the market operator. During an actual trading interval within the duration of this contract, generating unit #1 is dispatched at 100 MWh. The clearing price for that trading interval is also determined to be $15/MWh. If the contract were not active (i.e. generating unit #1 was only used for 10 MWh), Customer A would be entitled to the entire MWh output of generating unit #1 times the clearing price (e.g. $1500). However, the contract is active, so Customer A only retains 50% entitlement on generating unit #1 and Customer B retains the other 50%. The market operator then determines during settlement that the contract is worth 50 MWh (i.e., 50% of generating unit A), so Customer A receives a $750 payment and Customer B receives a $750 payment.

The following is an example of a system contract. Customer A owns 100% of generating unit #1 and 100% generating unit #2, and Customer B owns 100% of load facility #3. Customer A agrees to sell a 50 MWh system contract to Customer B. This contract is submitted to the market operator. During the trading interval of interest, generating unit #1 is metered as producing 100 MWh as is generating unit #2, and load facility #3 is metered as consuming 100 MWh. The clearing price is $15. Before the contract is taken into account, Customer A would be entitled to 200 MWh resulting in a $3000 payment. Customer B would be obligated for 100 MWh, or a $1500 charge. However, the contract is determined to be active and valued at 50 MWh. As a result, Customer A has a net entitlement of 150 MWh and gets a $2,250 payment. Customer B offsets their 100 MWh obligation with the 50 MWh contract, resulting in a 50 MWh net obligation and a $750 charge.

After the trading day, customers submit meter readings for the unit, loads, and tie lines for which they are the responsible party. The system operator also shares meter data, bid re-declarations, pricing, contract schedules, reserve designations, ancillary service requirements, and other data with the market operator. The market operator acts as the central clearing house for the information associated with the actual operation of the marketplace on the trading day.

Once the market operator has acquired pricing and power system information about the trading day from the system operator and the customers, the marketplace is settled. Everyone providing energy or ancillary services has to be paid, and everyone consuming has to be charged. The market operator uses the information about the operation of the power system and pricing information to determine charges and payments on an asset by asset or customer by customer basis. The results of this financial settlement are then made available to the marketplace customers.

Eventually, the results of market settlement must be cleared in the form of a bill. The market operator aggregates the settlement results for a bill period and creates a bill for each customer. The bill reflects not only the customer's activity in the market, but also additional charges and payments applied by the market operator to cover imbalances, operating expenses, transmission tariffs, and the like. Additional adjustments can be made to a customer's bill when necessary. A final invoice can then be prepared for each customer. Finally, invoice information may be preferably shared with financial systems external to the market operator. These external financial systems may include invoicing systems, general ledgers, and electronic fund transfer software.

In general, using Internet technologies, the present invention preferably employs a secure, Java-based, distributed component or object application which runs on an architecture composed of servers supported by a relational database, Java just-in-time compilers, and an object-request broker (ORB). Customers access the system through standard browser-equipped personal computers with Internet access.

Turning to a more detailed description, the present invention is partially implemented utilizing a set of distributed components deployed in a multi-tiered network-centric architecture collectively providing the services needed to effectively facilitate, coordinate and manage a competitive marketplace preferably via the Internet. Overall, the description of the system can be broken down by its business components, technical architecture, and application architecture.

Business Components

The market operator provides a full set of business components to facilitate bidding, contract management, meter-reading submission, market settlement, and billing in addition to managing an enterprise wide solution to customer information and power system modeling. These functions are scalable, easily interfaced to other systems, designed to be highly reliable and secure, and constructed with the data and audit needs of the customer in mind. An object-oriented design approach which utilizes object-based techniques such as inheritance, encapsulation and polymorphism is used to make the application flexible. Thus, new classes can be rapidly designed or modified if new market rules and procedures dictate the need. The object-oriented design also uses standard messages and methods so that components can be added or removed from the application with minimal change to existing components.

Figure 3:
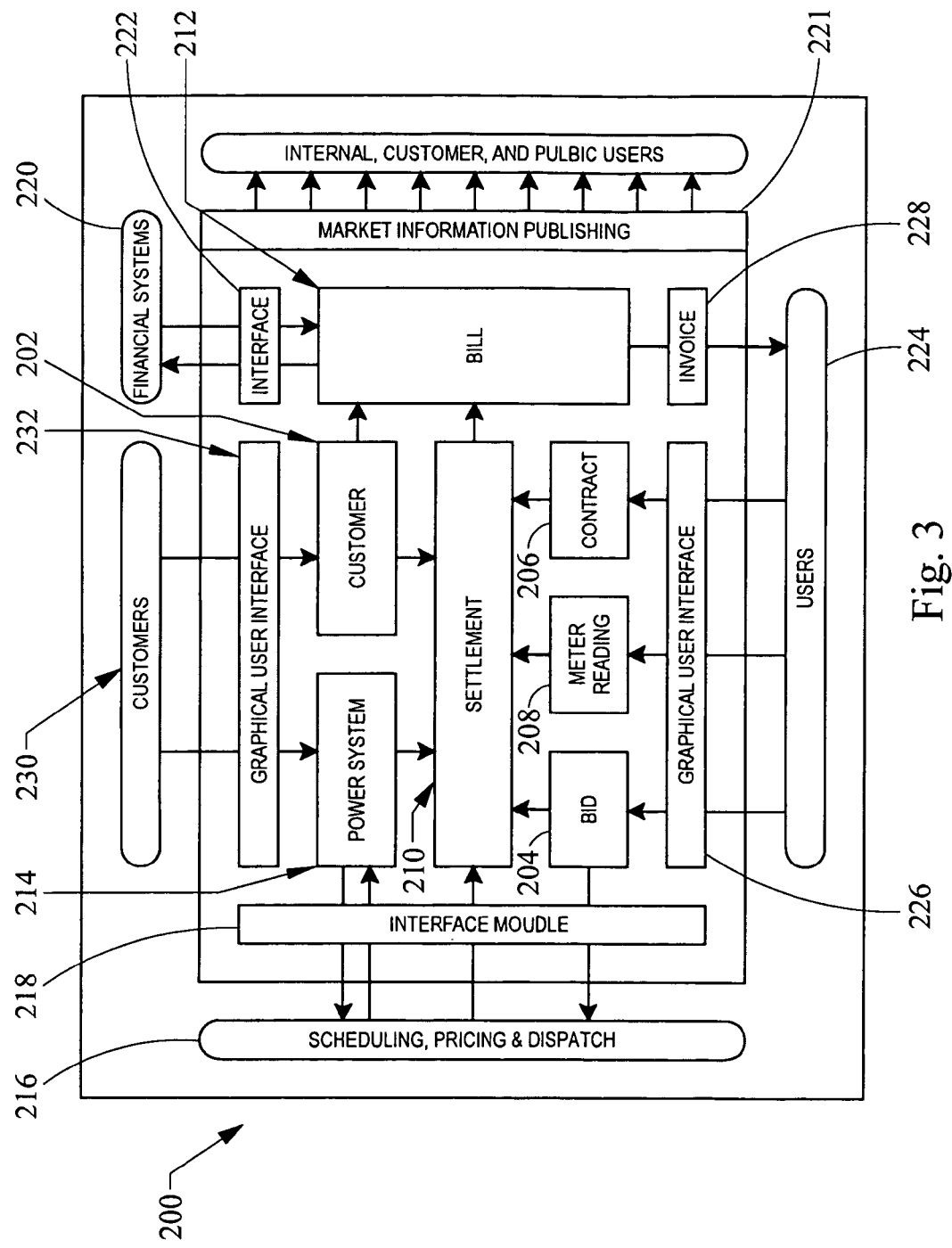
FIG. 3 is a schematic of a business model that implements the present invention according to a preferred embodiment of the present invention.
Figure 12:
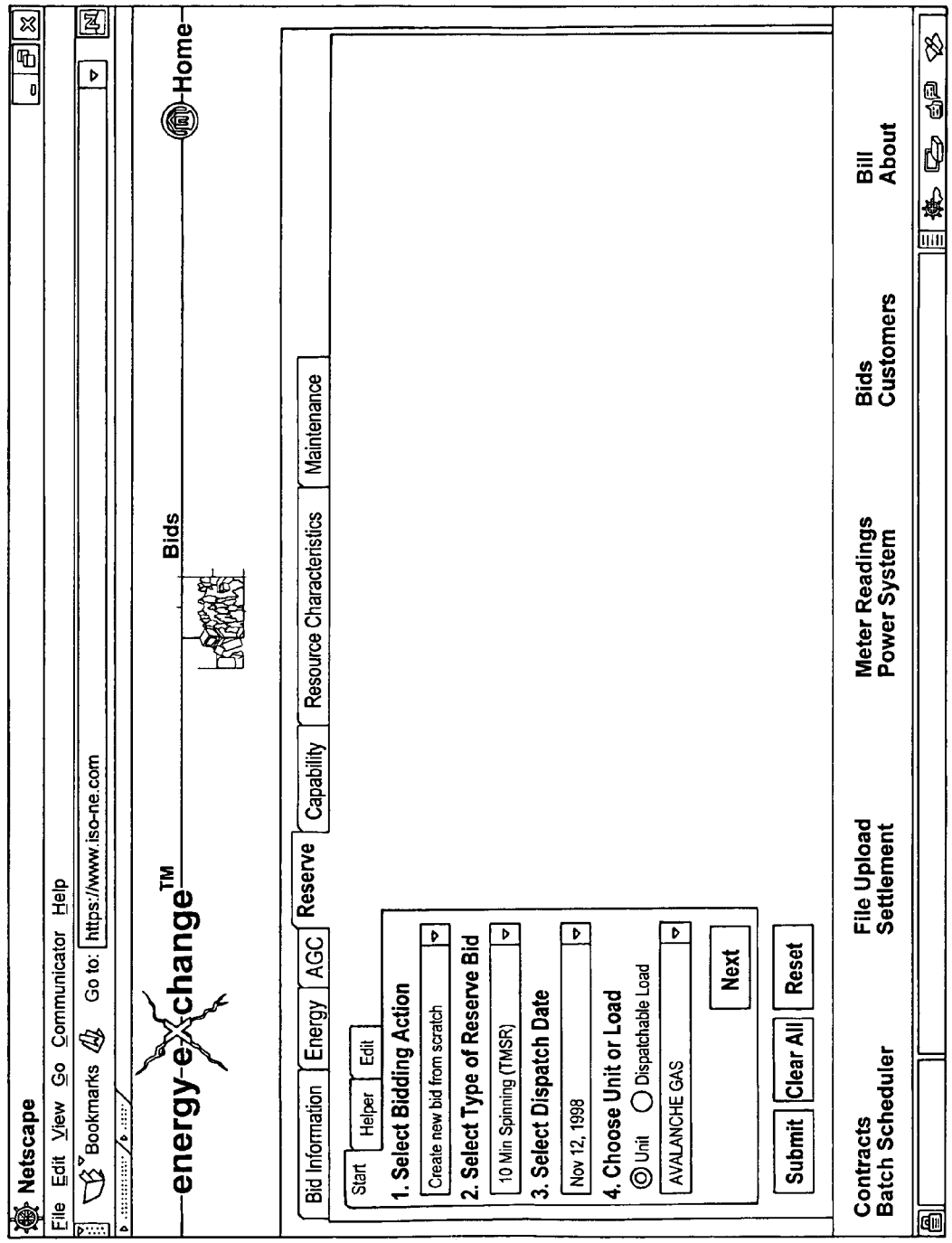
Figure 14:
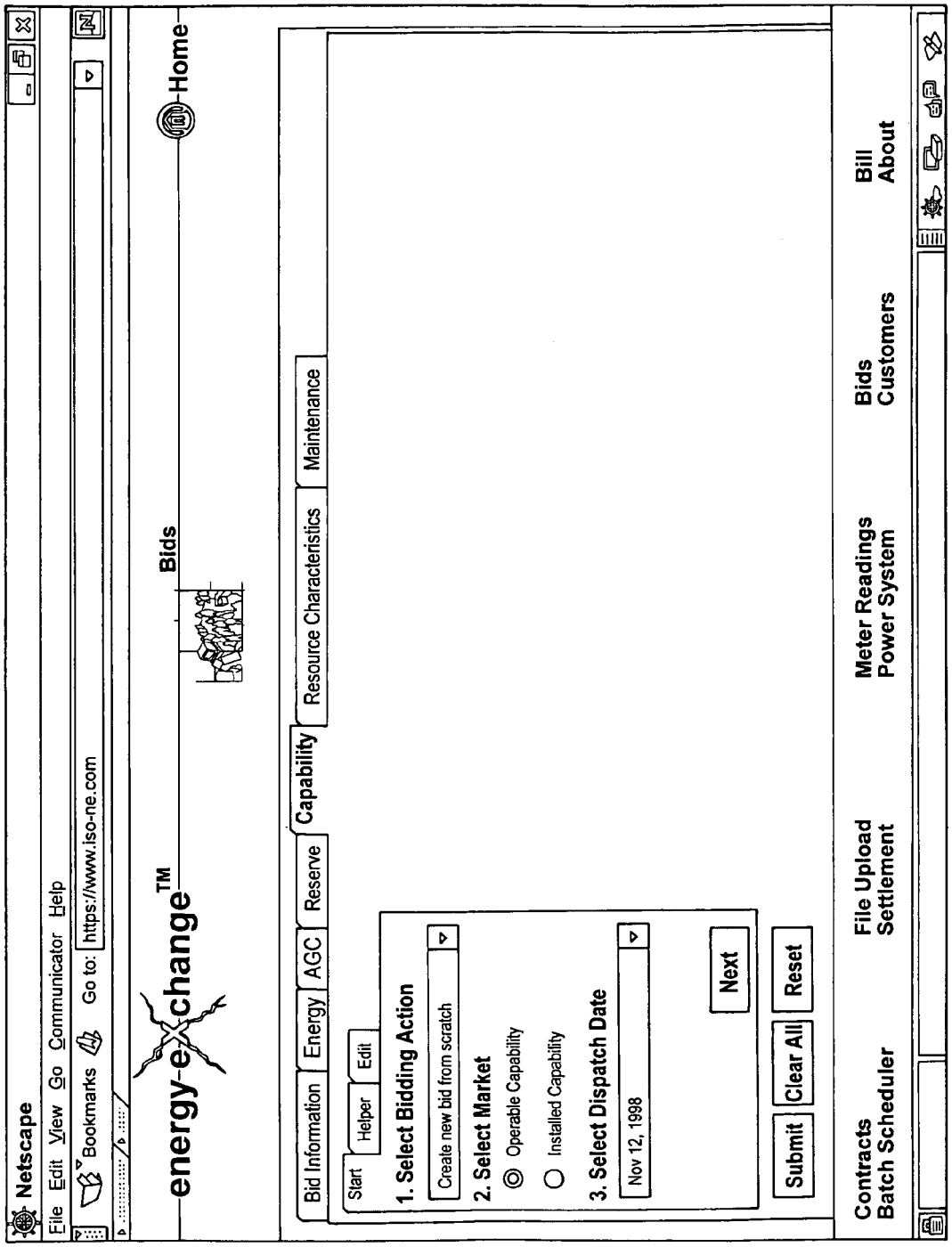

FIG. 3 is a schematic of a business model 200 that implements the present invention and includes major component-to-component interactions, interfaces, and links to customers as well as other software packages. The key components include a customer component 202, a bid component 204, a contract component 206, a meter reading component 208, a settlement component 210, a billing component 212, and a power system component 214. The business model 200 shown in FIG. 3 is a generalized model and may be different depending upon the market operator's scope of responsibility. For example, pricing may or may not be integrated into the market function, but might instead be part of the system operator function (not shown). The exact dynamics of the market operator will vary for each implementation. As the marketplace evolves, there will likely be many rule changes, regulatory mandates, new entrants into the marketplace, and fundamental changes to the business model. A system implementing market functions must be adaptable, quickly deployable, and flexible enough to change as business needs change. Ideally, each core function would encapsulate its own information and behavior so that one capability could be modified or replaced with minimal impact on other market operator capabilities.

In response to this need for an integrated, dynamic, and robust market operator capability, a component-based object-oriented system has been developed that provides the core functions required to coordinate and facilitate the market activities of customers in a competitive marketplace.

With reference to FIG. 3, the components of the business model 200 communicate with one another in the following fashion. The settlement component 210 receives information from the power system component 214, customer component 202, bid component 204, meter reading component 208 and contract component 206. In addition, it receives scheduling, pricing and dispatch information 216 from the system operator through an interface module 218. The bill component 212 receives information from the customer component 202 and settlement component 210 and outputs information to external financial systems 220 through an interface 222. These external financial systems 220 may include invoicing systems, general ledgers and electronic fund transfer software. The bill component 212 also outputs information to customers 224 through an invoice interface 226. The bid, meter reading and contract components receive information from customers 224 preferably through a graphical user interface 228. The power system and customer components 202 and 214 receive information from customers 230 through graphical user interface 232. Customers 230 are preferably internal to the market operator.

The power system component 214 represents a network model of the physical power system, including the generating units, load facilities, transmission lines (tie lines), network nodes and network areas. It is adaptable to multiple pricing and/or bidding zones and maintains generation characteristics including operating limits, ramp rates, and black start capability.

The customer component 202 manages all information about entities that have a business relationship with the market operator. It retains data on customers, including market eligibility, equity ownership in generation and load, contact information, bidding responsibilities, and meter-reading responsibilities.

The bid component 204 enables customers to submit, view, modify, and validate bids via a graphical user interface or through a bulk file upload facility. It applies physical limit checks on bid offers for each generator and allows for bidding through multiple price-quantity bands, potentially different for each trading interval. It provides for varied types of energy bids including support for fuel constrained and self-scheduled generation and accepts updates during the open bidding period to accommodate changes in generating unit or dispatchable load characteristics. It contains user interfaces to allow the market operator to vary bid submission deadlines. It maintains information about customer offers to provide market services such as energy, ancillary services, or capability service and provides a full audit log, including user access information to facilitate statistical analysis on bidding practices.

The meter reading component 208 stores meter readings submitted by customers for all metered generation, load, and tie flows and allows for validated bulk meter reading submission. It offers helper functions that allow customers to enter information quickly and efficiently and identifies missing or incomplete metering data.

The contract component 206 allows for the creation of contracts and accepts contracts for a wide range of market offerings (energy, ancillary services, etc.) and contract definitions (system, asset-specific, etc.). It offers user-friendly web interfaces for placing transactions into the system and a file upload mechanism for high-volume users, all with real-time validation. It provides the facility to submit a contract schedule, slicing the contract into several price bands with each band evaluated separately against the market clearing price, and it determines contract activity based upon conditions to be evaluated post-dispatch, such as unit availability or physical contract activity.

The settlement component 210 manages the financial settlement of all markets based upon meter-readings, operational information, bids, contracts, and clearing prices. It determines clearing prices through economic stacking of bids as previously described. It performs reconciliation to account for accurate, month-end metering data. It contains an extensive versioning mechanism that allows for the re-settlement of any given period based on new or changed input data.

The bill component 212 summarizes the financial activity for each customer on an invoice for the service provided or received. It performs differential billing for trading intervals re-settled with corrected input data but previously billed on a historical invoice. It provides for flexible bill processing periods. It can be supplied with an interface to enter manual line items such as registration fees or special charges and interfaces with third party systems, such as tariff billing systems. It preferably communicates with third party accounting software to provide general ledger and activity accounting updates.

Also shown in FIG. 3 a market information server 221 may be included. The market information server is a data warehousing tool designed to service a variety of internal and external customer informational needs. The heart of the market information server is a database which acts as a central repository for data elements from a variety of informational sources within the market operator. The market information server associates transactional input, such as bids, contracts, and metering data, with market activity data, such as clearing prices and generator operational flags. The market information server then ties this set of information to each market customer's individual settlement. Using market information server reporting tools on the data warehouse, reports are created and distributed to each customer according to security level. Additionally, high level studies and drill-down details for internal market operator functions such as market administration, market power monitoring, auditing, and billing are easily performed on the same data set.

The market information server application is composed of two independent components: database population component and report generation component. The database population component performs all of the data gathering steps and runs periodically, either through a batch process or through special-case market operator user execution. With each execution of the database population component, the data is re-organized from many different sources, each tailored to their respective applications, into a common repository design to suit customers' needs. After this stage, the report generation component is called upon whenever a user requires a pre-defined report. In addition, third party tools may be used for ad-hoc queries.

Customer's interaction with the market operator is based on a transactional system: individual customers' browsers connect with the market operator and the customers enter bids for the output of their generators and for ancillary services as well as bilateral contracts. Additionally, metering parties submit generation, consumption, and tie flow values used in the determination of market settlement.

The nature of transactional data is fragmented in that data enters the system through the course of each day. The market information server selects data elements which have financial implication to each trading interval settlement, collects them, and updates the market information data warehouse. For example, only final metering data is selected for retention even though multiple meter submittals had been performed for the same asset during the same trading interval.

Operational information from the system operator is also gathered into the market information database. This data, while also transactional, has the added characteristic of being time critical. Whereas market operator transactions are correlated post-dispatch, operation data is collected and reported in near real-time. Near real-time reporting is achieved by polling the system operator's energy management system several times per hour and making the information received from this query available to users with access rights to review it. This data set includes, but is not limited to, instantaneous clearing prices, generator operational flags, and pool reserve designations. While quantities may be overridden by market administrators during the settlement process, this information provides timely feedback to those customers directly affected by the dispatch characteristics. By developing a secure, reliable, and informative link between market operators and market customers, communication between the parties will eliminate problems which would potentially need to be handled through dispute resolution.

The third source of information for the market information server is the market operator's settlement database. The market operator provides performance information for each customer and, ultimately, billing data. With this data selected and correlated to the transactional and operational data, a complete snapshot of each trading interval's activity is created.

The market information data warehouse generates reports designed with customer requirements, rather than specific application requirements, in mind. The table structures are constructed such that customers and asset information are easily tied to each market. This design serves three major purposes: fast querying capability, multiple delivery options, and report writing flexibility.

Data warehousing enables fast database access which facilitates reporting the data itself. High speed report creation becomes increasingly more important as energy markets become more open and more customers actively query the system. The sheer number of data elements for each trading interval coupled with the volume of customers making informational requests may result in a system that is burdened with preparing data sets on the order of Gigabytes per day. Rapid turn-around of these requests, especially if an on-line request-based method is used, is a key to the market information server's potential success.

A variety of methods may be chosen for publication of the data. For public information, data may be posted directly to the Internet. Again using third party Web reporting tools, trend analyses such as clearing price history, can be shown right on the Web with only minor additional effort. In the case of confidential data, a special list of customers that are enabled to view the data would be created and the market operator may opt to make these reports available either through a secure Web server or through a traditional file transfer protocol server.

In any case, some customers will require data to be prepared for easy import into analysis tools, such as spreadsheets and desktop databases. The market information server application has a built-in architecture used to create standard comma delimited files, along with error handling and file maintenance tracking tools. To facilitate users who choose the spreadsheet import method, templates are created for the customer to download and use.

Another strength of the market information server is its ability to empower internal market operator staff with the ability to easily create ad-hoc reports. Market administrators will choose to create very detailed reports for a given trading interval in order to perform check-and-balance type operations. Market monitors will tend to create detailed reports as well, but on the customer or asset level to study trends in bidding, metering, and contract writing. Auditors and billing staff will run summary type reports which aggregate many customers and many trading intervals over monthly or annual time frames. Regardless of the type of report designed, the time between report design request and report delivery is shortened because of the data warehouse.

Returning to the components shown in FIG. 3 each component described above, as well as some others, will now be described in further detail. Of course, the details of each component may change depending on the marketplace in which the present invention is implemented and the particular business rules developed for each market. For illustration purposes, the present invention is applied to the electricity marketplace.

FIG. 4 illustrates the home page 300 as seen in Netscape browser on a customer's graphical user interface. The components shown in FIG. 3 and discussed above, as well as some additional components are displayed. The user can access a component by selecting the desired component with a device such as a mouse or a key stroke, for example.

The bid component 204, preferably provides the bidding capabilities required for a supply-side auction of energy services. The bid component provides many primary services which will be described below. The bid component enables customers to submit, view, modify and validate bid and resource characteristics via an effective graphical user interface or bulk file upload for a plurality of market services such as energy, automatic generation control (AGC), ten minute spinning and non spinning reserve, thirty minute operating reserve, installed capability and operable capability.

FIG. 5 is a display screen for the bid component according to a preferred embodiment of the present invention that can be displayed on a customer's workstation. As can be seen at the top of the screen, tabs 501 are provided that allow the user to display various screens of the bid component. The screen shown in FIG. 5 is the bid information tab. The bid information screen provides information to the user concerning submission deadlines and date ranges for bid entries. The user can also perform a search for a particular customer by entering either a customer name or identification number on the right side of the screen.

Figure 6:
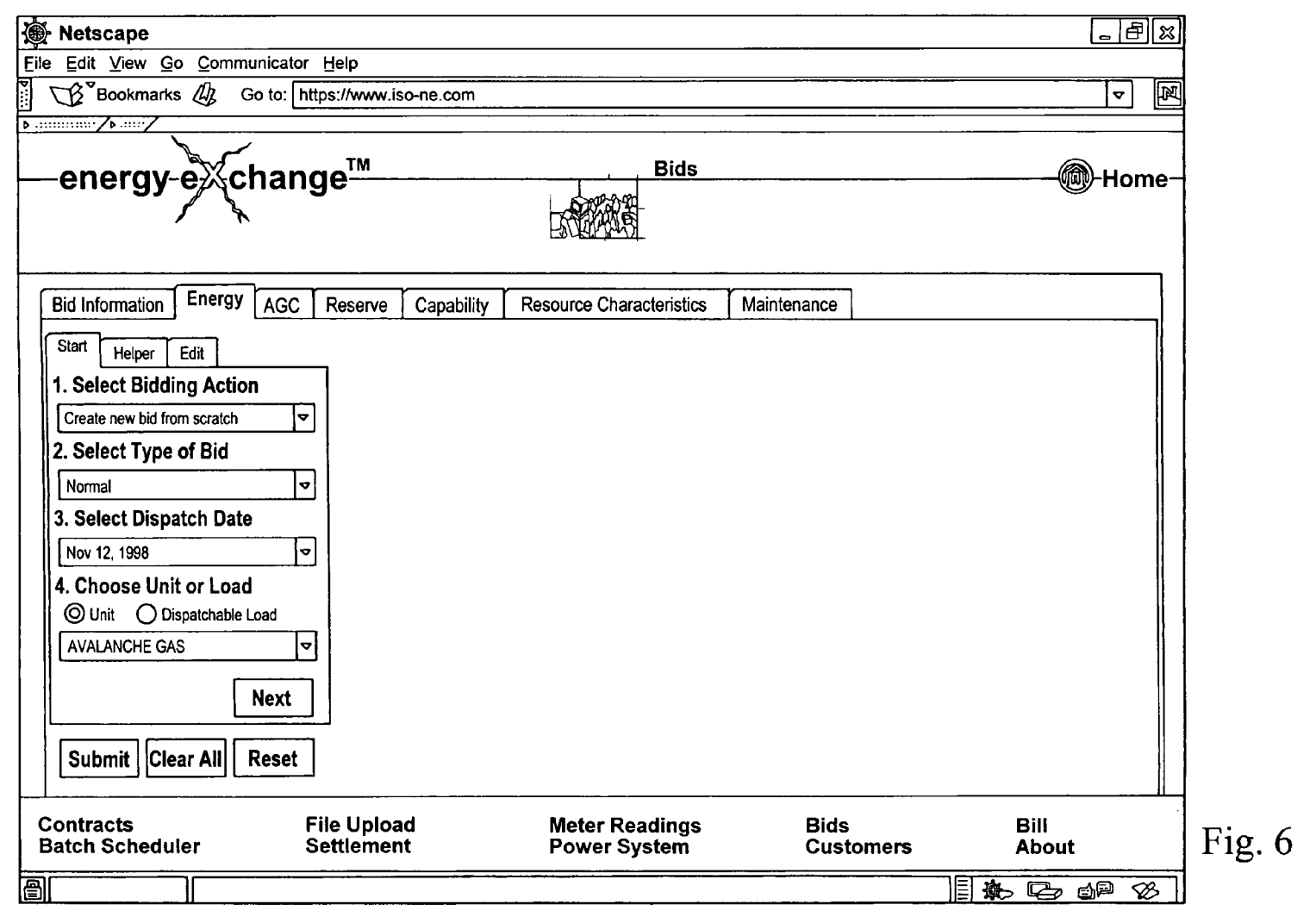
Figure 8:
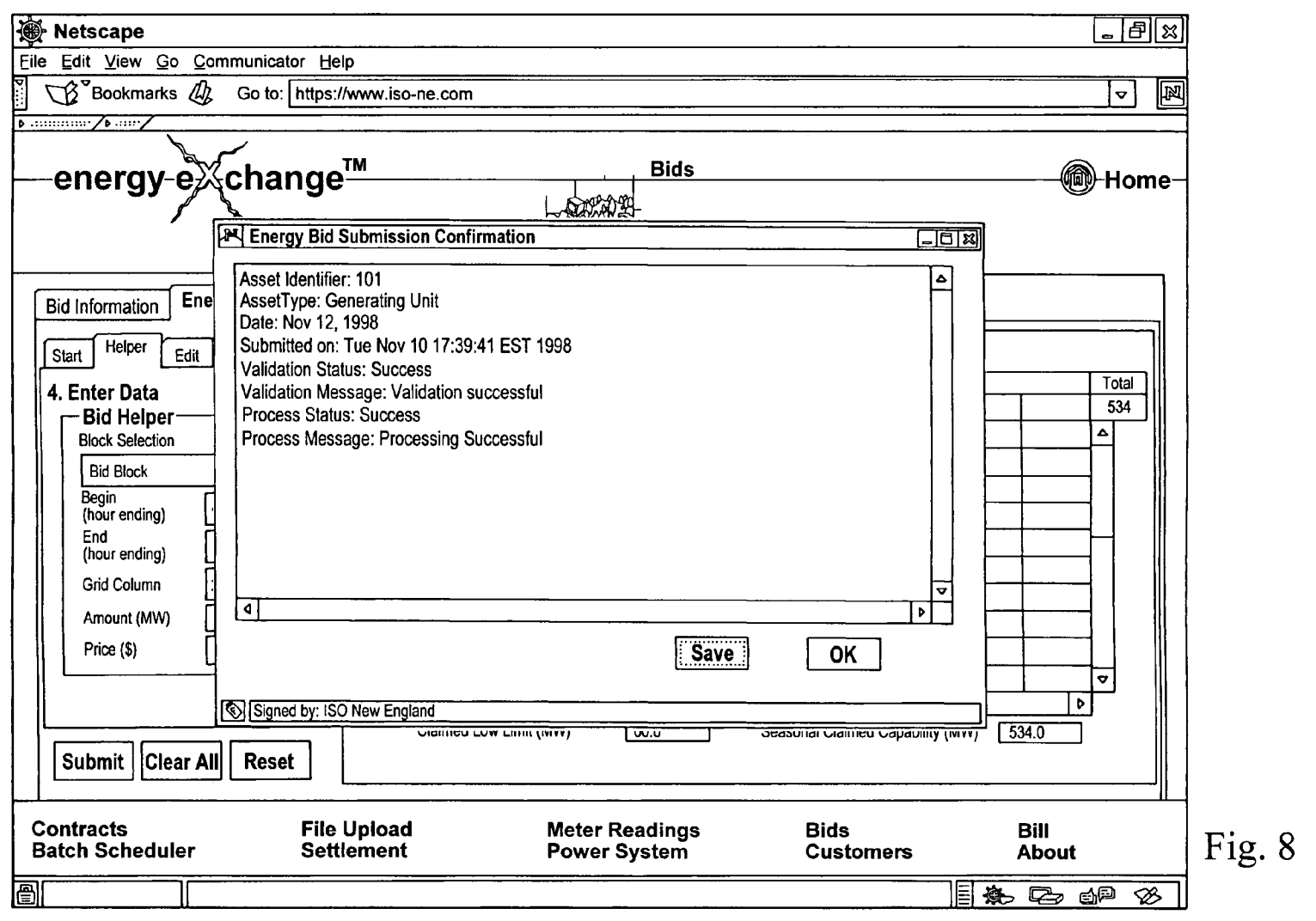

FIG. 6 is a display screen of the energy tab of the bid component according to a preferred embodiment of the present invention. From this screen, the customer can begin the bidding process. On the left side of the screen a start screen is displayed where the customer can enter bidding information as shown. In this particular example, a new bid is to be created from scratch for the Avalanche Gas unit. After the customer has entered the requested information, the "Next" radio button is activated and a helper screen as well as a bidding grid of the energy panel is displayed as shown in FIG. 7. From this screen the customer can enter information as to the parameters of the bid. The bidding grid on the right side of the screen will be filled with the parameters the customer selects. Energy bids preferably consist of blocks of price and MW amount for each trading interval within a scheduled dispatch period. Energy bids may also contains a self-scheduled MW amount 701, a high operating limit 702, and a low operating limit 703 for each trading interval. As seen in FIG. 7, the scheduled dispatch periods are listed and the user can enter the amount and price for each trading interval either directly in the grid or by using the helper. Once the bidding information is entered, the customer can submit, clear or reset the bid information. After the customer submits the bid a confirmation screen is displayed on the customer's work station as shown in FIG. 8 indicating confirmation of the bid. In a preferred embodiment, the customer is notified of the date and the time that the bid was accepted, its effective date and unit name.

Figure 9:
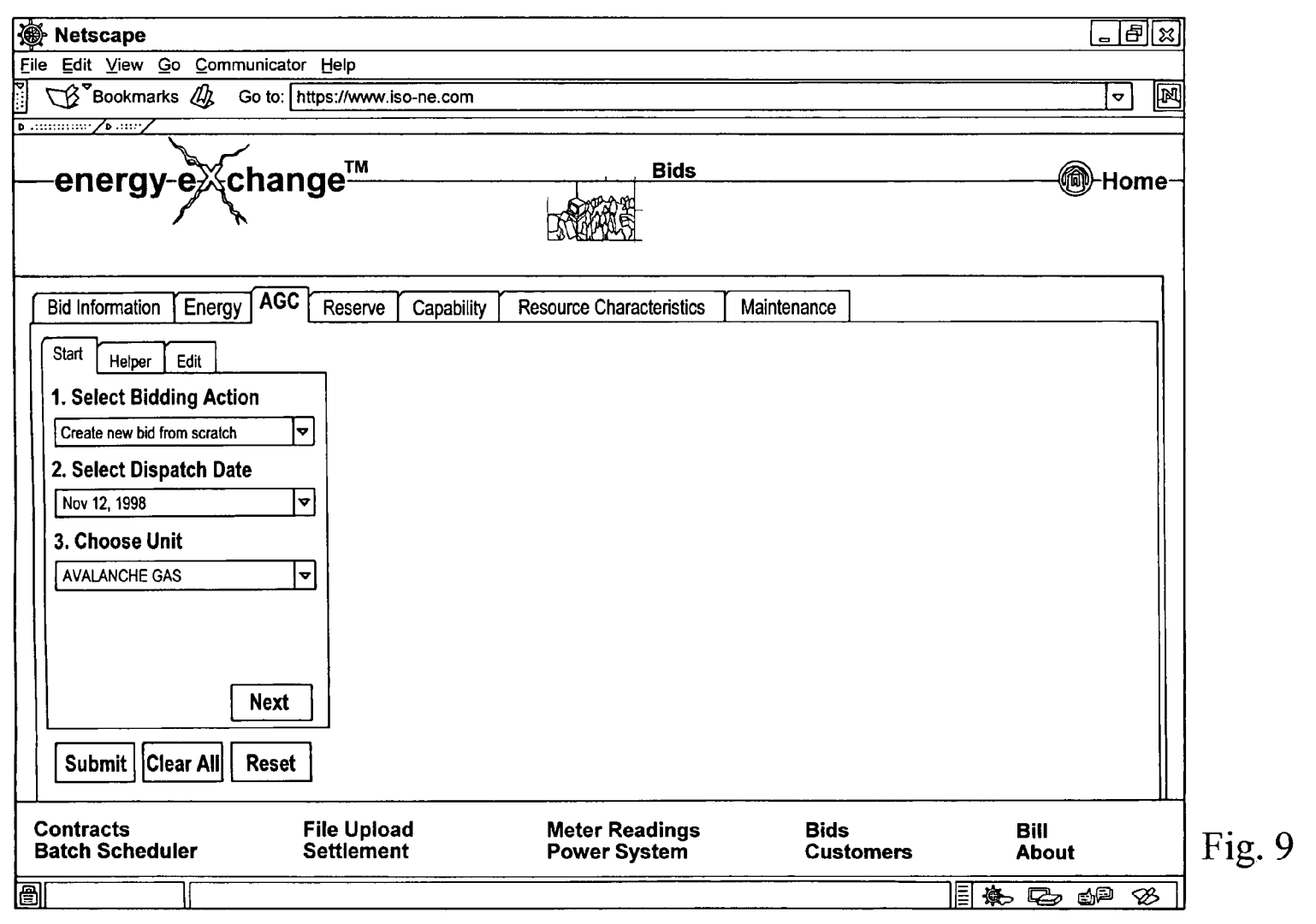
Figure 10:
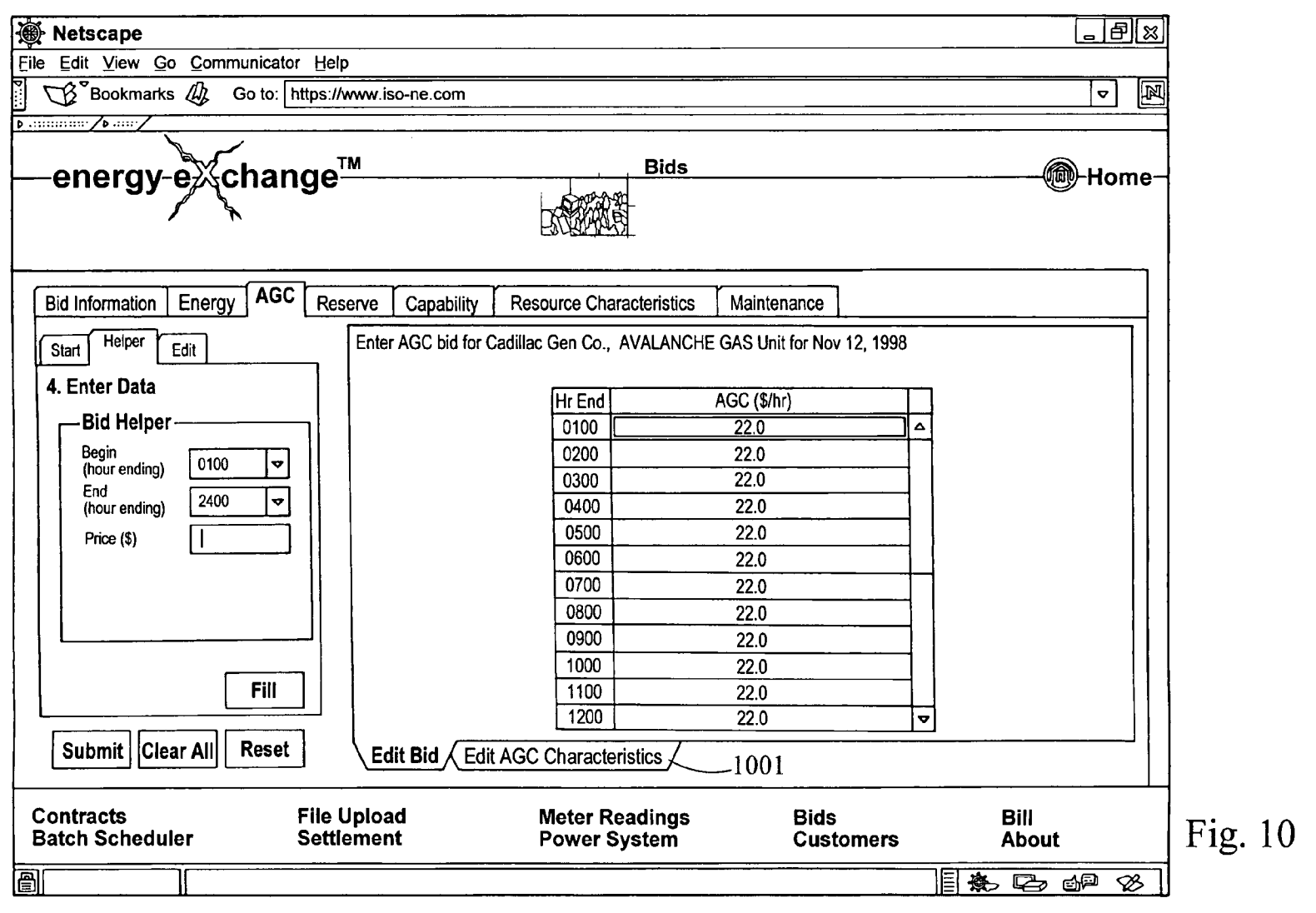
Figure 11:
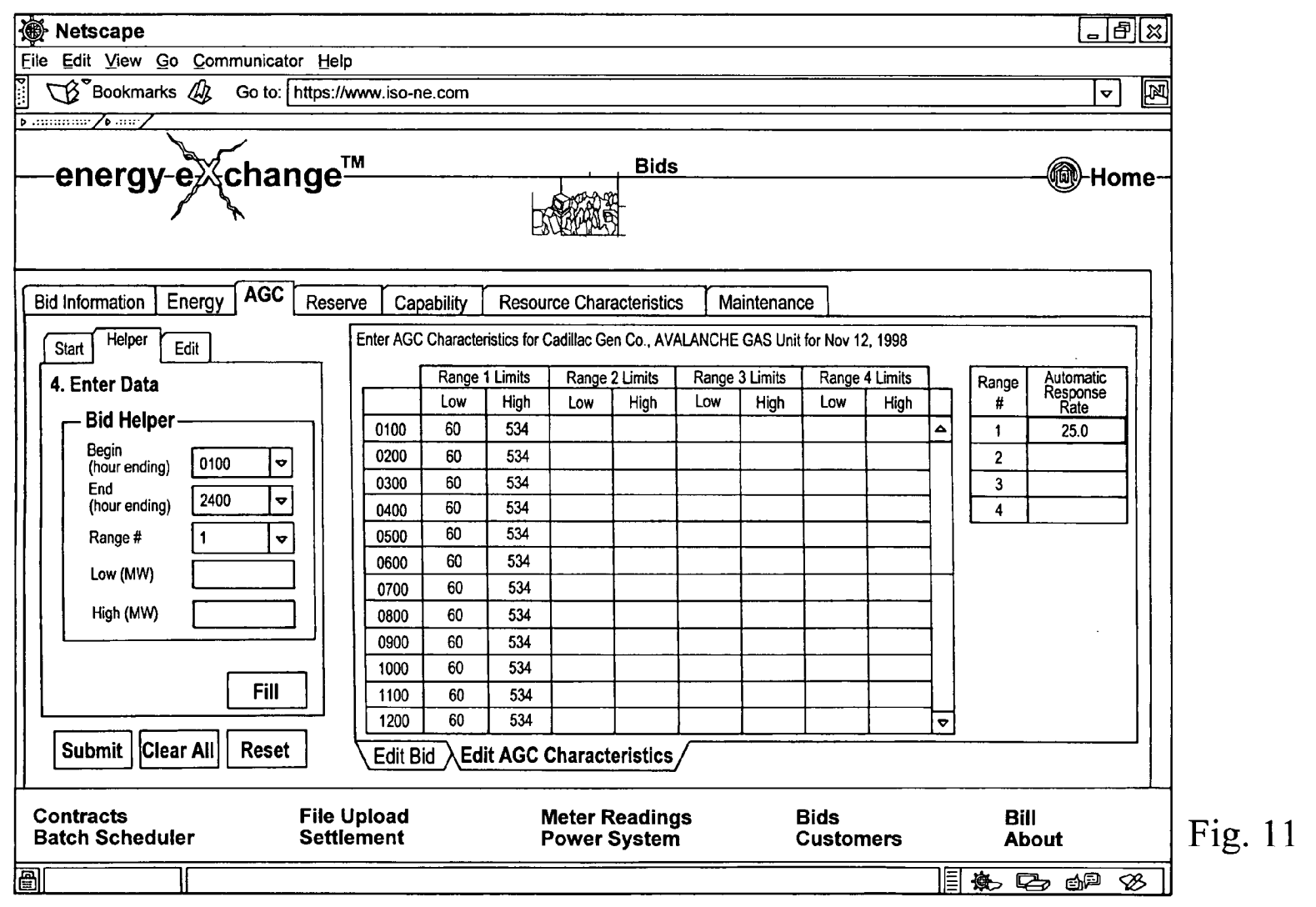

Bids for other market services may also be entered. FIG. 9 illustrates the display screen for the AGC market. Again, a start panel is displayed on the left side of the screen so that the customer can enter information. This information is submitted by activating the "Next" radio button which then displays the screen shown in FIG. 10. On the left side of the screen is a helper panel that prompts the customer for bid information. In this particular example, the bid price has been selected at $22 per hour as shown on the right side of the display. The customer is also able to edit the characteristics of the unit by selecting the "Edit AGC Characteristics" tab 1001 at the bottom of the right side of the display. FIG. 11 illustrates the "Edit AGC Characteristics" panel. Again, a helper panel on the left side of the screen allows the customer to enter data quickly, if desired, otherwise the customer can enter information directly on the right side of the display.

FIGS. 12–15 illustrate the display screens for the other market services, i.e., reserve and capability, and are similar to those already described and thus need not be described in further detail.

Figure 16:
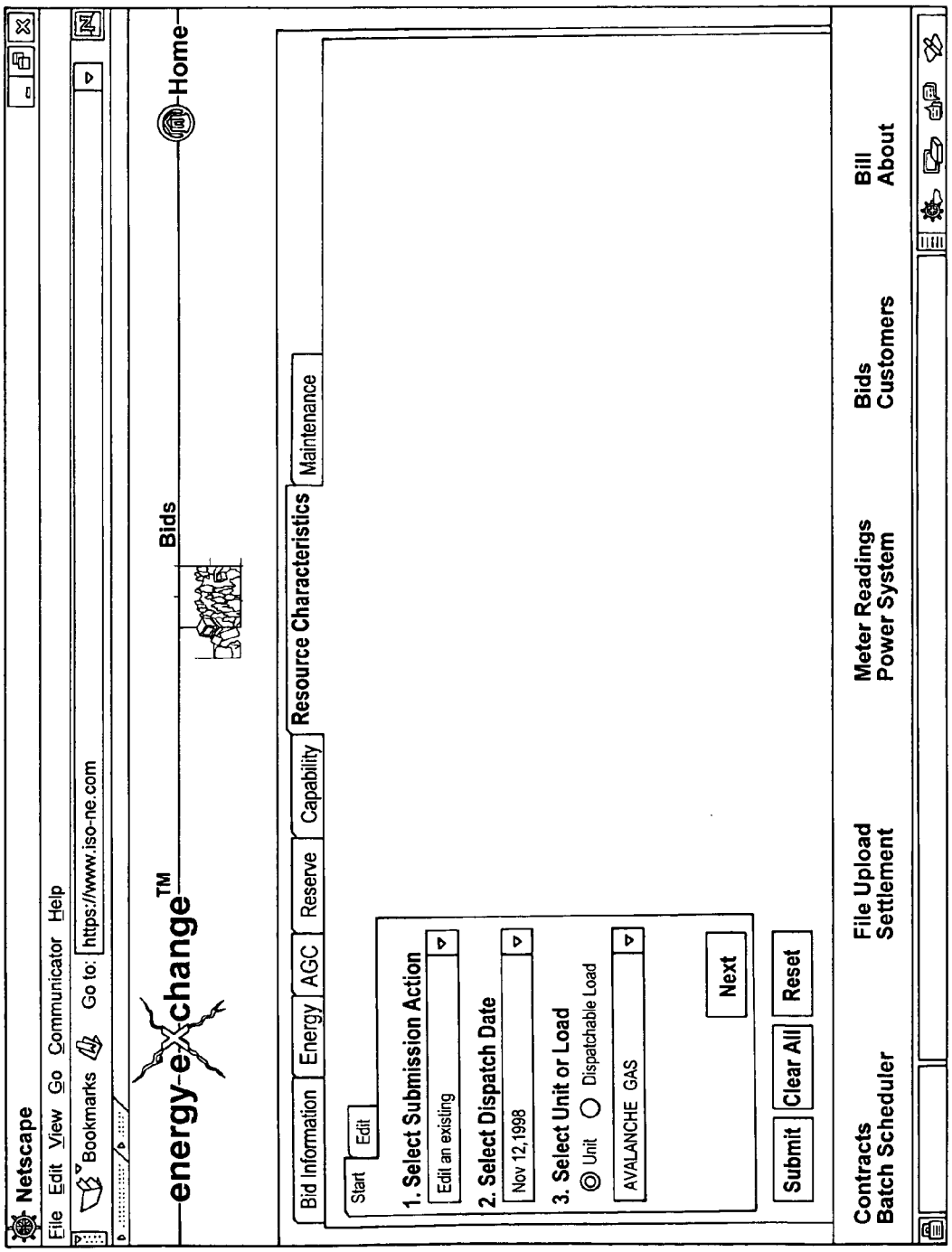
Figure 17:
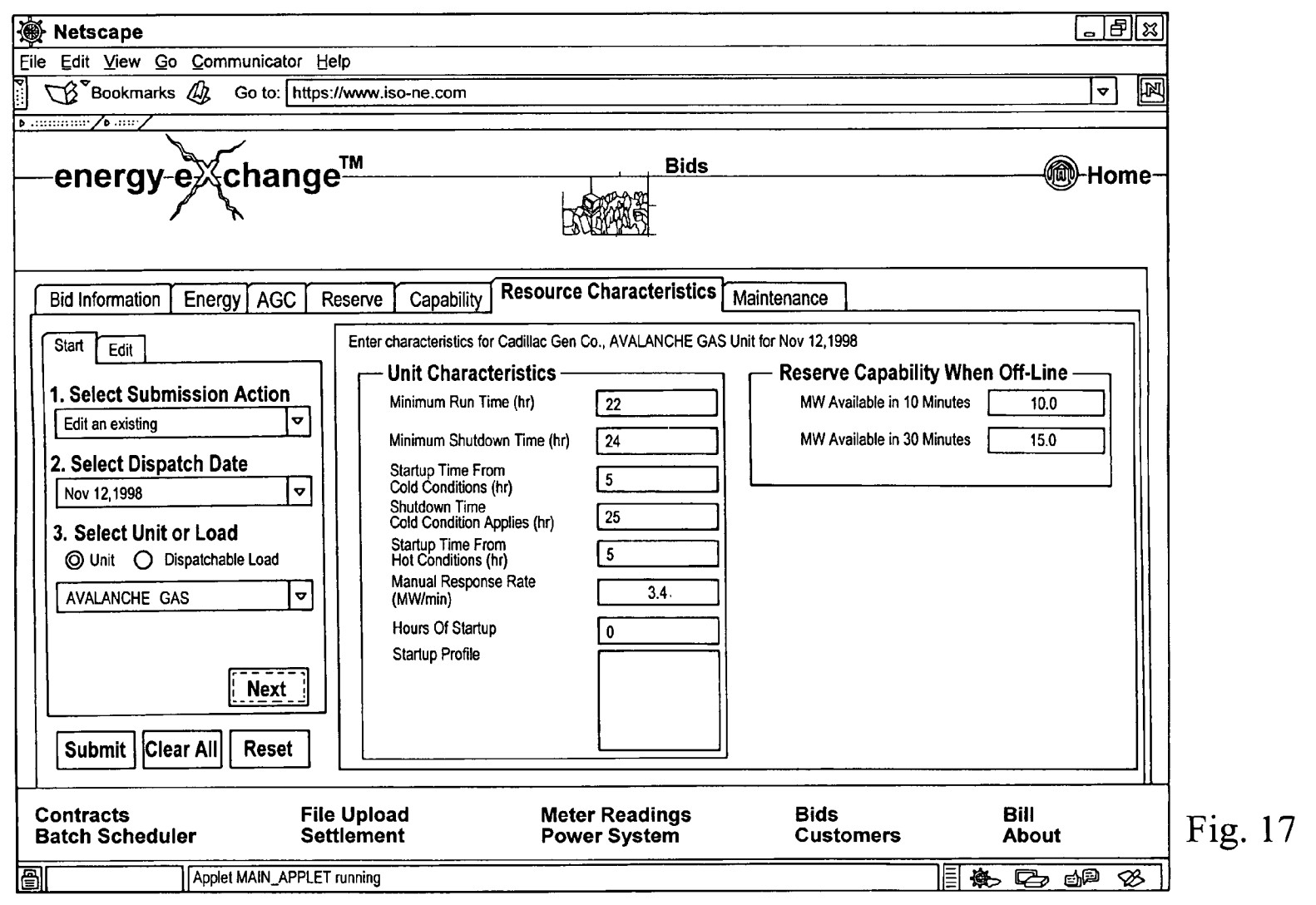
Figure 18:
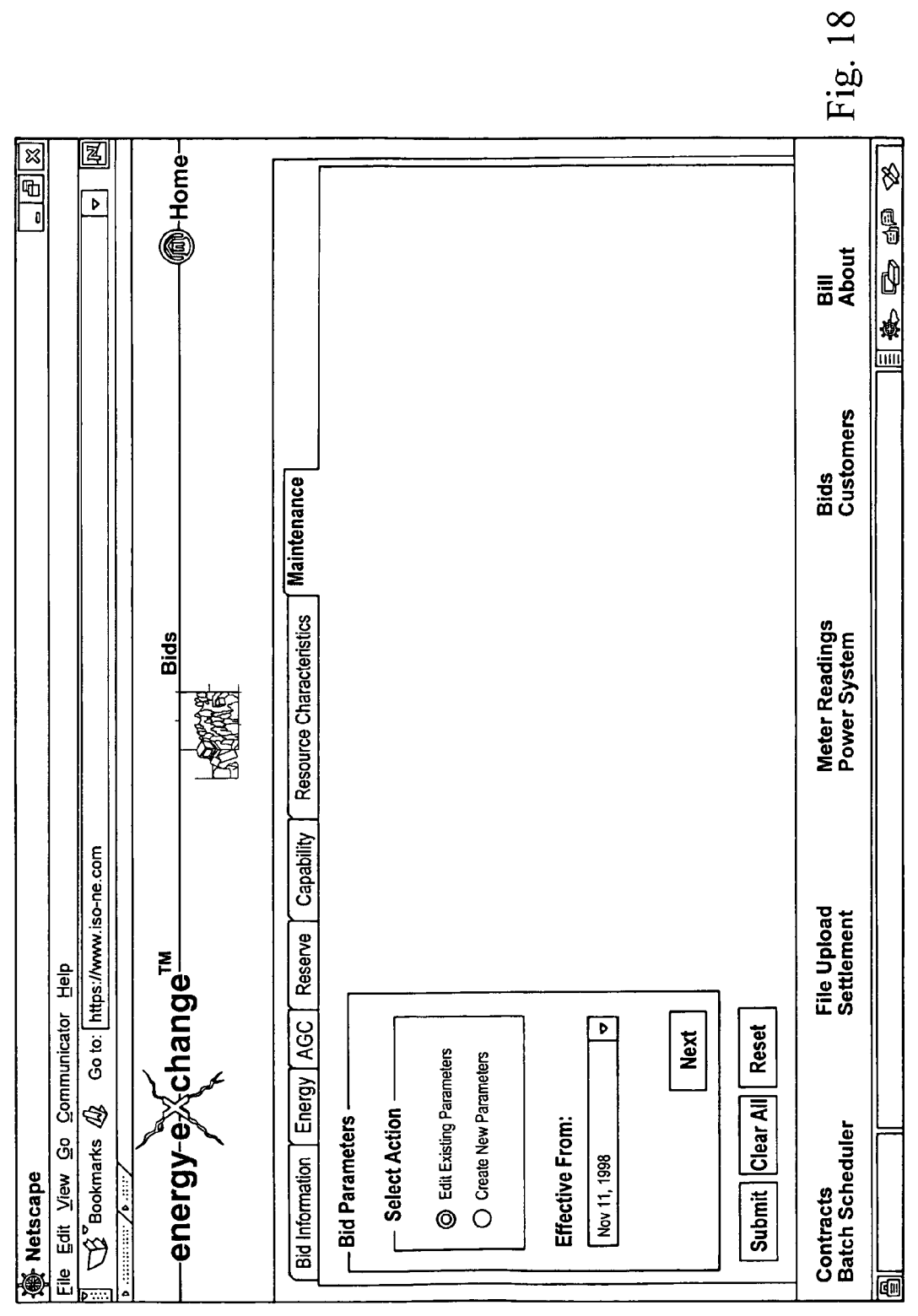
Figure 19:
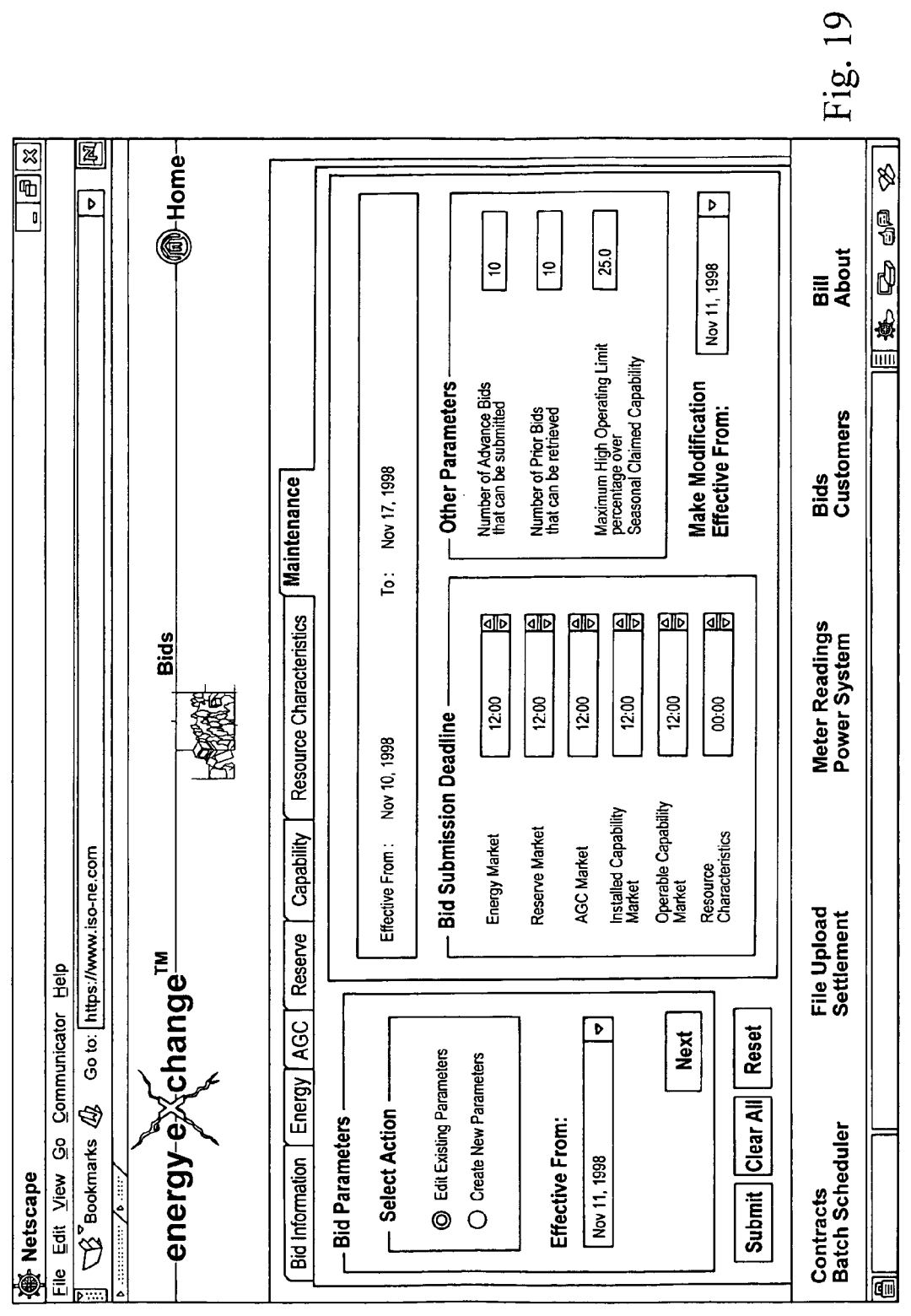

FIG. 16 illustrates the resource characteristics panel of the bid component. In this example, the customer has selected to edit the characteristics of an existing unit, the Avalanche Gas unit. In response to this action, the display screen shown in FIG. 17 is displayed and from that screen the customer can change existing parameters such as minimum run time, minimum shutdown time, etc. Depending on the access provided to the customer, various tabs will be enabled or disabled. For example, the maintenance tab of the bid component is preferably enabled only for market operator internal users, i.e., customers that make up the market operator. FIG. 18 illustrates the maintenance tab of the bid component. From this screen, the market operator can edit existing parameters or enter new parameters. In this example, the market operator chooses to edit existing parameters. In response, the display screen shown in FIG. 19 is displayed. As can be seen, the market operator can edit various parameters, that control the bidding process such as bid submission deadlines and the number of bids that can be entered in advance.

Thus, the bid component allows customers to enter bids up to a daily trading deadline applicable for the market. In addition, it also allows customers to enter bids up to a predefined number of days in advance and allows customers to create a new bid using an existing bid for a day up to a predefined number of days prior. Furthermore, the bid component provides the market operator the ability to enter bids on behalf of customers. This provides a contingency measure if customers experience communication or hardware problems. The bid component records the bid entry type for each bid submitted. The bid entry types include bids entered by customer, default bids generated by the bid component and bids entered for the customer by the market operator.

The bid component is also responsible for creating default bids for each market service other than operable capability and installed capability. For each active unit without a bid submitted for the scheduled dispatch period, a default bid is created. The default bid is a replica of a bid from a previous scheduled dispatch period bid for that unit. If an active unit exists in the market but a bid for the previous scheduled dispatch period does not (i.e., a new customer has not submitted a valid bid) then an ERROR is logged and no default bid is created.

Bids can be either on a customer by customer basis or an asset by asset basis, depending on the prevailing business rules. However, the bid component itself is not limited in any way to a fixed number or type of market services, and the bids need not be only for electricity or ancillary services. For example, the bid component could readily accommodate bidding for natural gas or some other commodity. Additionally, the bid component could also incorporate demand-side bidding, giving the bid component complete bidding capability for any commodity auction. From any screen the customer can select a component either from the icons located at the bottom of the screen that are always displayed or by returning to the home page shown in FIG. 4.

Figure 24:
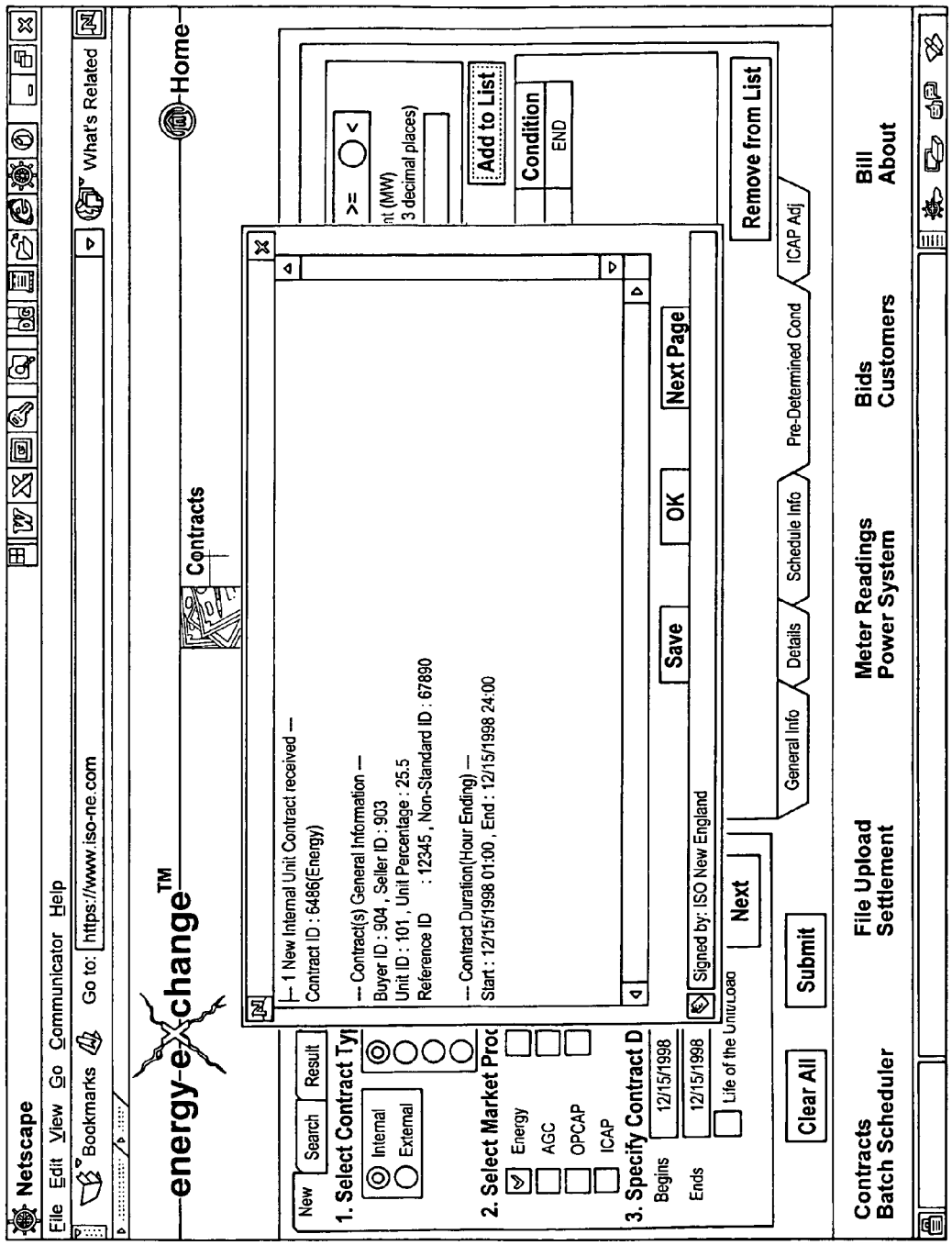
Figure 35:
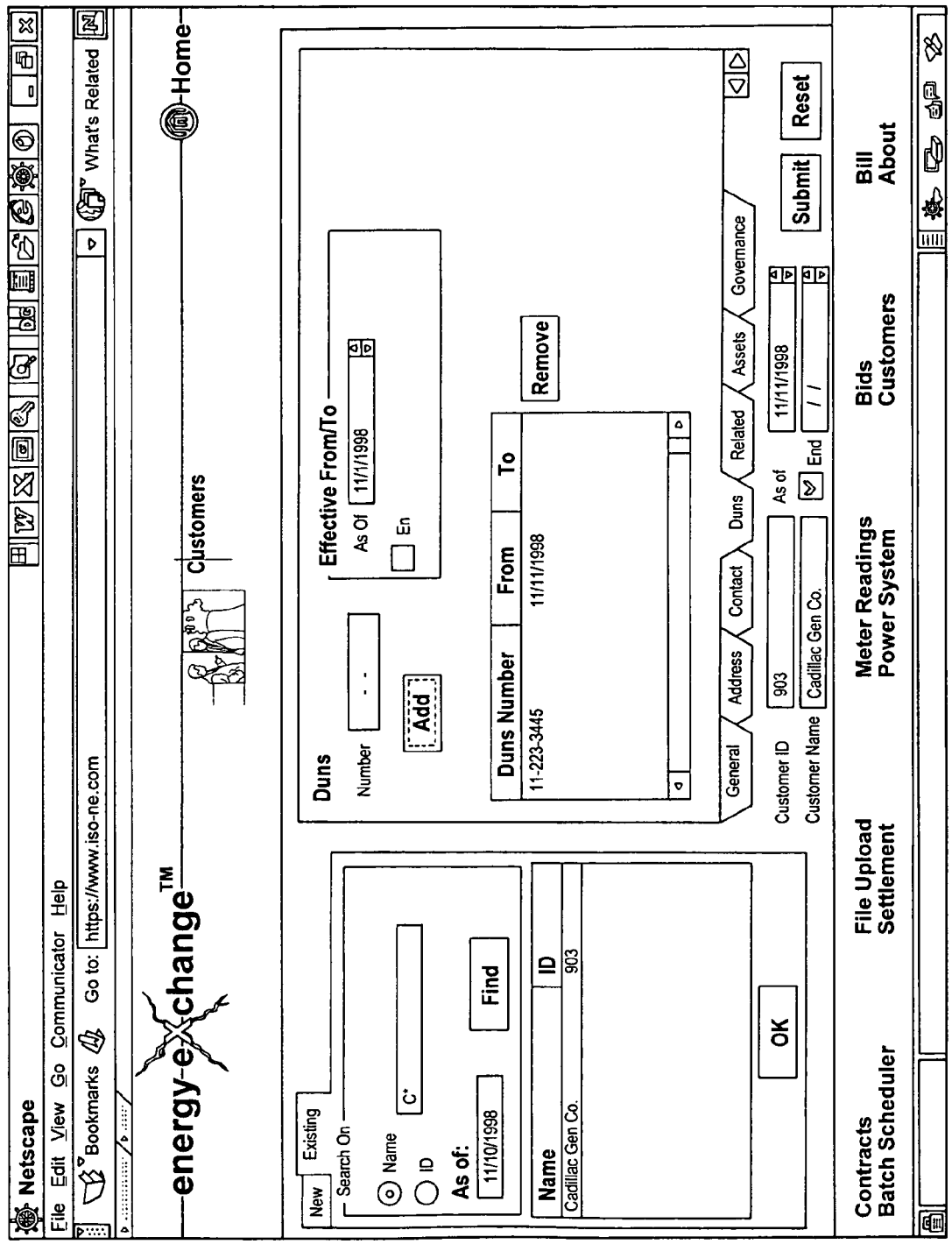

The contract component 206 supports the ability to create various contracts including external system, external unit, internal system, internal assets and internal obligation contracts. In addition, the contract component enables a customer, an agent for the customer or the market operator to submit contracts via a bulk upload facility. FIG. 20 illustrates the beginning screen of the contract component where the customer selects the contract type, market service and duration of the contact as shown. After that information is entered, a general information panel is displayed on the right side of the screen as shown in FIG. 21. The general information screen indicates the parties to the contract and identification information. The customer can view details of a contract by selecting the "Details" tab at the bottom of the right side of the display. FIG. 22 is a display screen of the details panel. In addition, the customer can view whether there are any predetermined conditions associated with a unit by selecting the "Pre-Determined Cond" tab. FIG. 23 is a display screen of the predetermined conditions panel. It can be seen from FIG. 23 that the unit's availability is a predetermined condition of the example contract. The customer submits the contract by activating the "Submit" radio button and a confirmation screen as shown in FIG. 24 is displayed confirming that the contract was received as well as particular parameters of the contract. The contract illustrated in FIGS. 21–24 was for an internal contract type. Next, an external contract type will be described with reference to FIGS. 25–28. FIG. 25 illustrates a display screen for entering contract information for an external contract. FIG. 26 illustrates the "General Info" tab for the external contract and indicates the parties to the contract as well as identification information. FIG. 27 illustrates the details panel for the external contract where the customer can enter the contract information either directly on the right side of the screen or through the helper panel on the left side of the screen. In the particular example shown, the customer has contracted for 50 MW. The customer activates the "Fill" radio button and, as shown in FIG. 28, that information is filled on the right side of the screen. The customer can also view whether there are any predetermined conditions associated with the external contract by selecting the "Pre-Determined Cond" tab. FIG. 29 is a display screen of the predetermined conditions panel. The customer can also search for existing contract information through the search panel on the left side of the display as shown in FIG. 30. FIG. 31 is a display of the results of the search.

Figure 32:
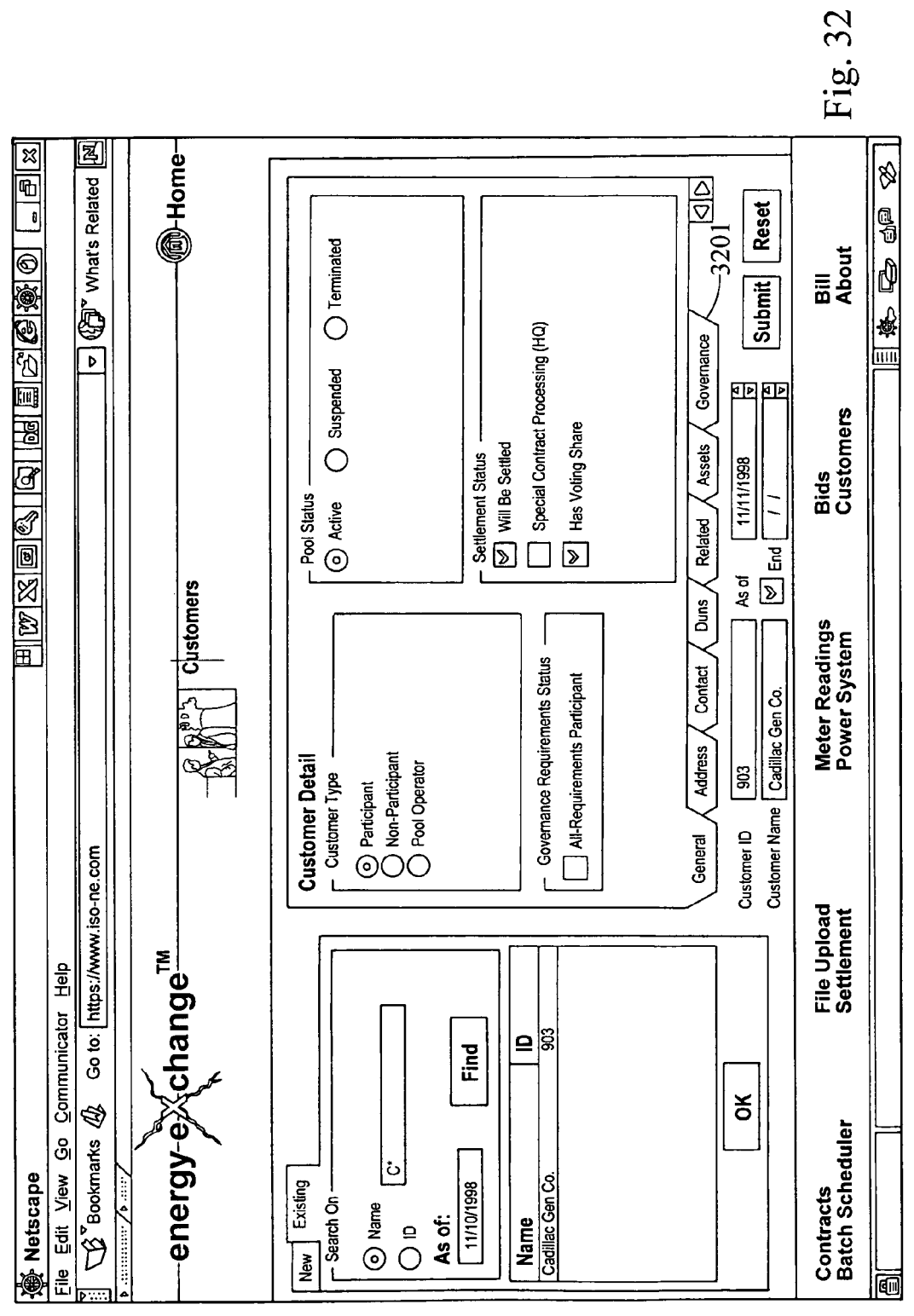
Figure 33:
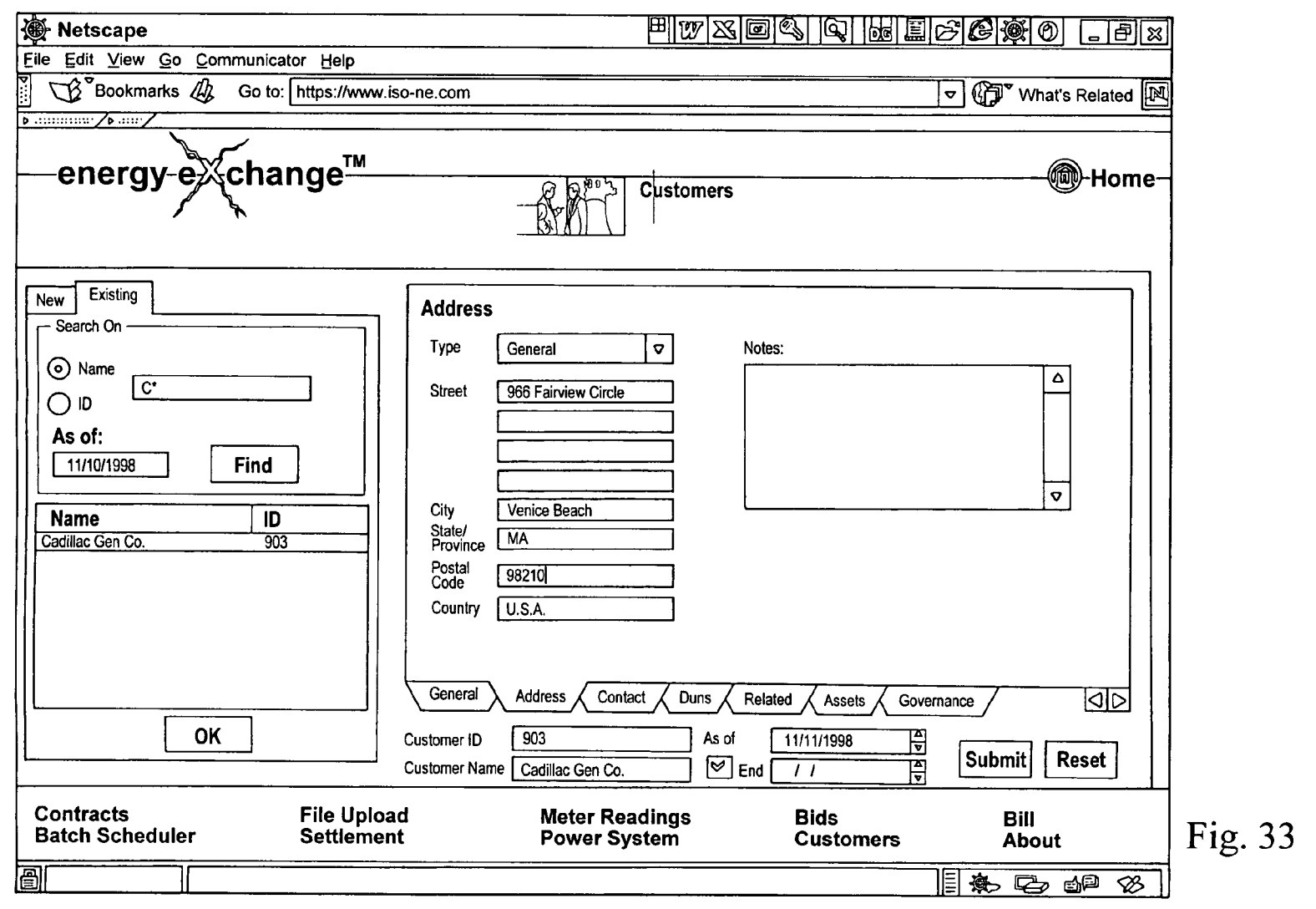
Figure 34:
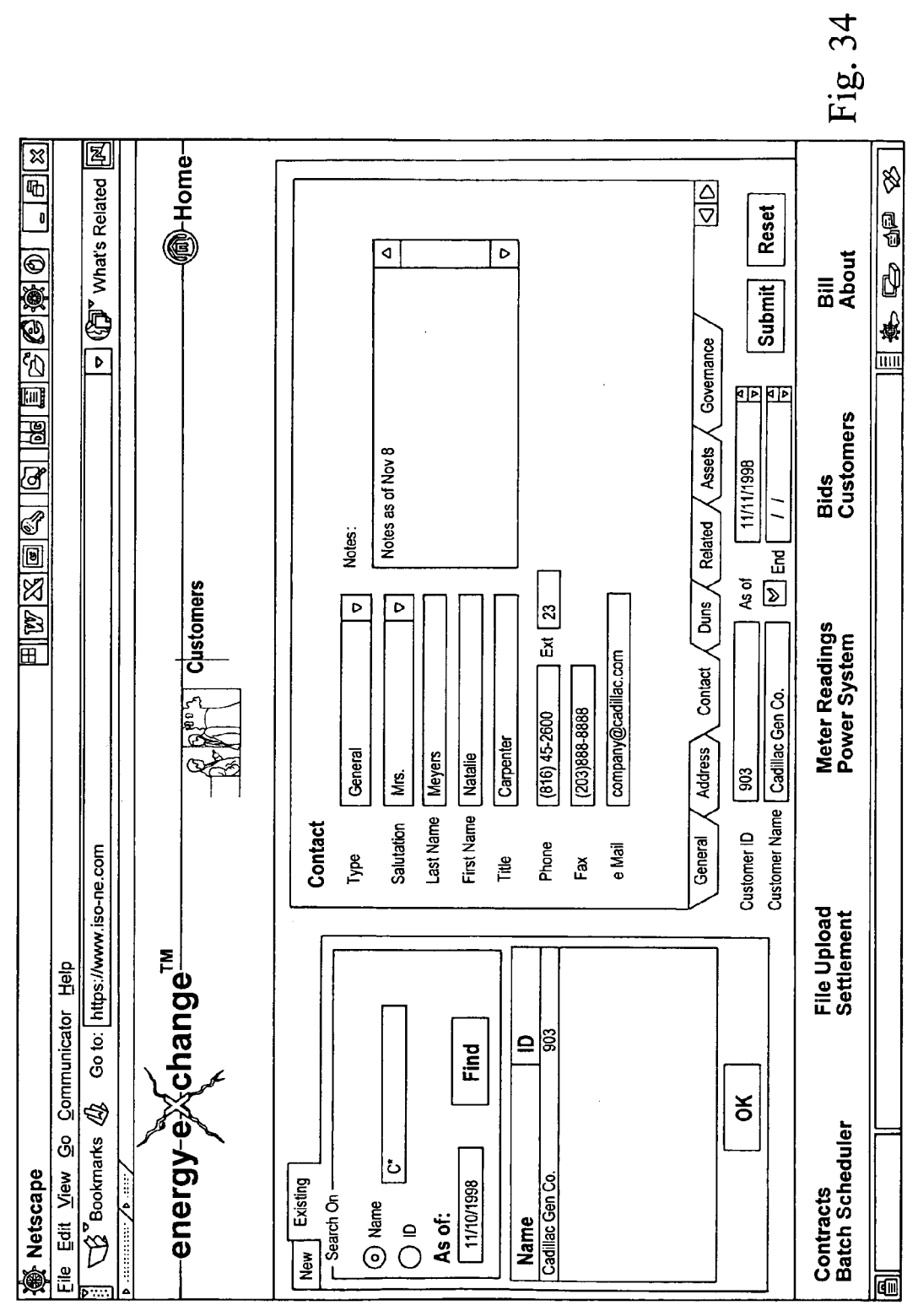
Figure 36:
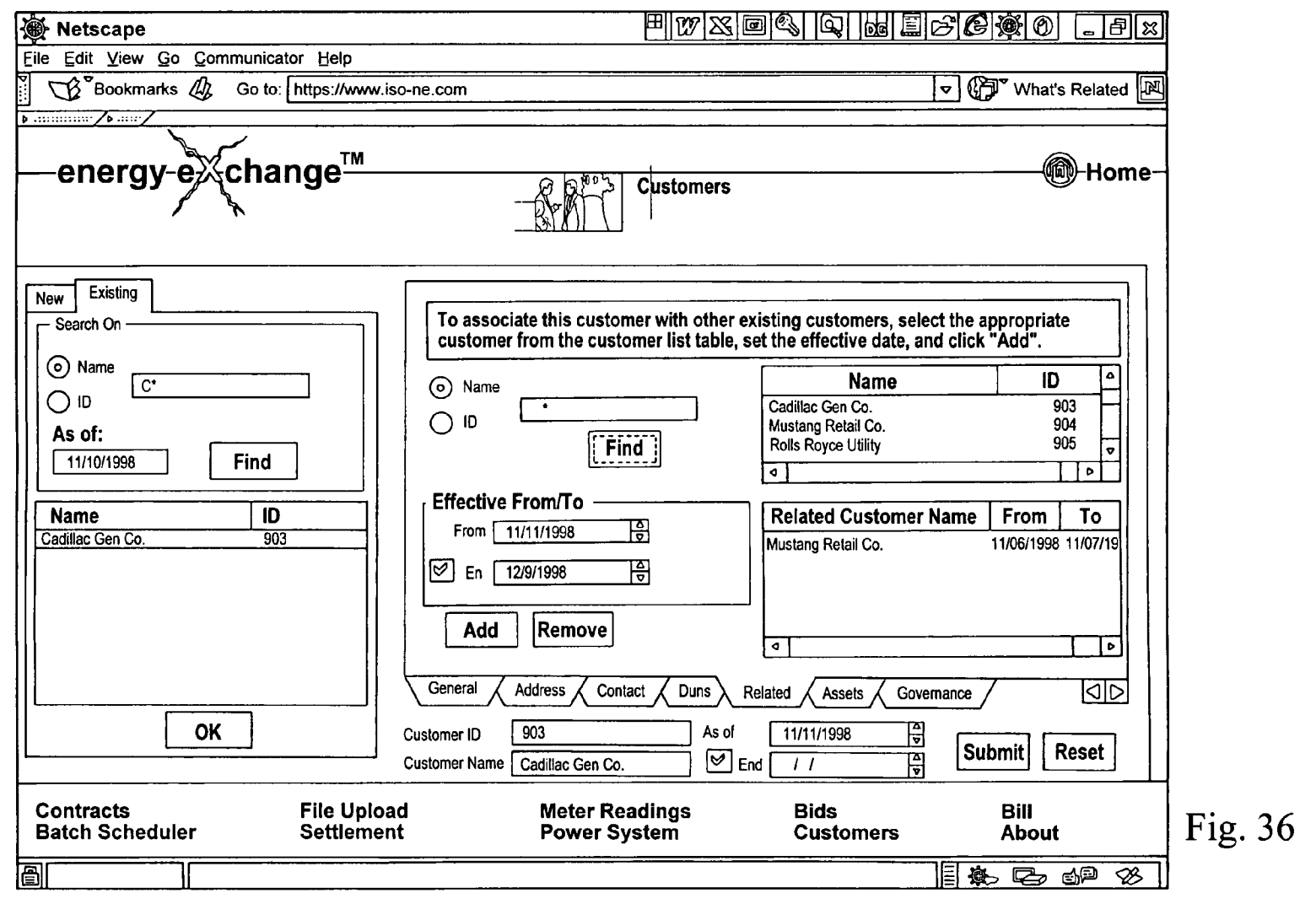
Figure 37:
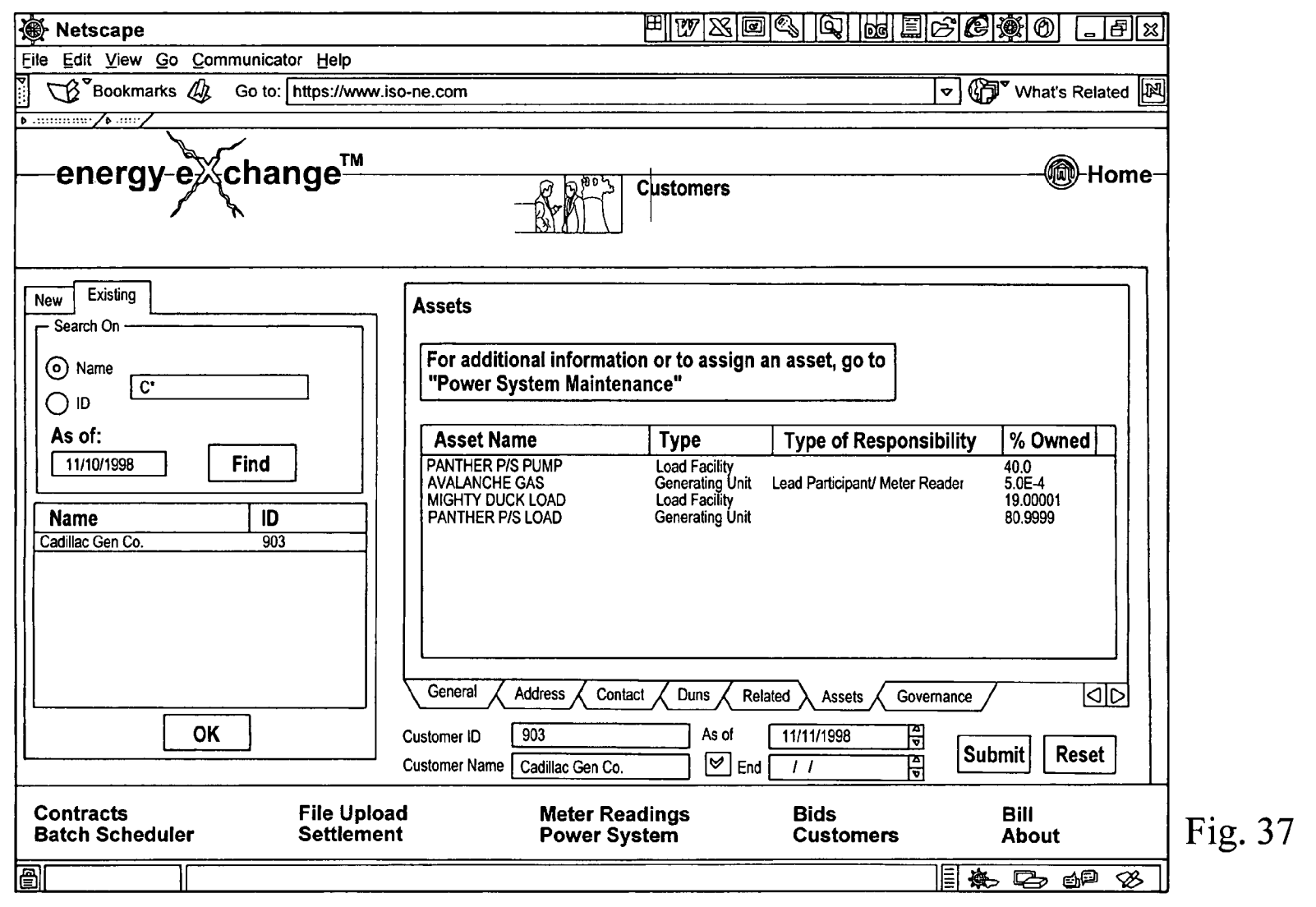
Figure 38:
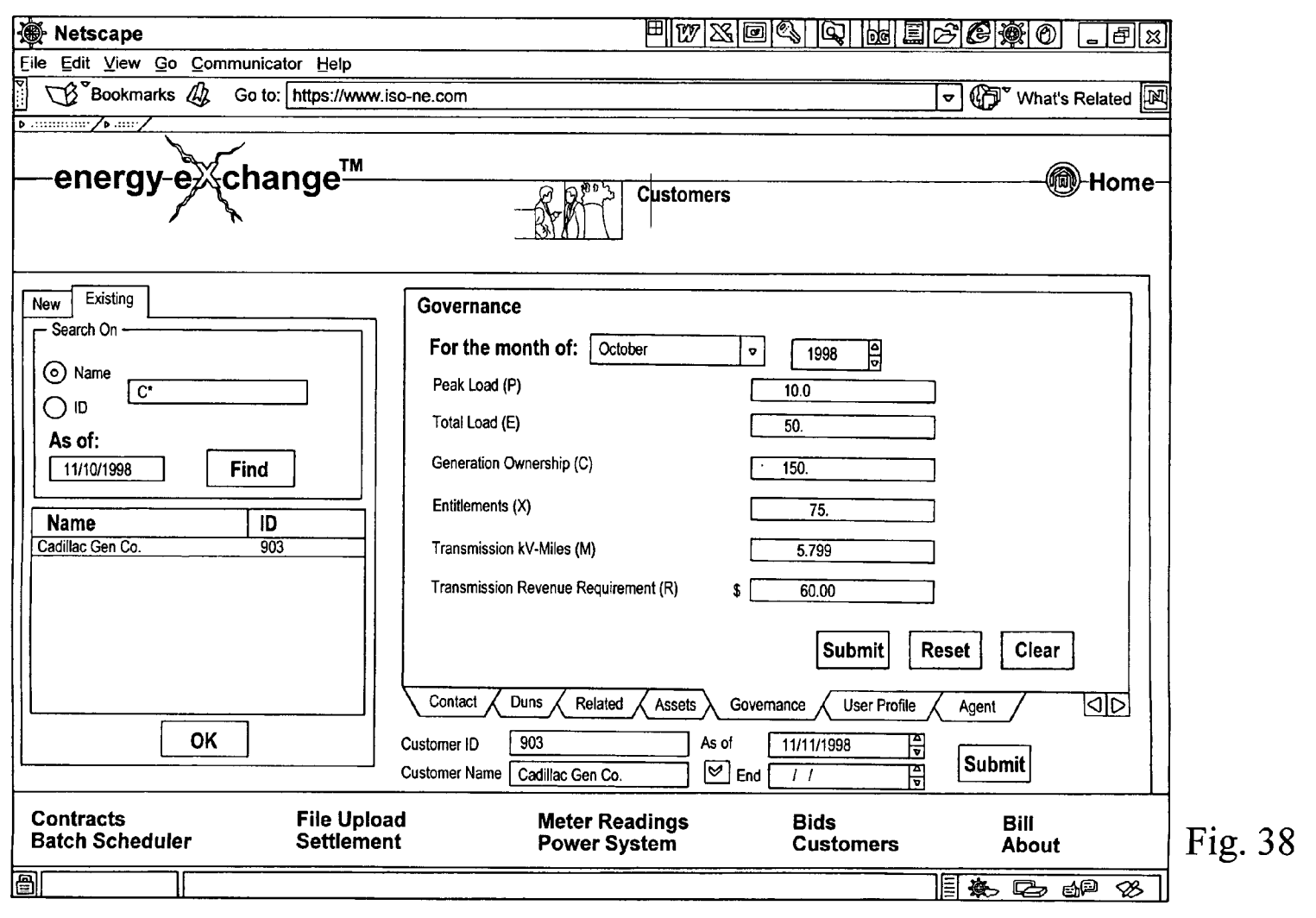
Figure 39:
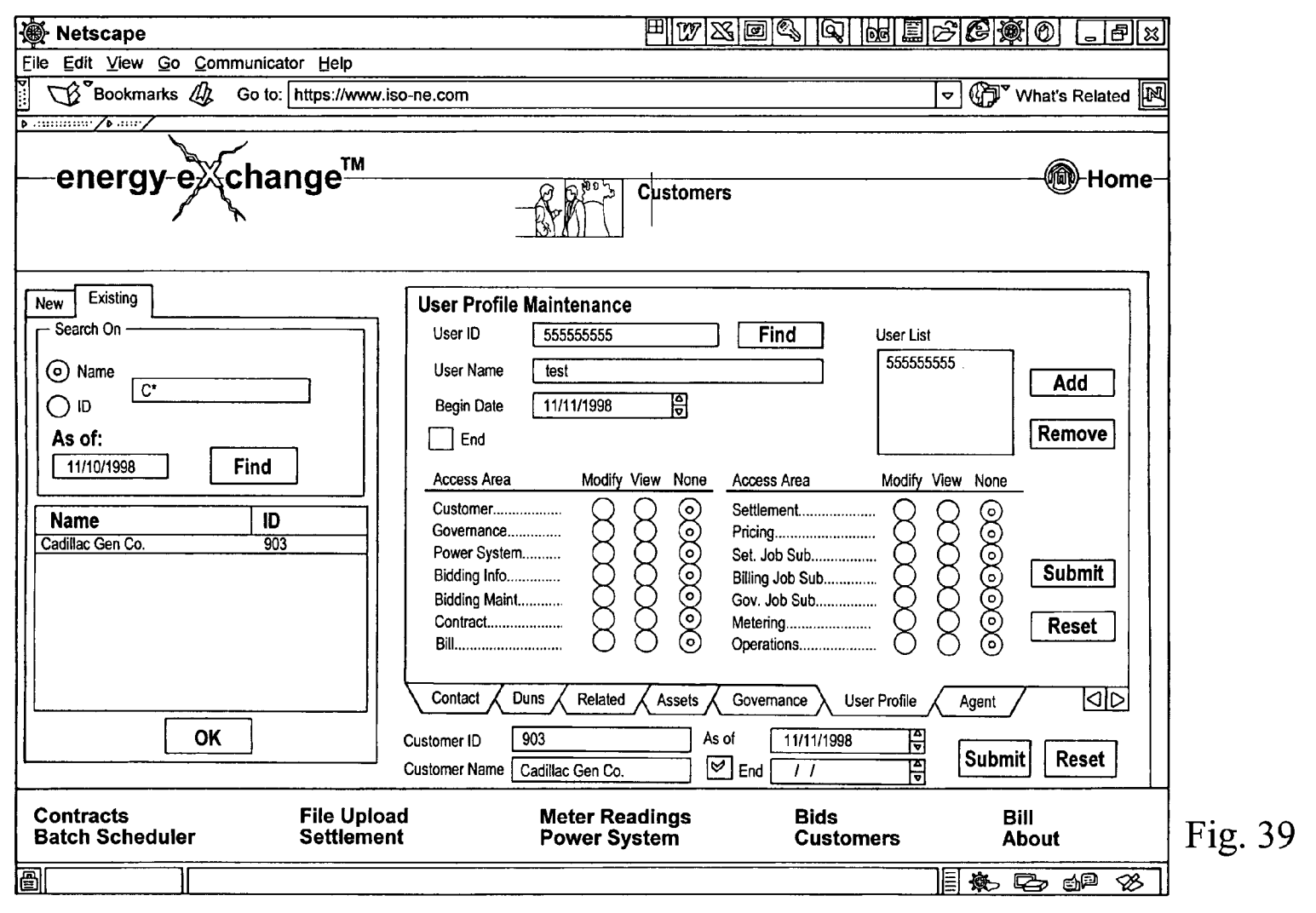
Figure 40:
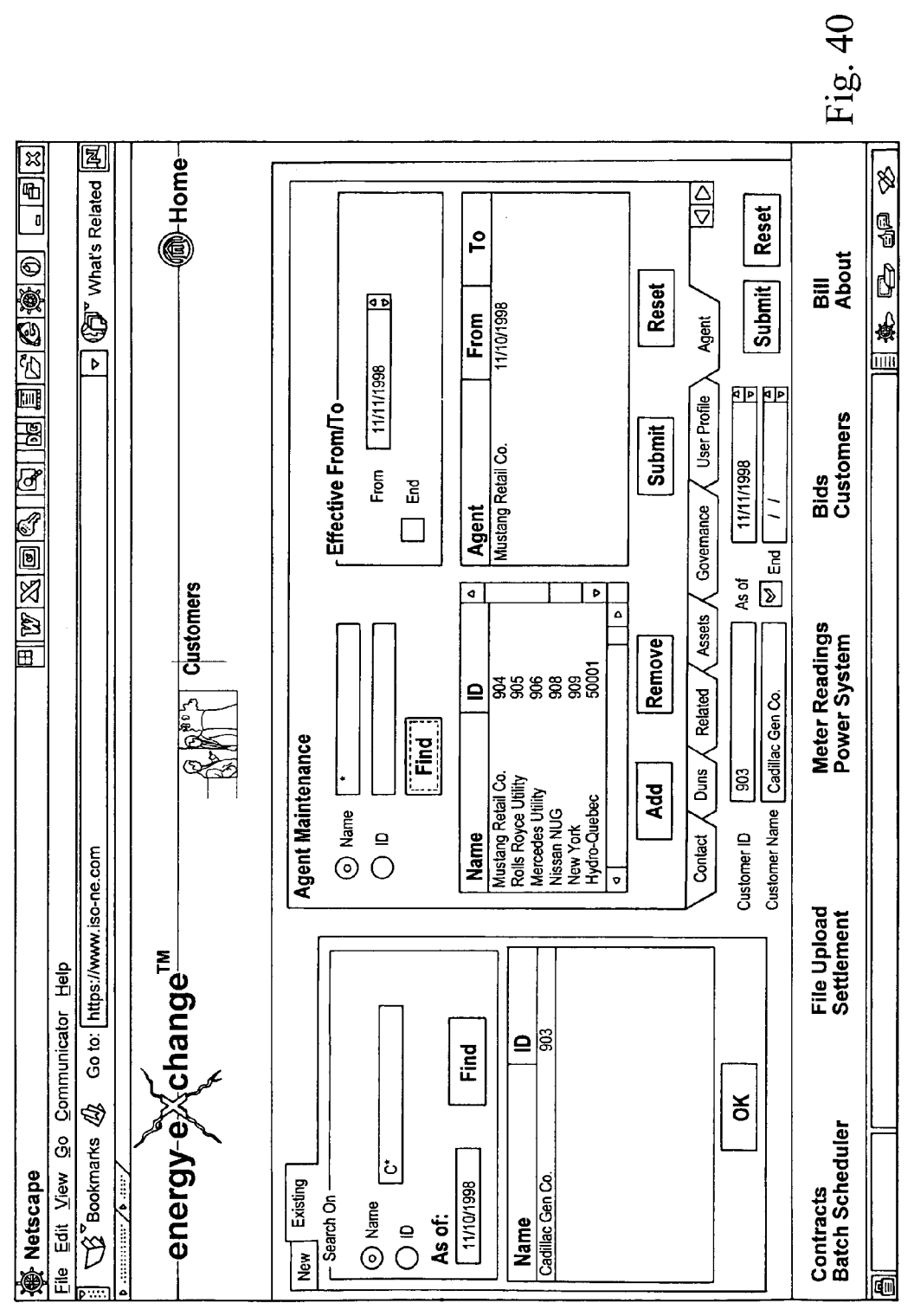

As previously described, the customer component 202 manages all information about the entities i.e., customers, that have a business relationship with the market operator. FIGS. 32–40 illustrate display screens associated with the customer component. FIG. 32 illustrates a display screen showing general information for an existing customer. As shown, a search was entered for customer names that begin with the letter "C". The Cadillac Generator Company was retrieved and on the right side of the screen, information concerning the Cadillac Generator Company is displayed. In particular, the type of customer, its status in the pool and its settlement status are displayed. Additional information concerning a customer can be viewed by selecting a tab 3201 from the bottom of the right side of the display. FIGS. 33–40 show the various display screens, that can be viewed. These display screens provide information concerning a customer's address, contact information, DUNS information, any related information, asset information, governance information and user profile which dictates what rights the customer has to view or modify particular information, and agent maintenance information. The customer component is preferably accessible only by market operator internal users, i.e., the market operator.

As previously described, the power system component 214 maintains the model of the power system as it exists for physical and financial market settlement. The power system includes three primary elements: assets (generating units, loads, and tie lines), network nodes (a grouping of assets), and network areas (a grouping of network nodes). The power system component entitles the entry and maintenance of generating unit, load facility, tie line, network node, network area characteristics. These characteristics describe various aspects of each element. In addition, the power system component 214 enables the entry and maintenance of asset data and the relationships between assets.

Figure 41:
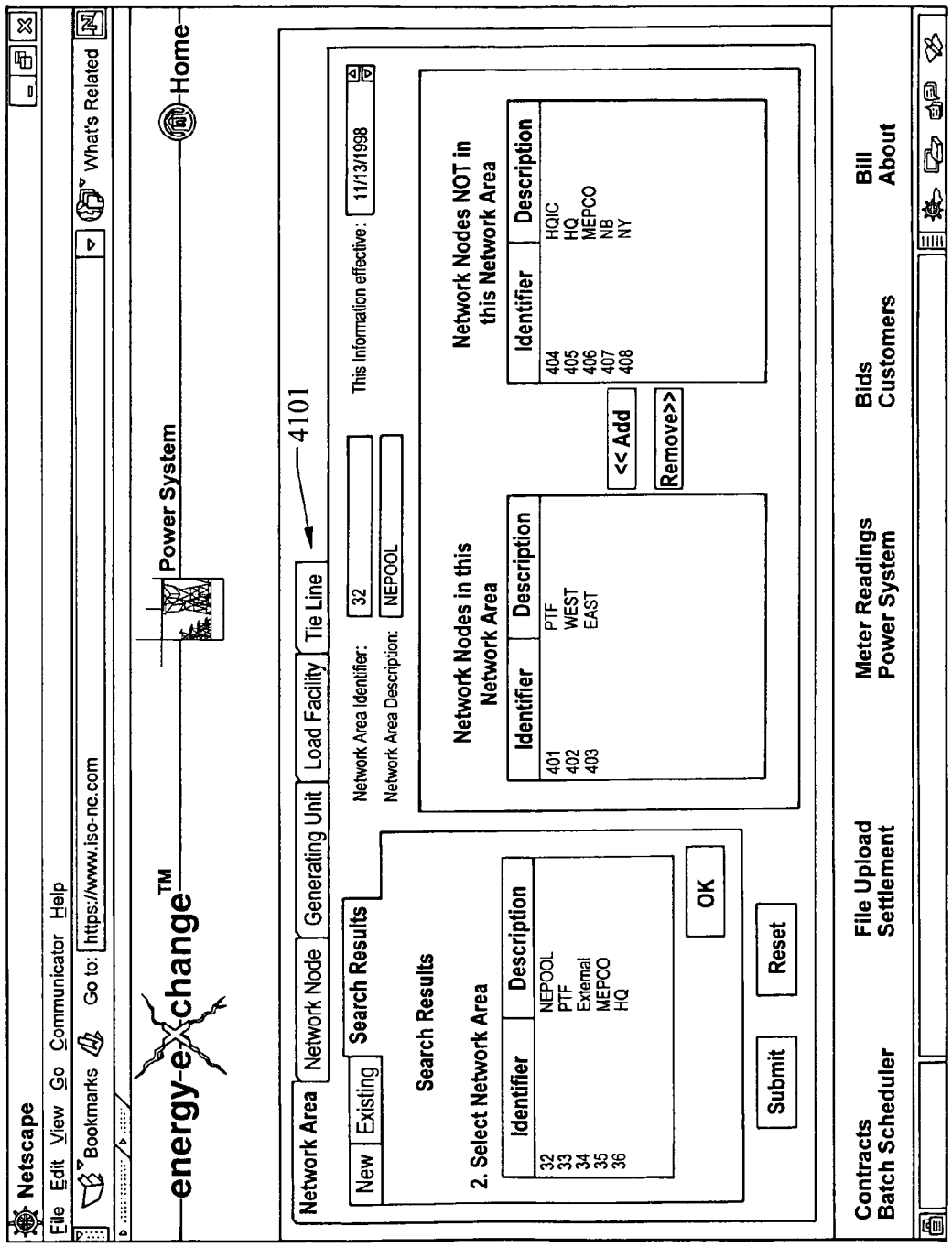
Figure 43:
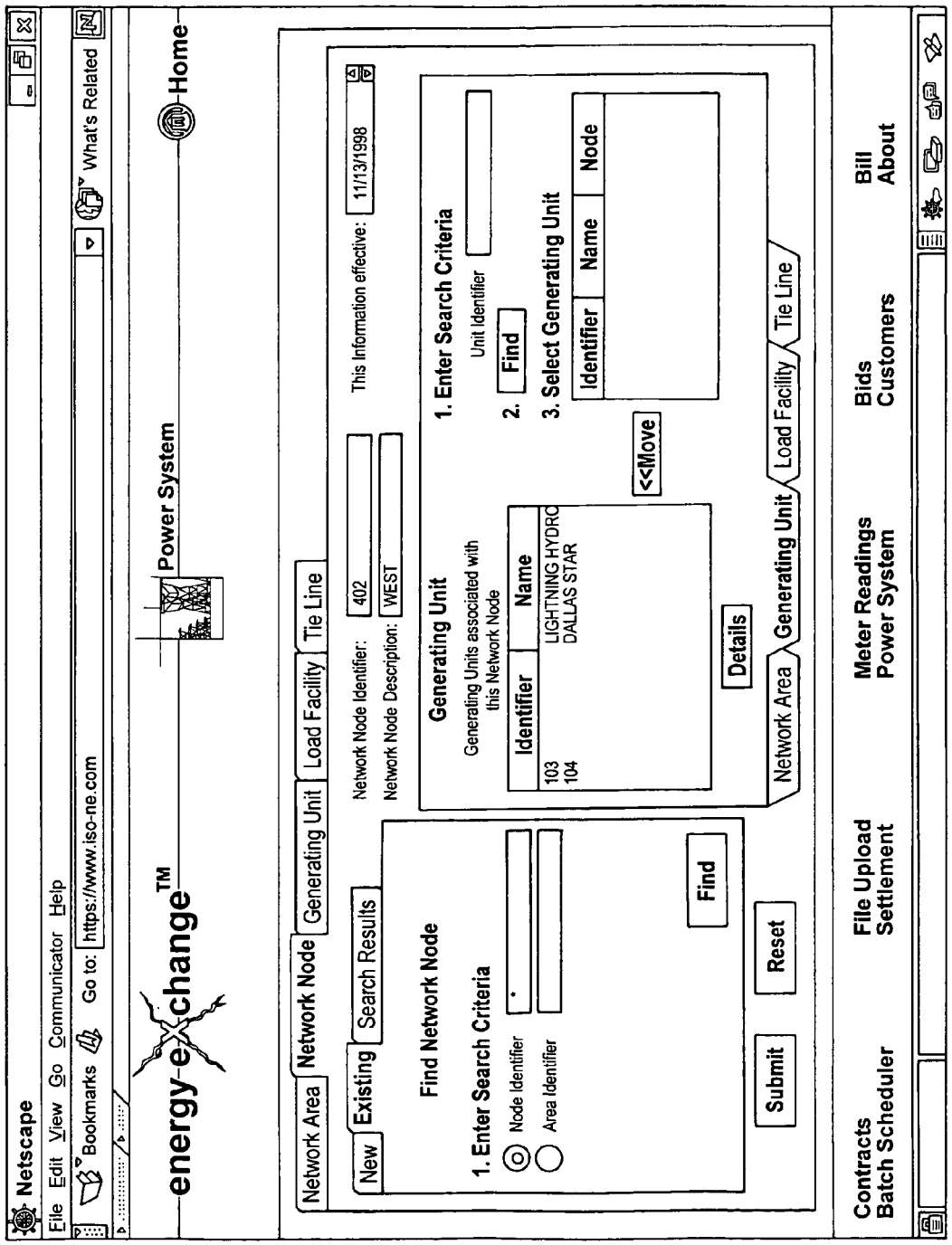
Figure 44:
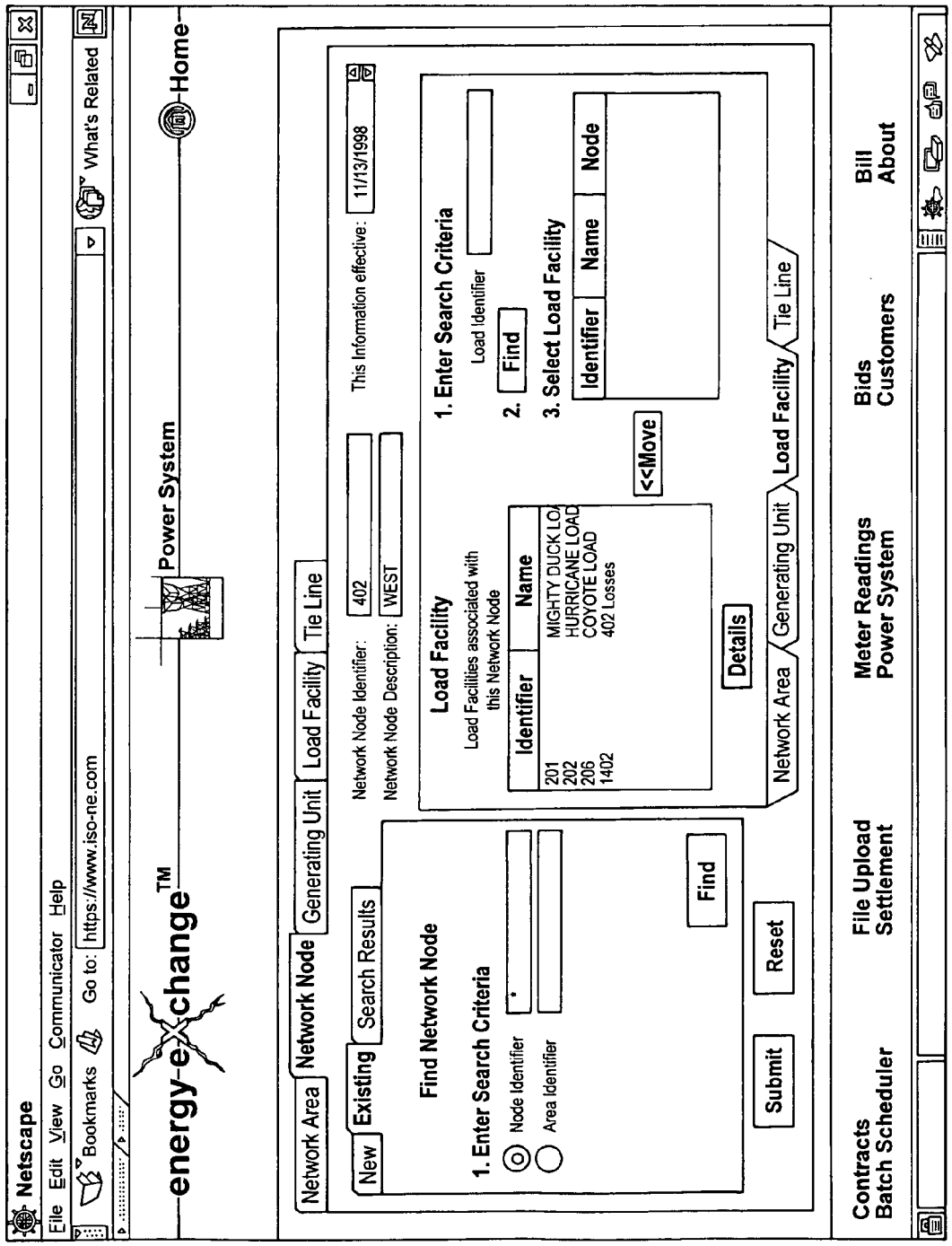
Figure 45:
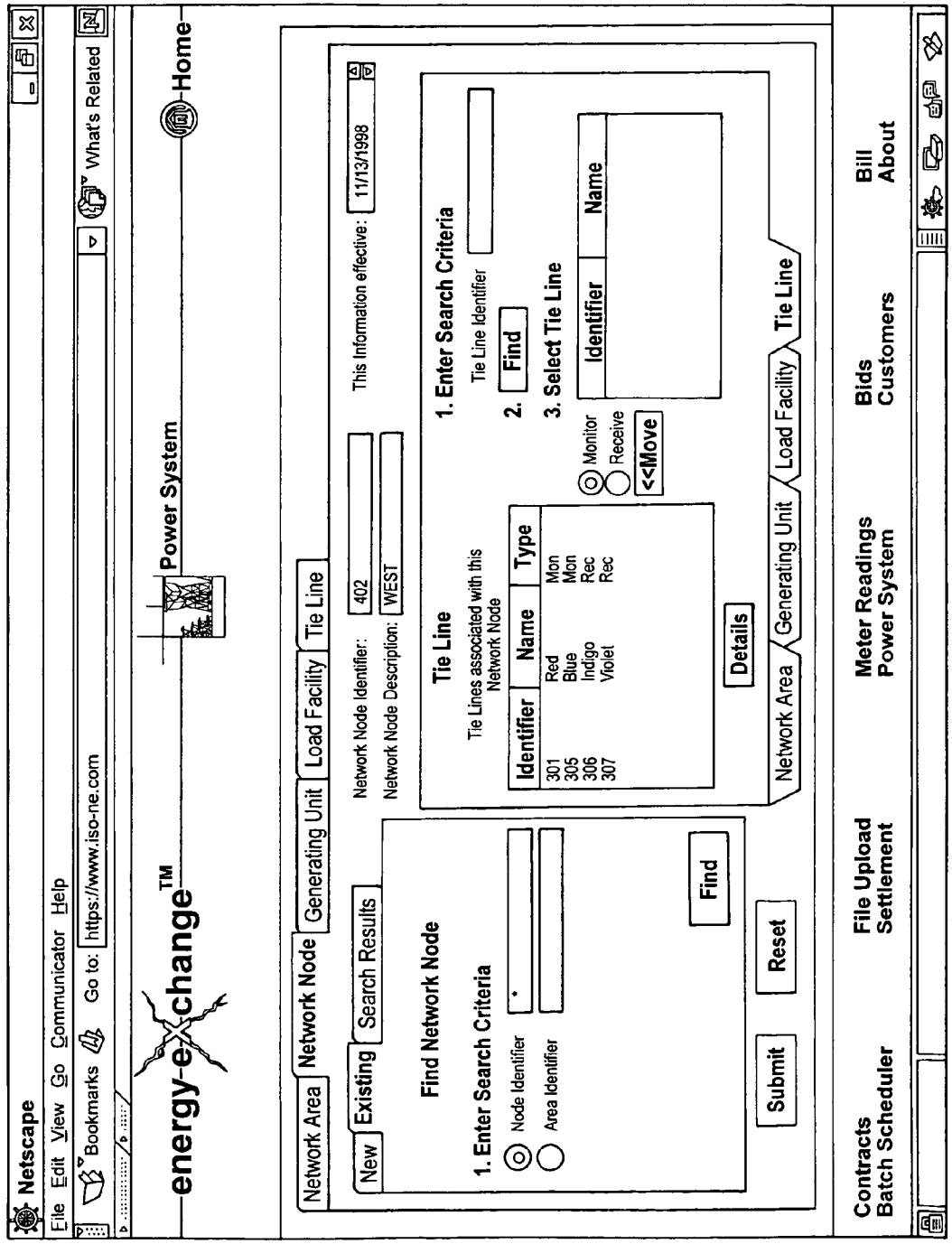
Figure 46:
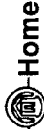
Figure 47:
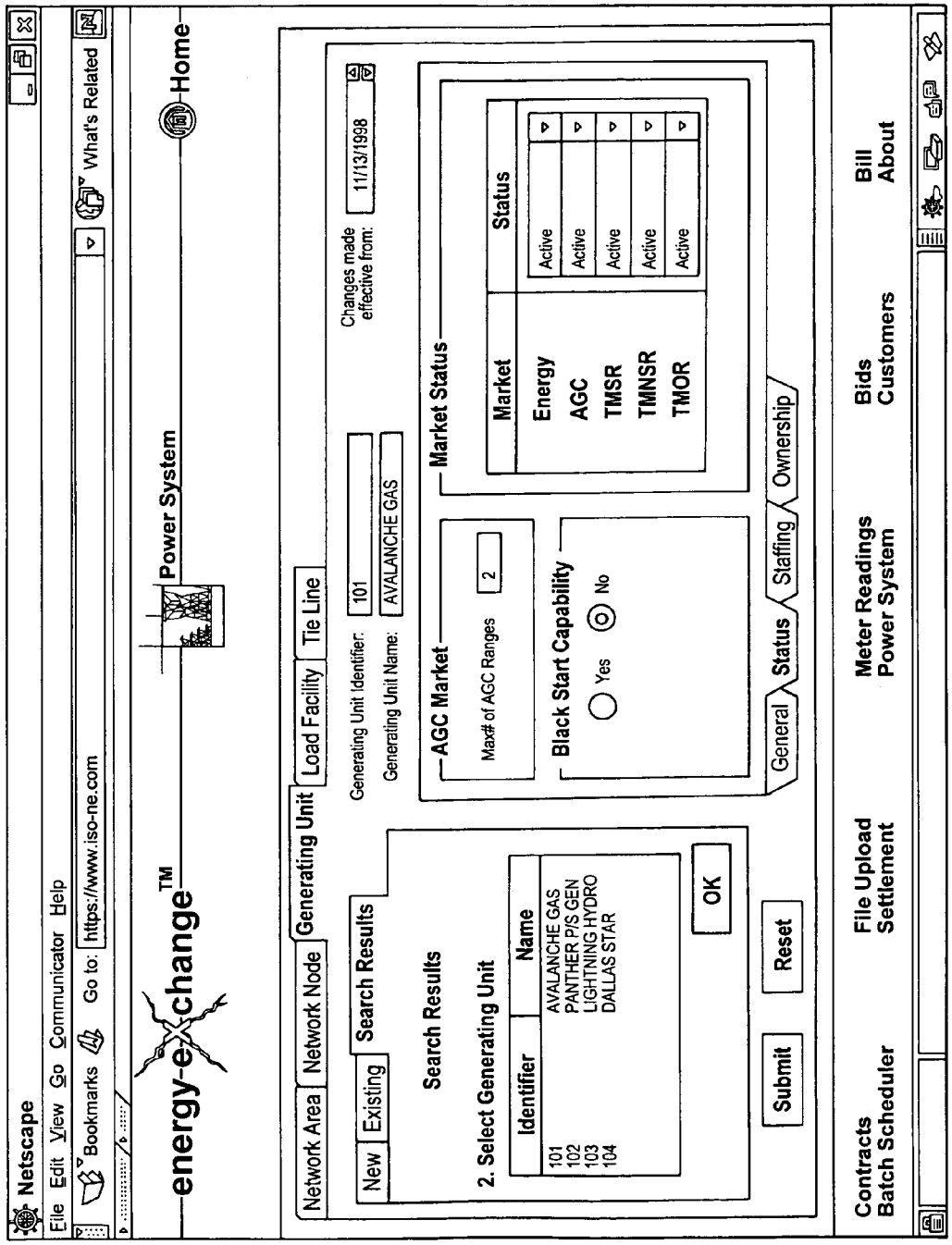
Figure 51:
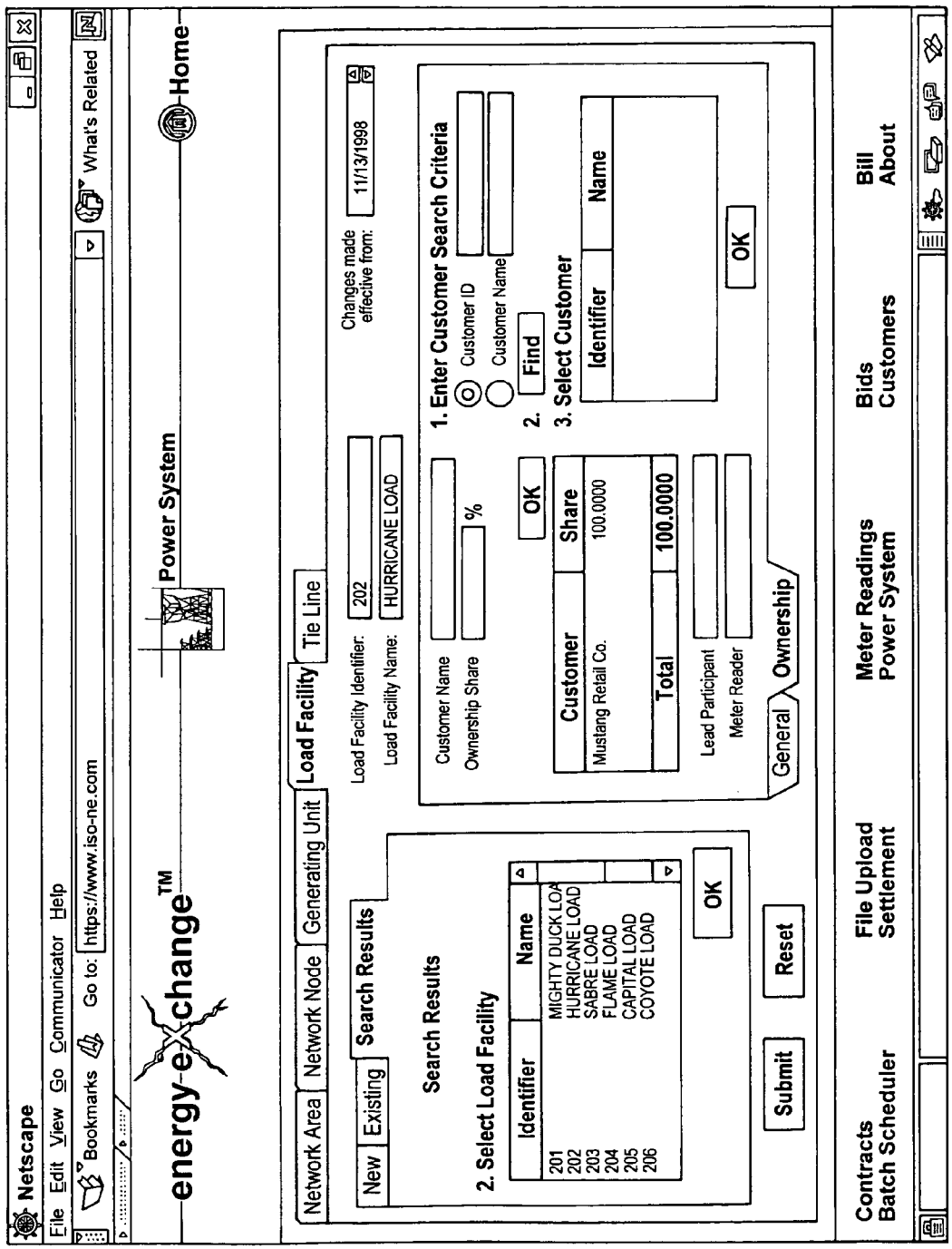
Figure 52:
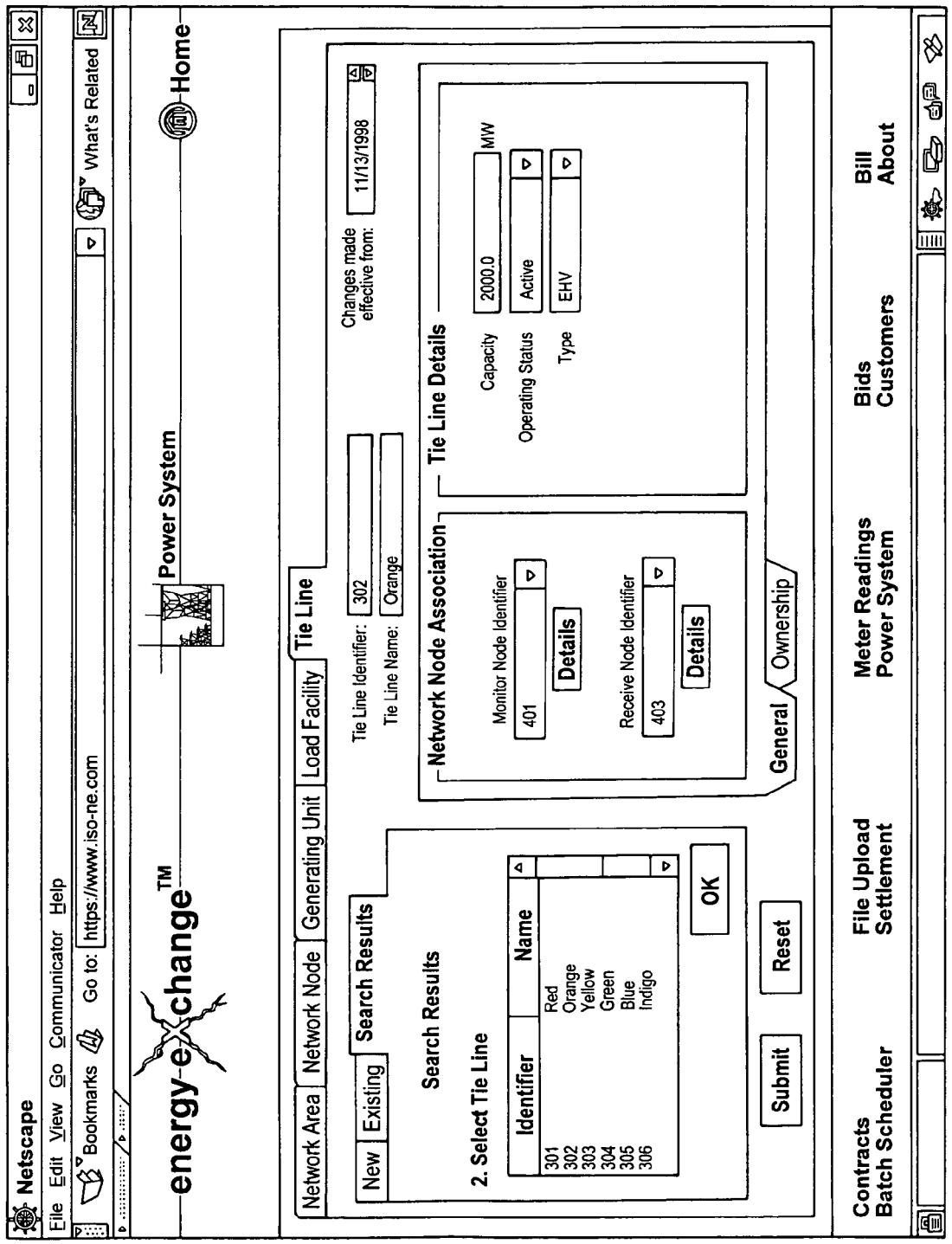
Figure 53:
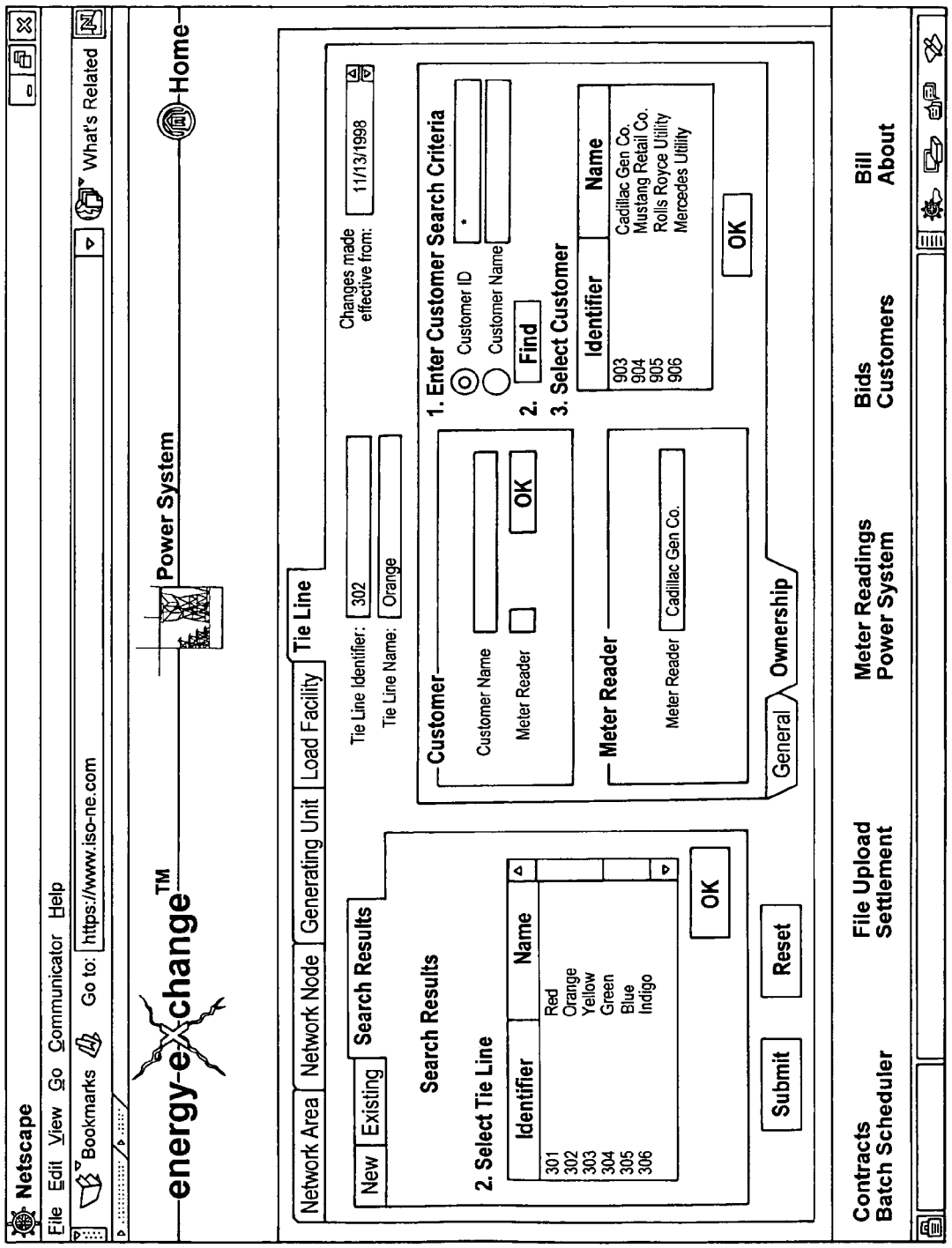

FIGS. 41–53 illustrate the display screens associated with the power system component. Preferably only market operator internal users have access to this component. As can be seen in FIG. 41, from the top tab line 4101 the customer can select display screens for the network area, network node, generating unit, load facility and tie line. FIG. 41 is a display screen of search results for a network area. As can be seen on the right side of the screen, the network nodes that are inside and outside the network area are displayed. FIG. 42 is a display screen for an existing network node indicating the network areas associated with that node. FIGS. 43–45 are display screens of the generating units, load facility and the tie lines associated with the node, respectively. FIGS. 46–49 are display screens indicating information concerning a generating unit. The screens are self explanatory and thus need not be described in greater detail. FIGS. 50–53 are display screens associated with a load facility and tie line respectively. Thus, through the power system component, the entire marketplace is modeled.

Figure 55:
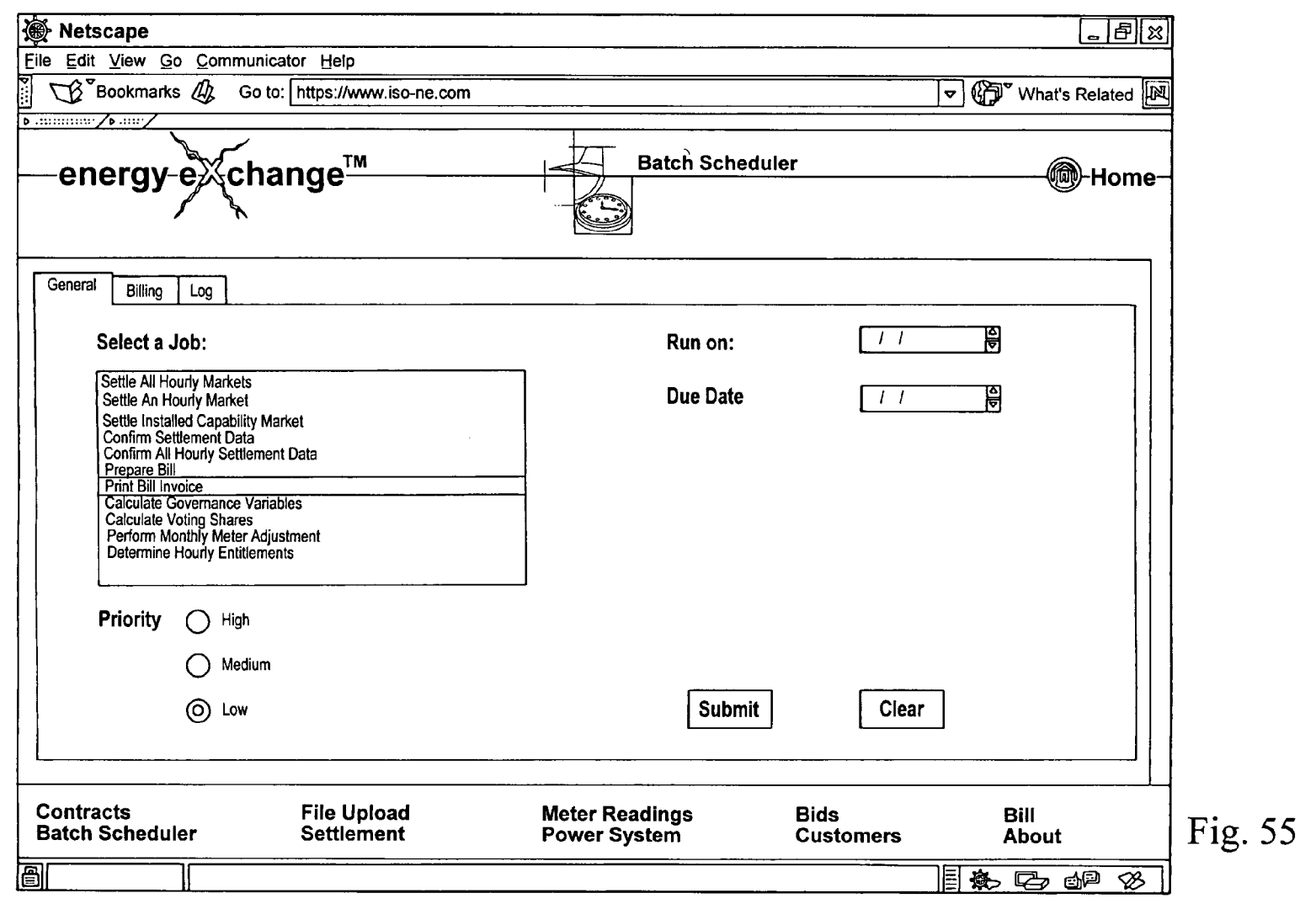
Figure 56:
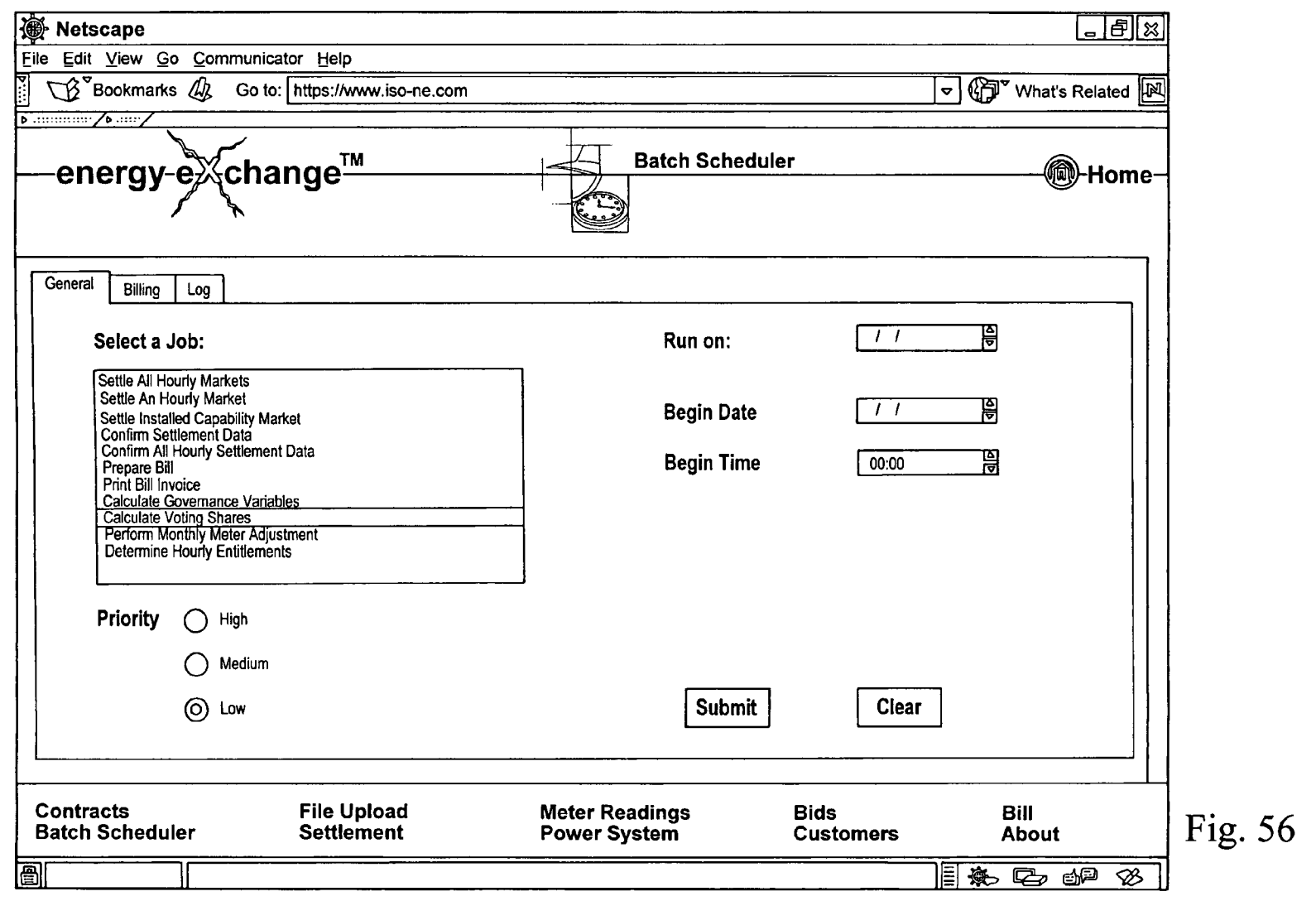
Figure 57:
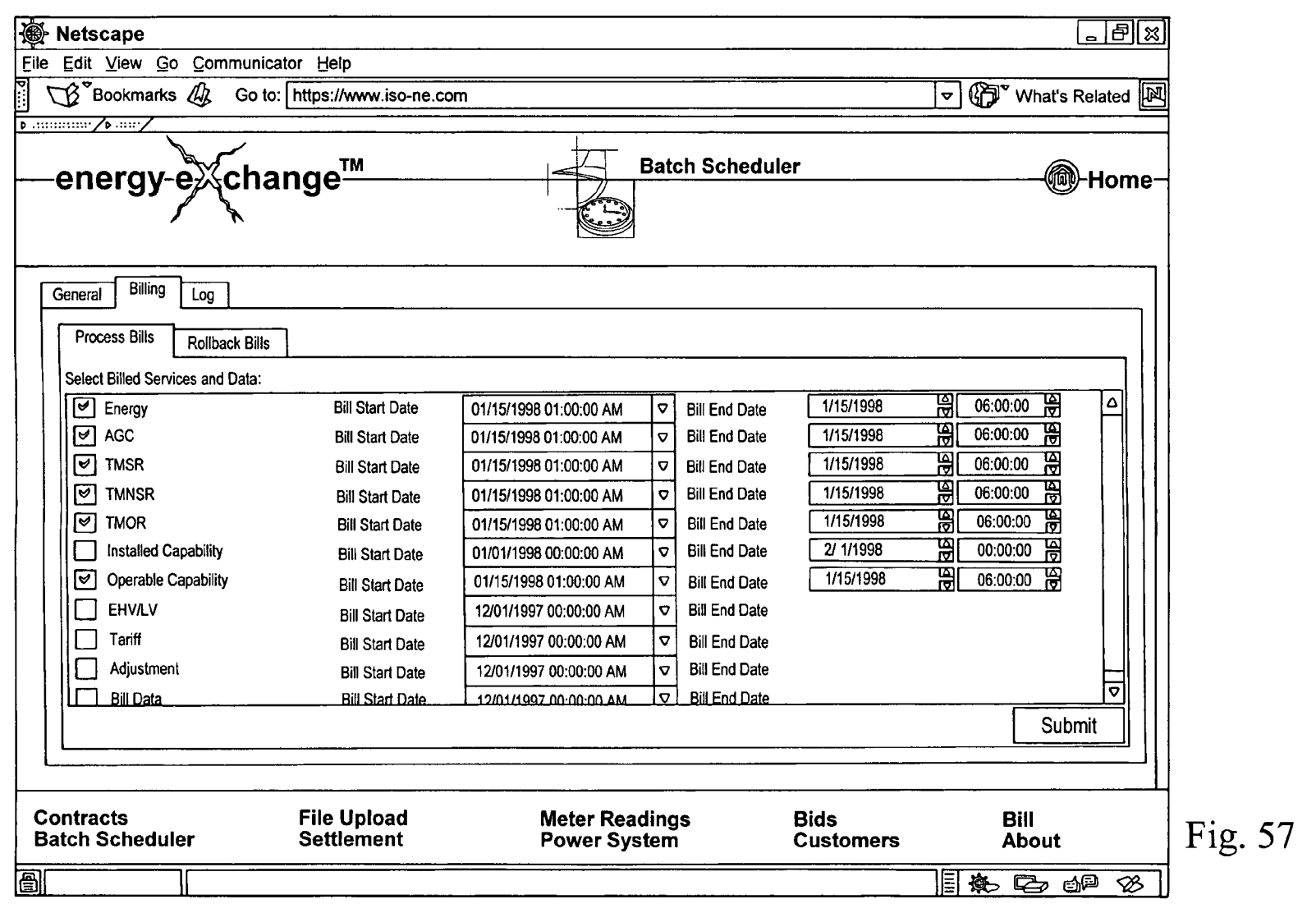
Figure 58:
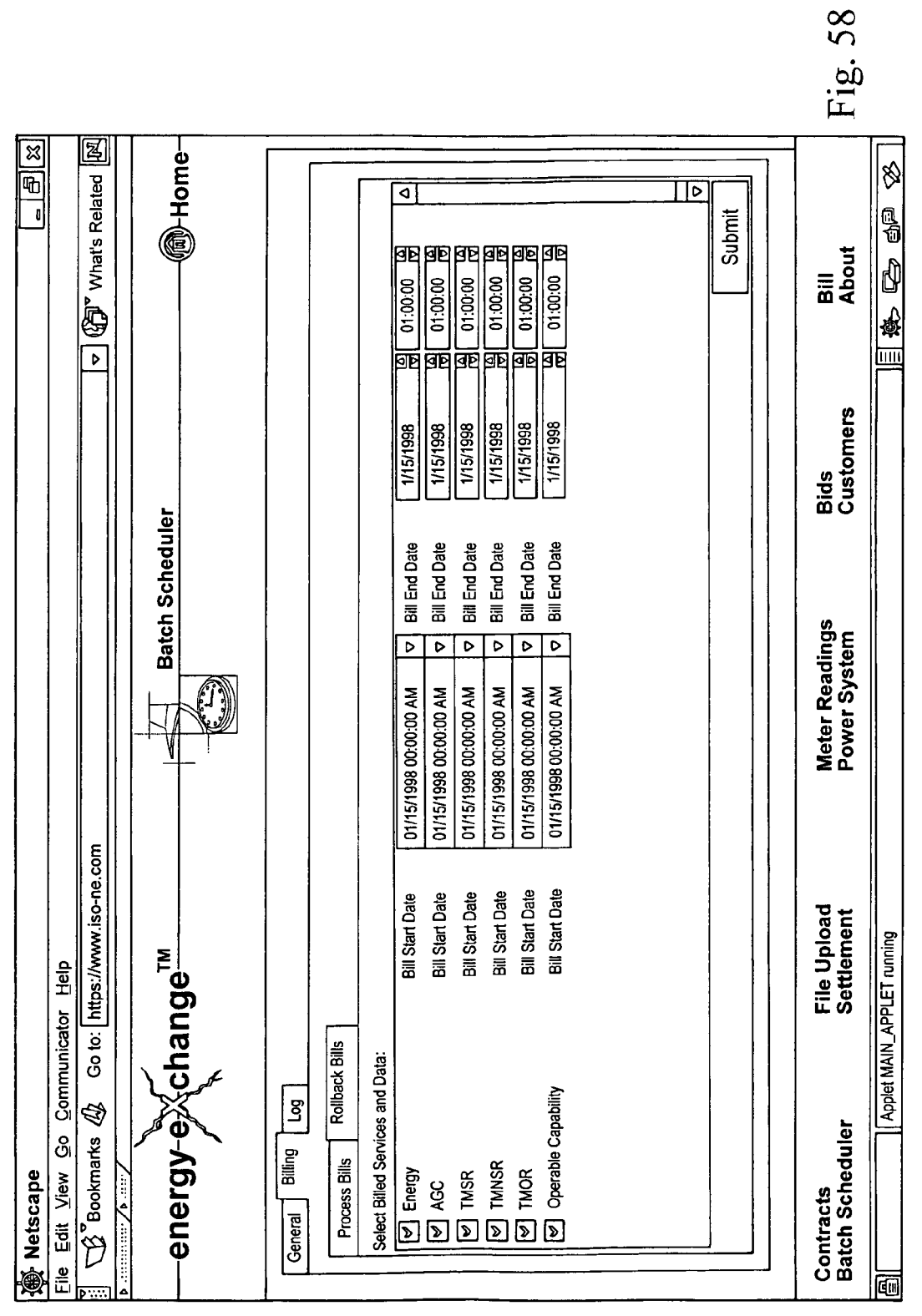

The batch scheduler 201 provides a mechanism for the submission of batch jobs, and the prioritization of batch job submissions. The initiation of batch jobs according to the prioritization is supplied by a commercially available tool. It also provides the ability to submit dynamic parameters for a batch job and provides the ability to support unique billing functionality involving the submission of bill parameters. In addition, it provides a facility to view the status of batch jobs submitted through the batch schedule user interface. A batch scheduler tool such as Maestro which initiates the jobs as scheduled. FIGS. 54–59 illustrate display screens associated with the batch scheduler component. FIG. 54 is a general display screen from which a customer, preferably an market operator internal user, can select a batch job such as settling an hourly market for the energy market, as shown. FIGS. 55–56 are display screens for selecting other batch jobs such as printing an invoice or calculating voting shares, respectively. FIGS. 57–58 are display screens for the billing panel.

Figure 59:
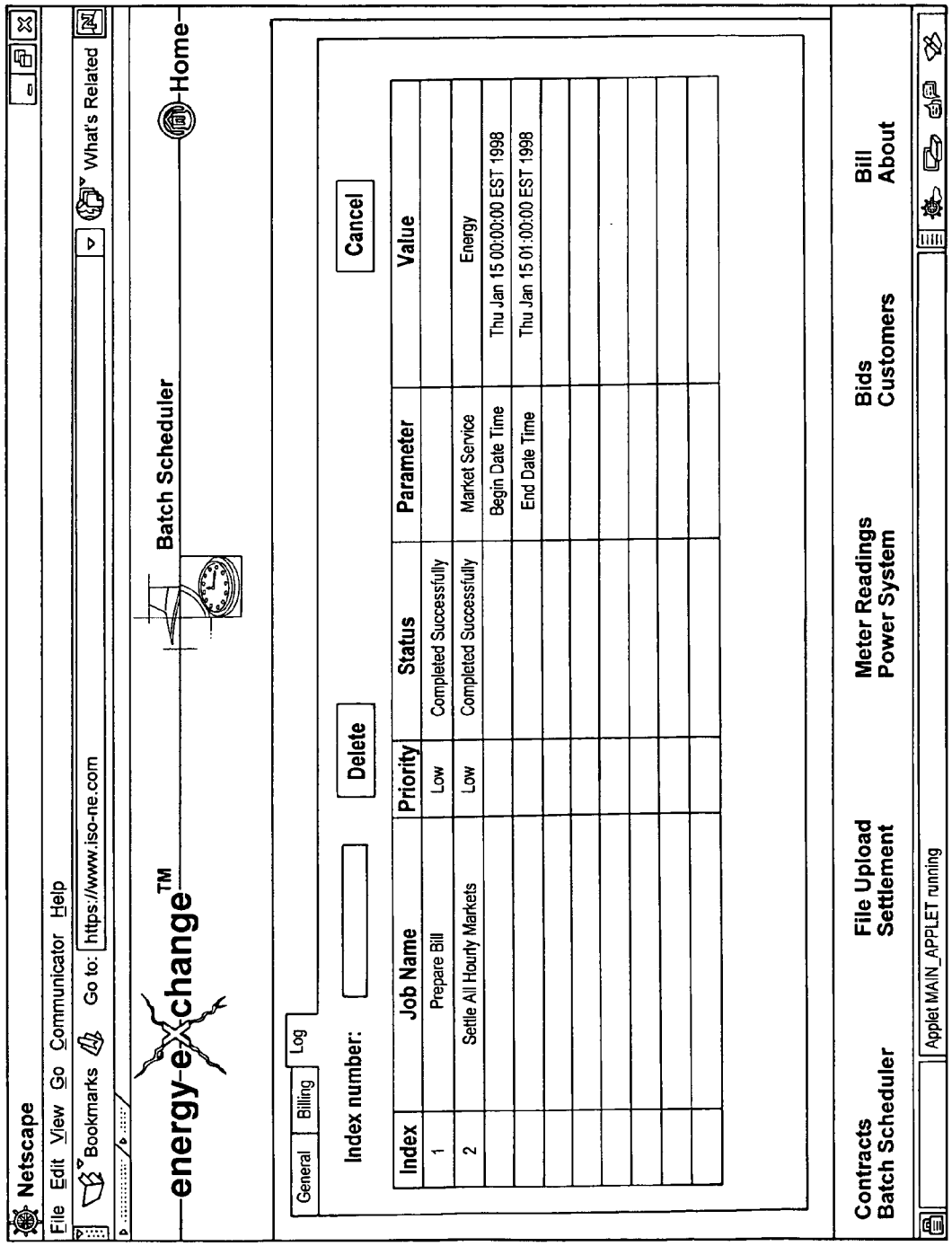
Figure 68:

As can be seen, the customer can select to process bills or roll back bills. FIG. 59 illustrates the log panel where the status of each selected batch job can be viewed.

Figure 60:
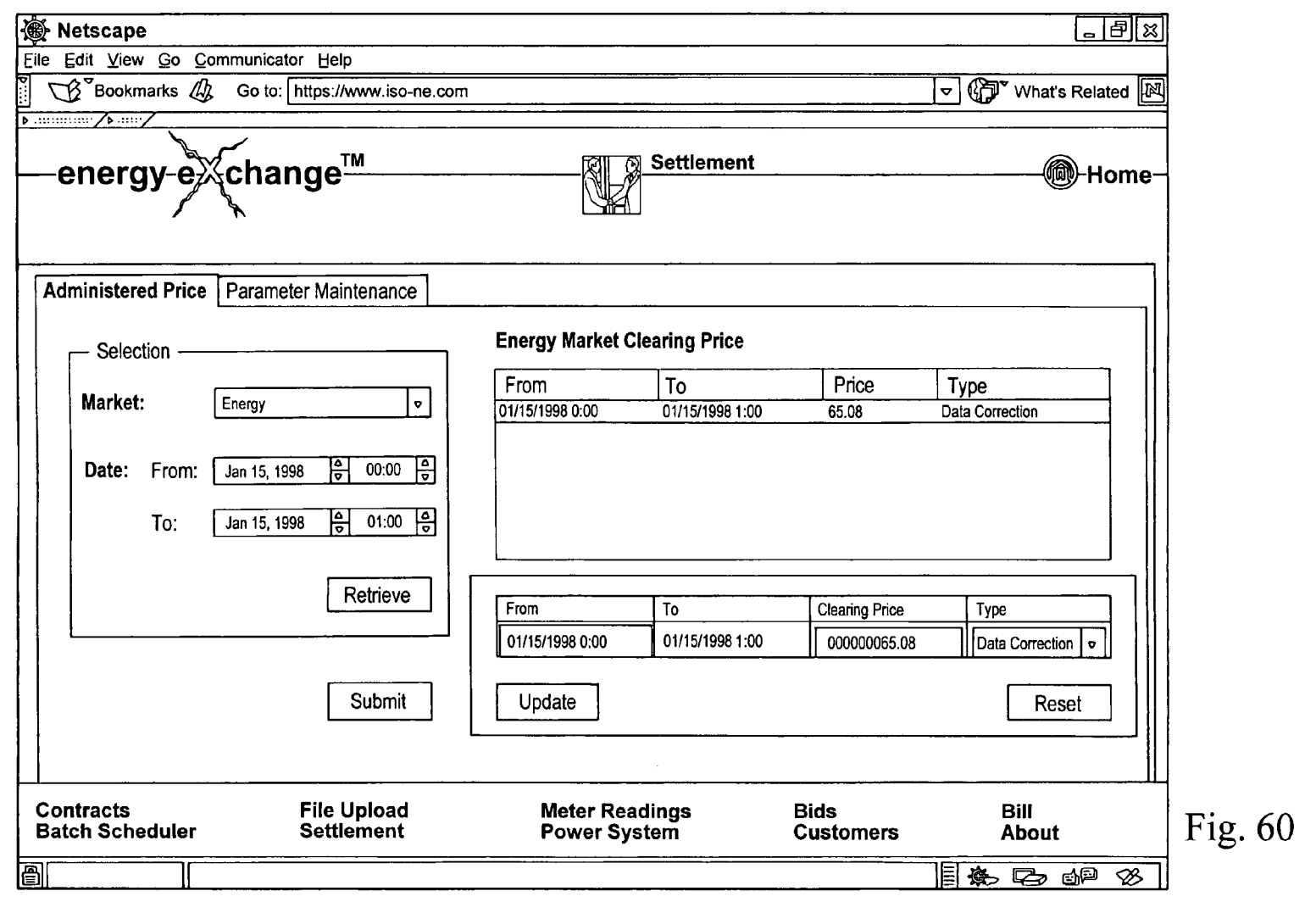
Figure 61:
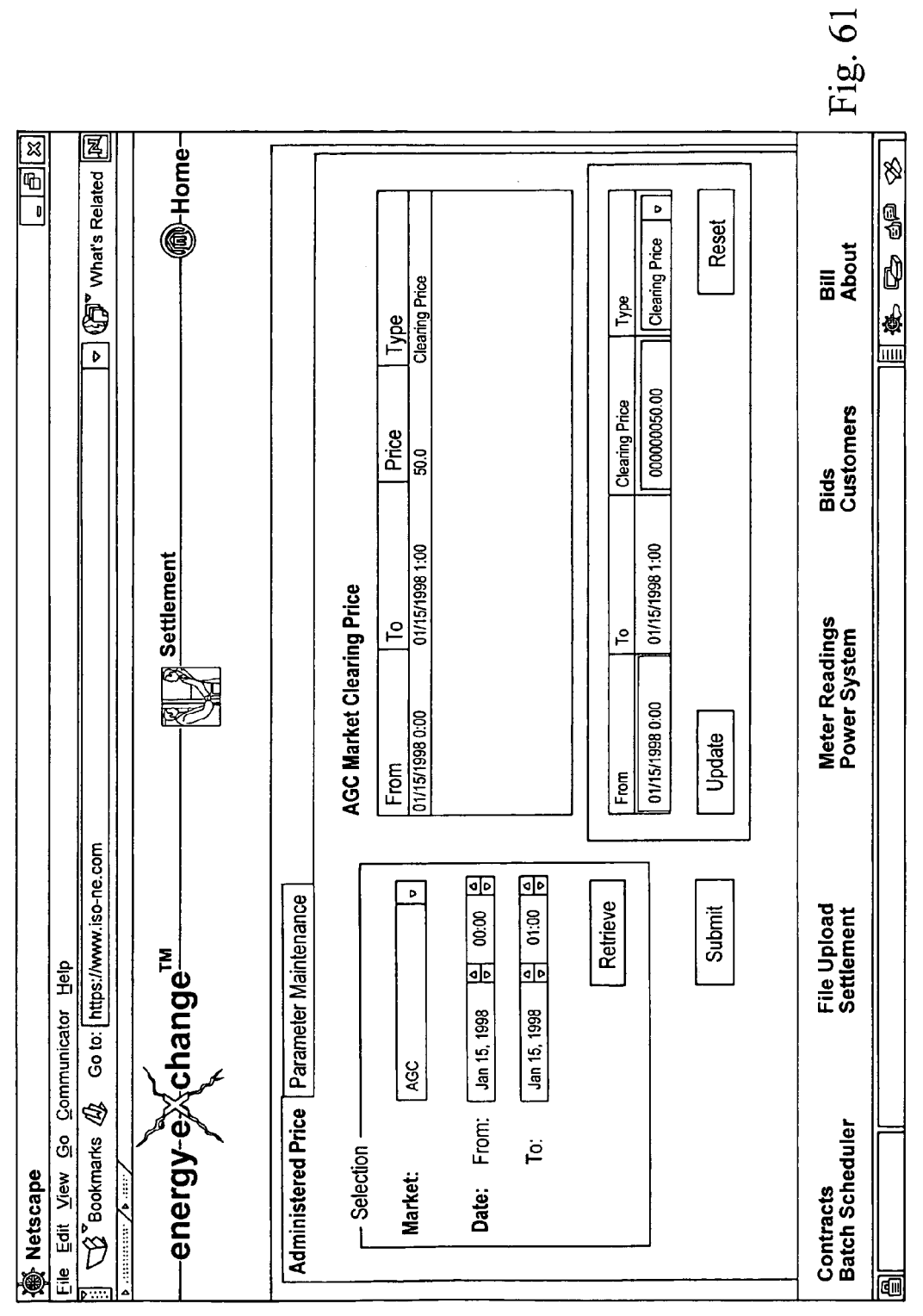
Figure 62:
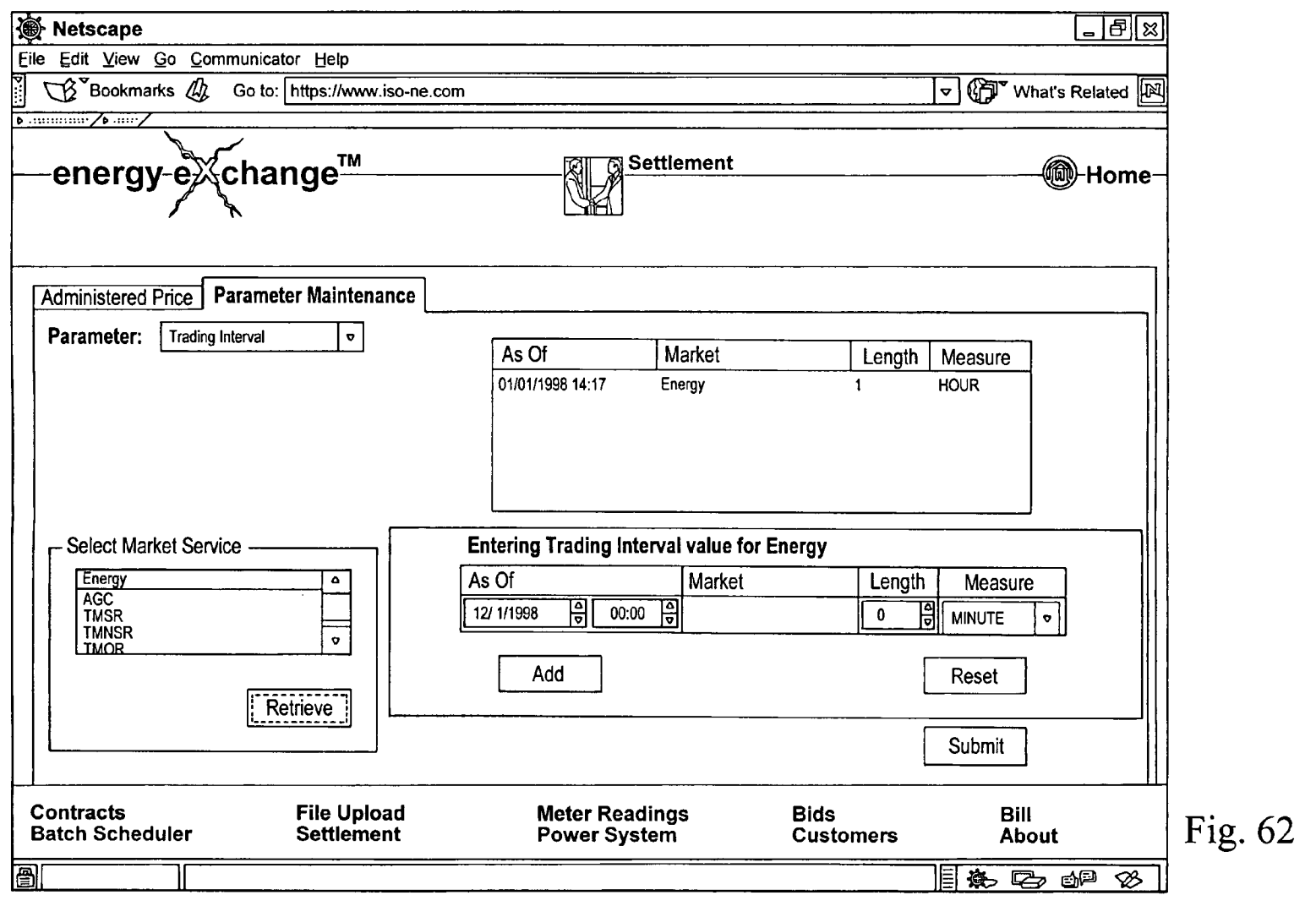
Figure 65:
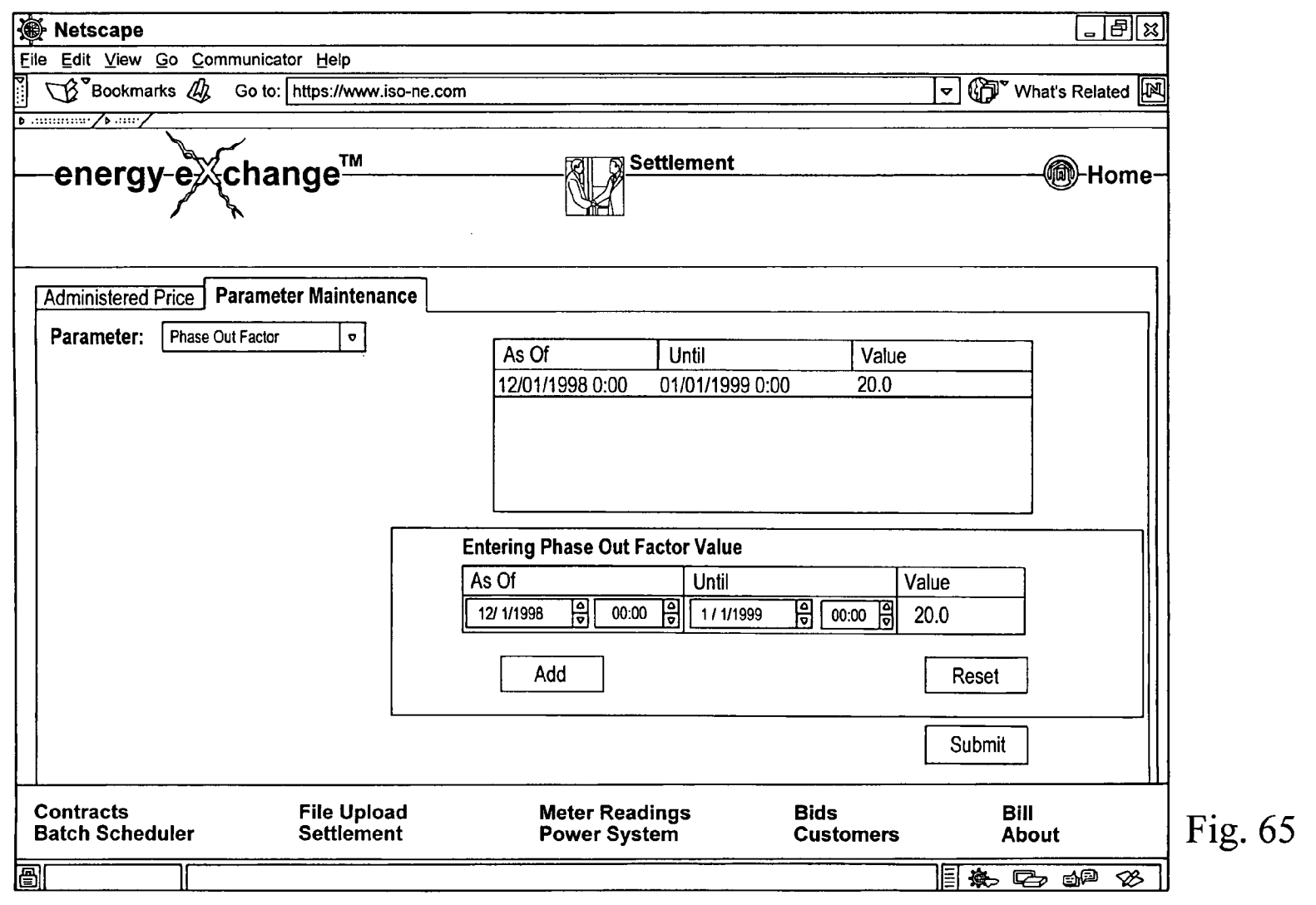
Figure 66:
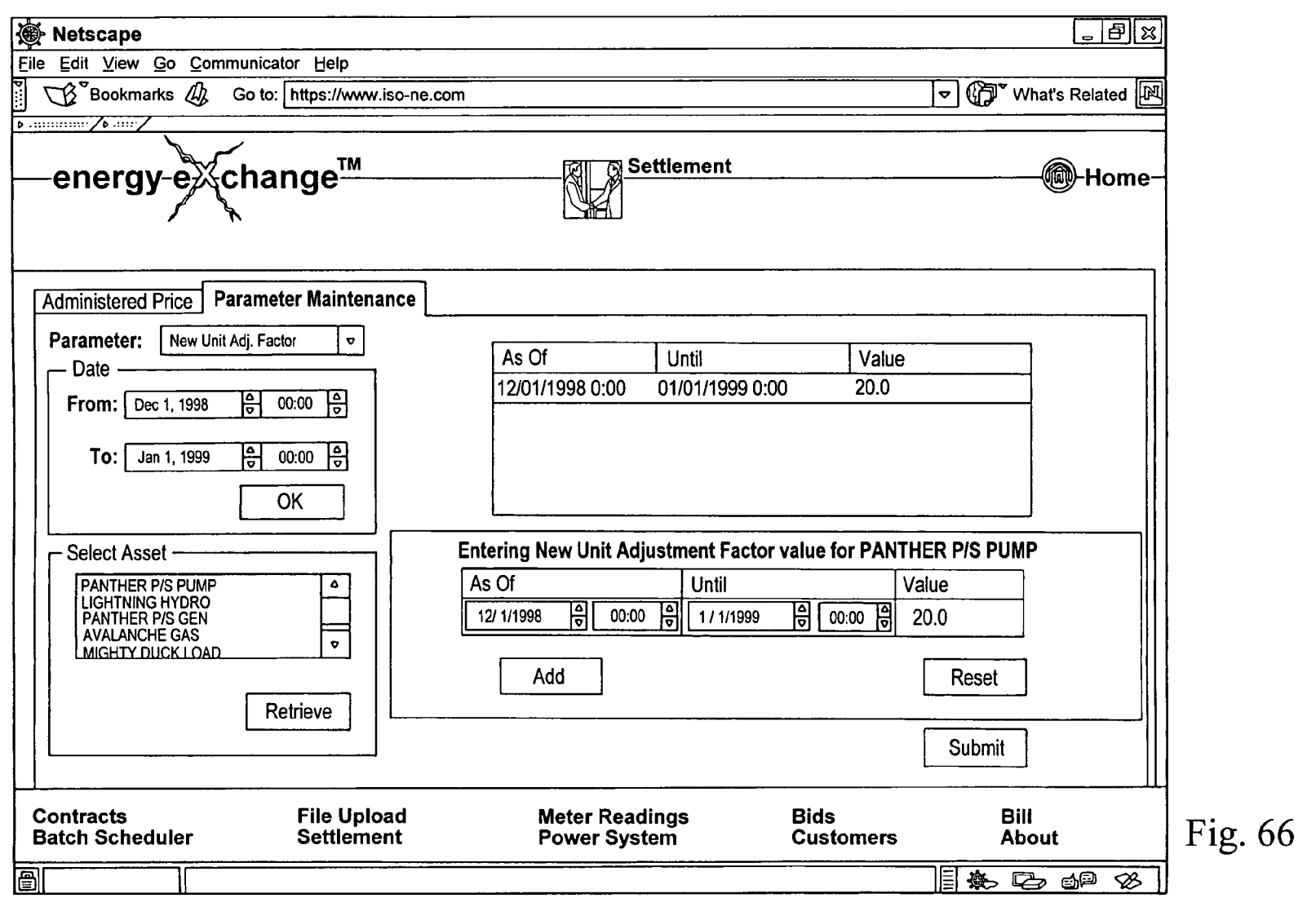
Figure 67:
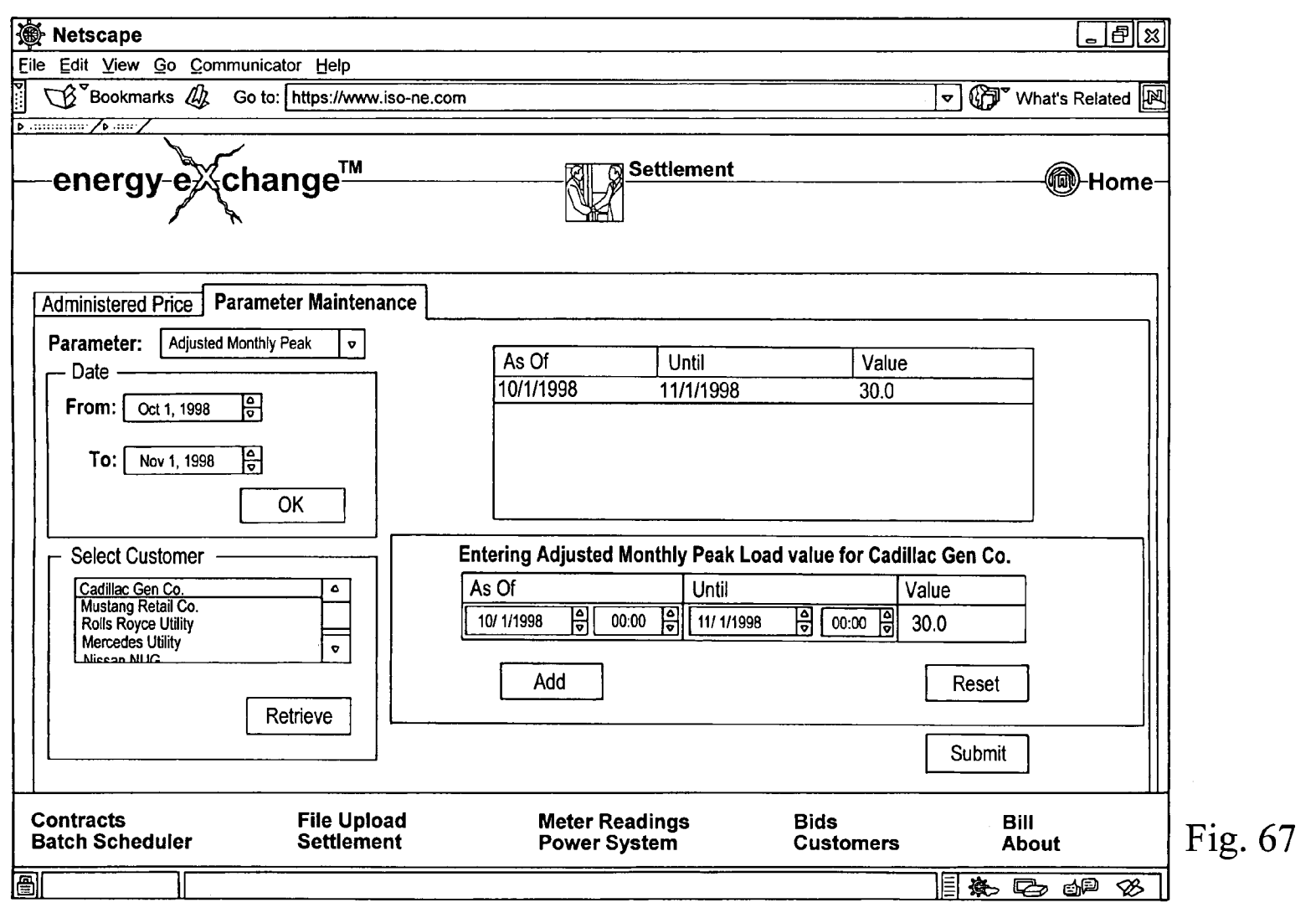
Figure 69:
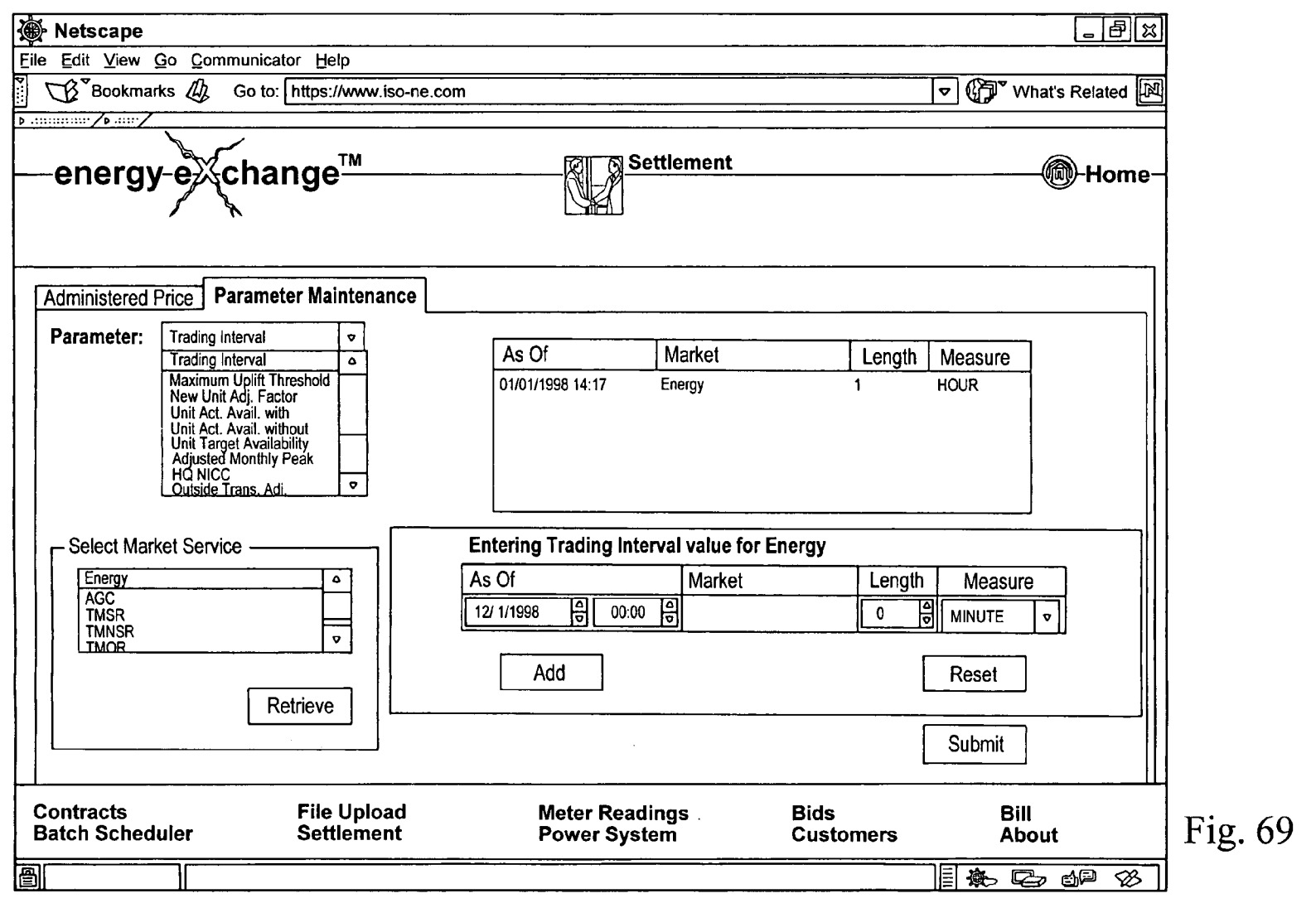

FIGS. 60–69 are display screens associated with the settlement component. FIGS. 60–61 are display screens that indicate the clearing price for the energy and AGC markets respectively for a particular interval. The customer can update information if necessary. FIGS. 62–69 are display screens where various settlement parameters can be viewed and updated as is clear from the display screens. The settlement component 210 is responsible for the physical and financial settlement of all the hourly and monthly markets. In addition, the settlement component is responsible for the monthly meter adjustment settlement for meter reading. Various settlement-related parameters can be entered through the user interface and file upload services of the settlement component.

The settlement component highlights any data that was identified as having validation or availability problems in any trading interval and confirms that data necessary to complete settlement for a trading interval is available including, meter readings (MWh energy readings) and clearing prices (for each market service). The settlement component supports the ability to accept the different types of administered price including data correction and market suspension which will override the clearing price for a specific market service and trading interval.

Figure 70:
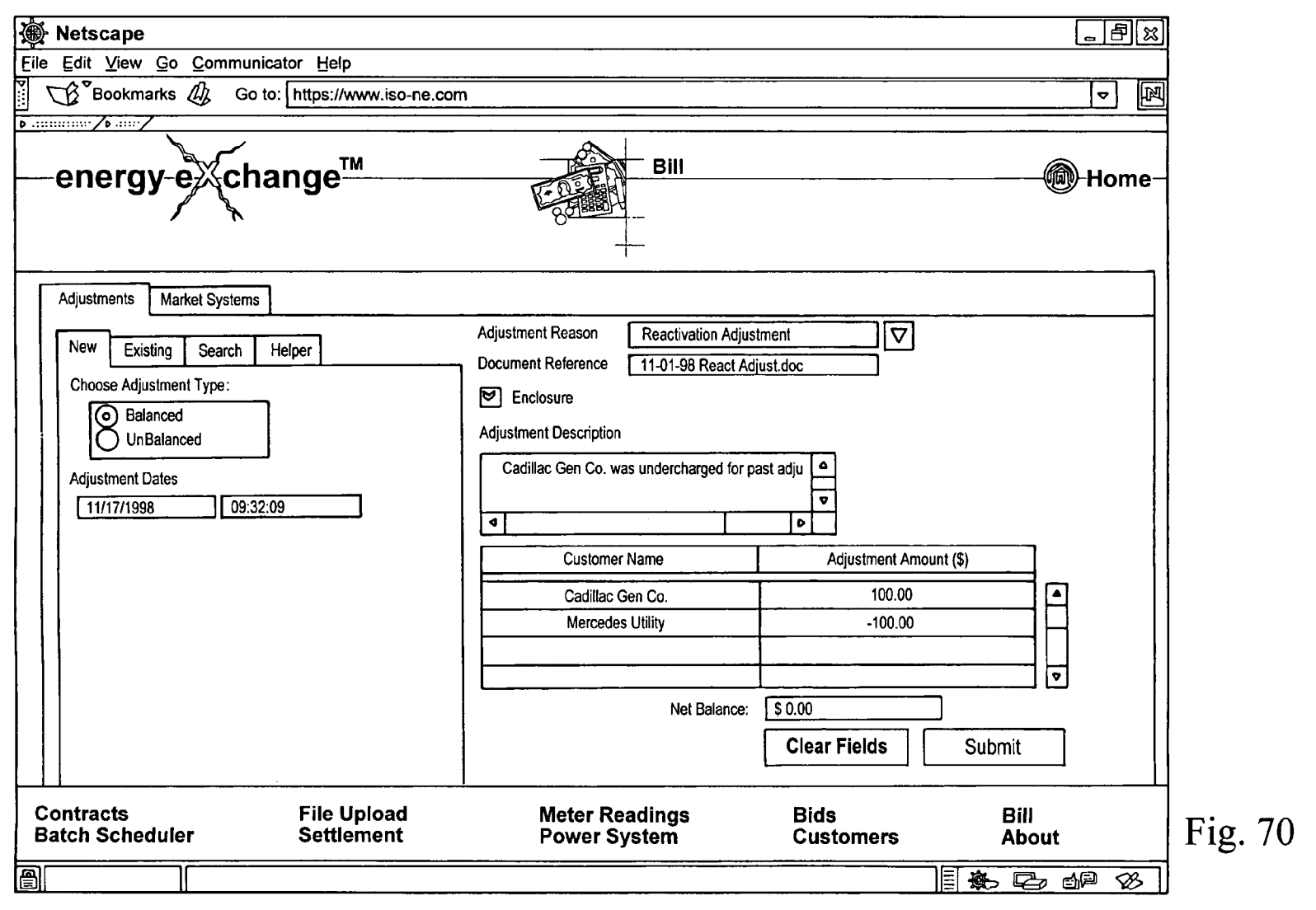
Figure 72:
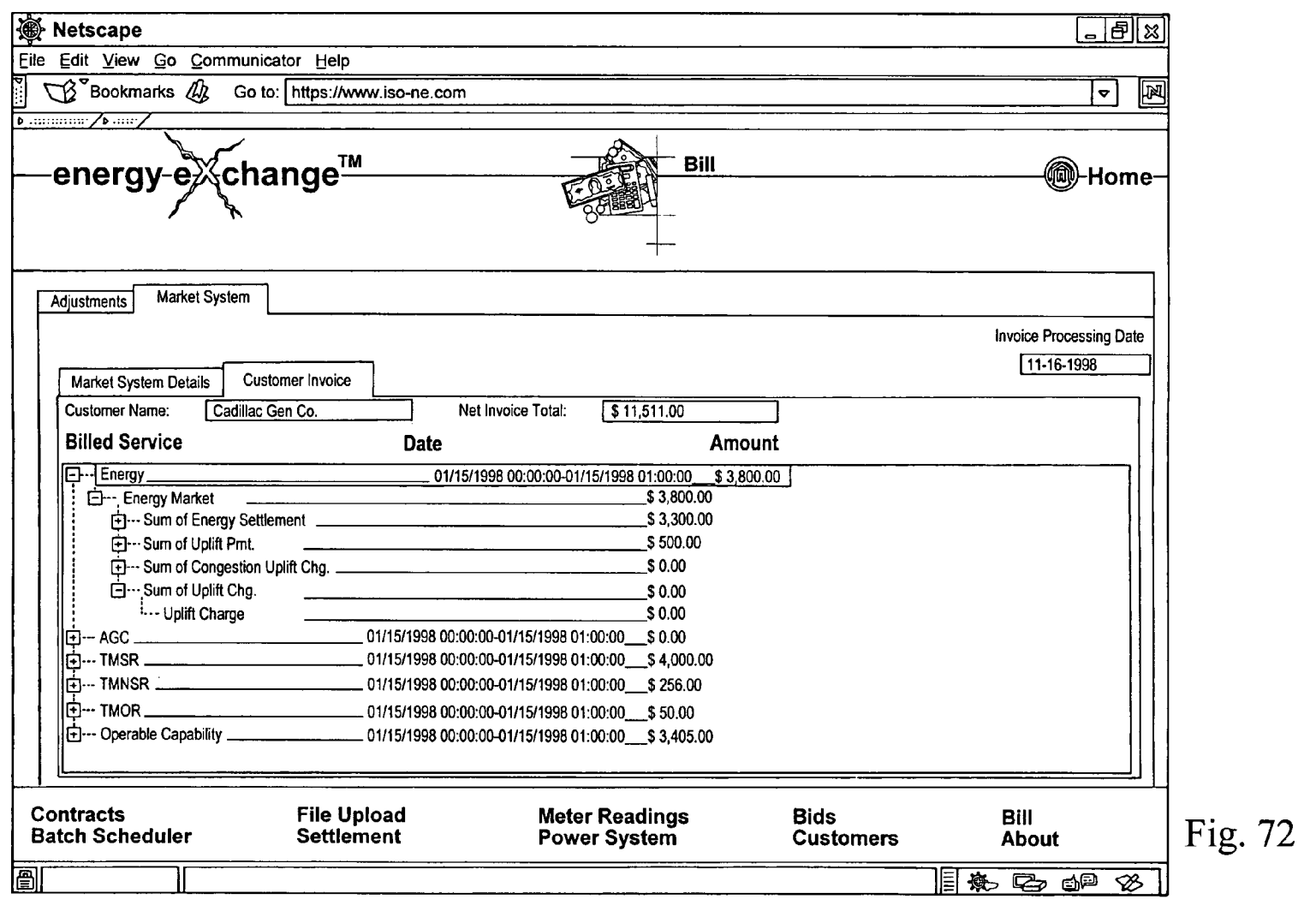

FIGS. 70–72 are display screens associated with the bill component. The bill component 212 provides flexible bill processing so that each billed service can be billed for a distinct bill period. The market operator has the ability to disable the bill process for one or more billed services, to update the end date of the bill period for each billed service (the system will generate the next bill period begin date based on updates), and to roll back a bill period for a billed service. In addition, the bill component allows the initiation of bill processing by manually triggering a batch calendar event which will be described hereinafter.

The bill component provides a mechanism for the entry and maintenance of balanced and unbalanced adjustments to a customer's bills through a user interface or a file upload. The following information may be captured: customer identifier, the amount of the debit/credit per customer, the reason for the adjustment and a description of adjustment, for example. FIG. 70 illustrates the adjustment tab of the bill component. As can be seen from FIG. 70, the type of adjustment made and the reason for the adjustment is captured.

The bill component provides a mechanism to view a summarization of all bills processed. All calculated summary line item and net amount totals will be saved to a database so that external reports can be produced. FIG. 71 illustrates the market system details tab of bill component which displays summary information for each customer, including their net position in each market for the selected bill period and accounts payable and receivable. FIG. 72 illustrates a display screen accessed by the customer invoice tab. The customer invoice display uses a collapsible tree structure with each child node of the tree structure representing more and more details about a customer.

The bill component is also responsible for preparing an invoice for each customer. The bill component initiates invoice printing by manually triggering a batch calendar event. It also formats a file that includes all information to be printed on the invoice. The bill component creates statements that are payable to the customer and market operator. The bill component preferably creates a flat file to provide information to format a summary report.

Figure 73:
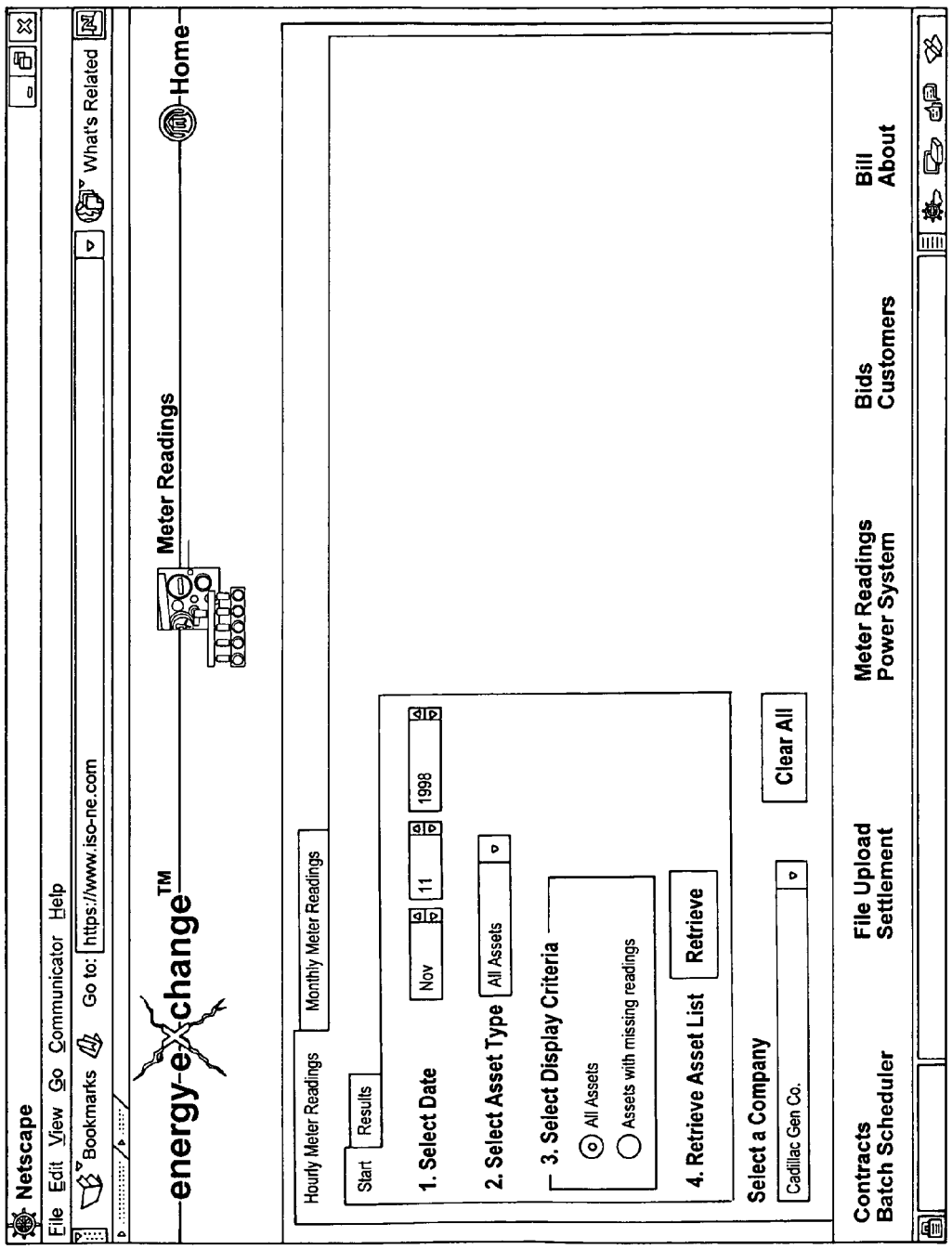
Figure 74:
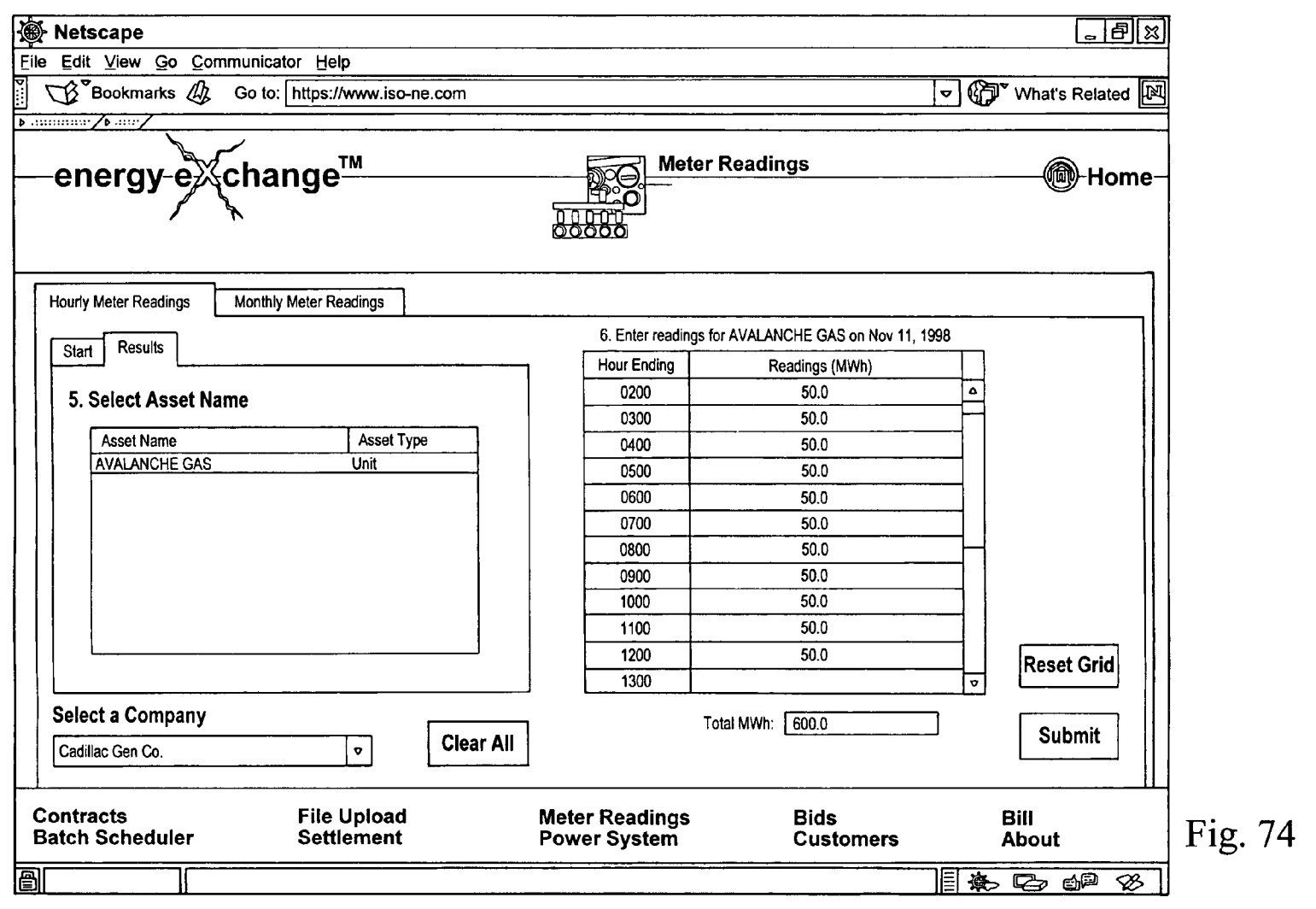
Figure 75:
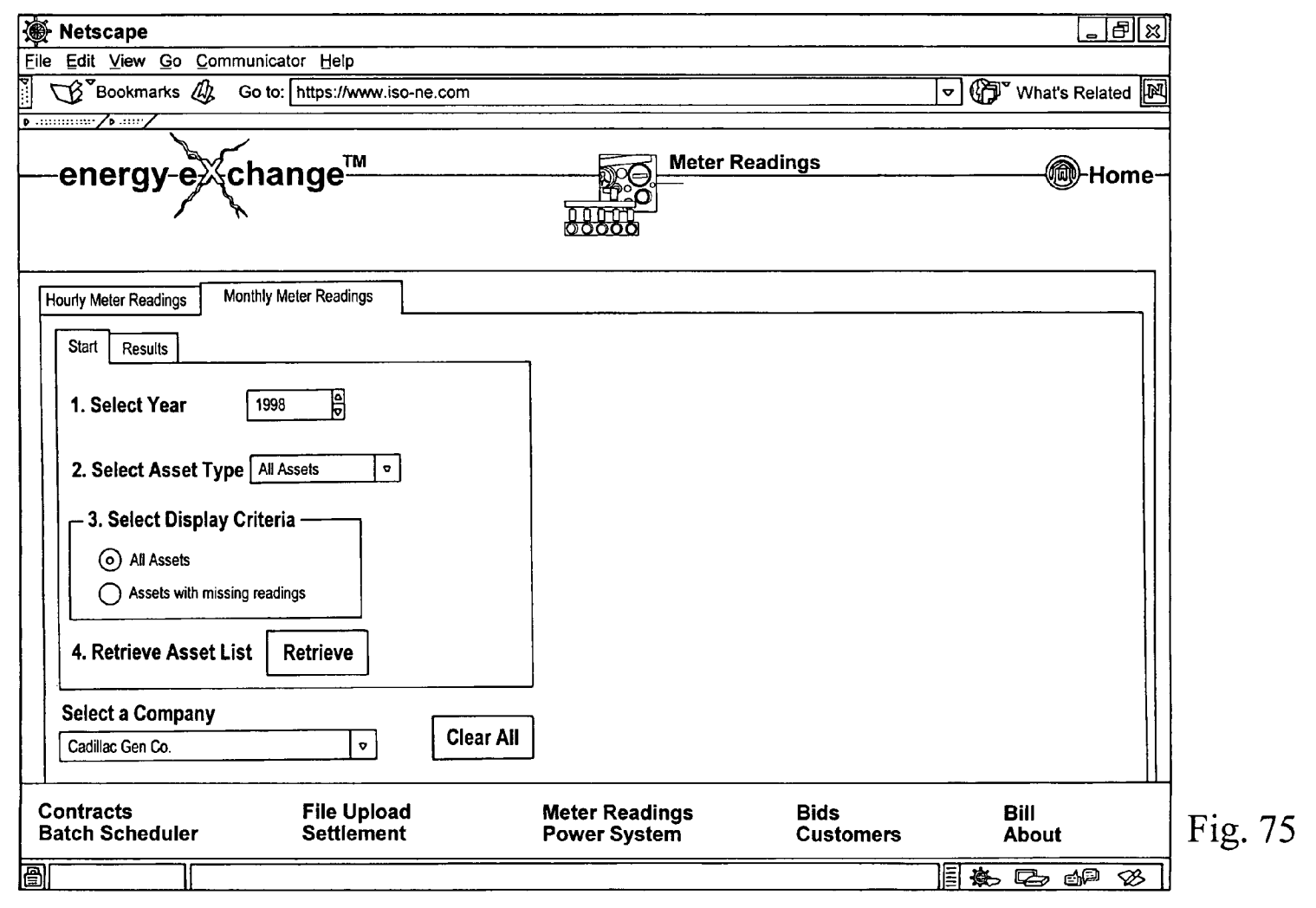
Figure 76:
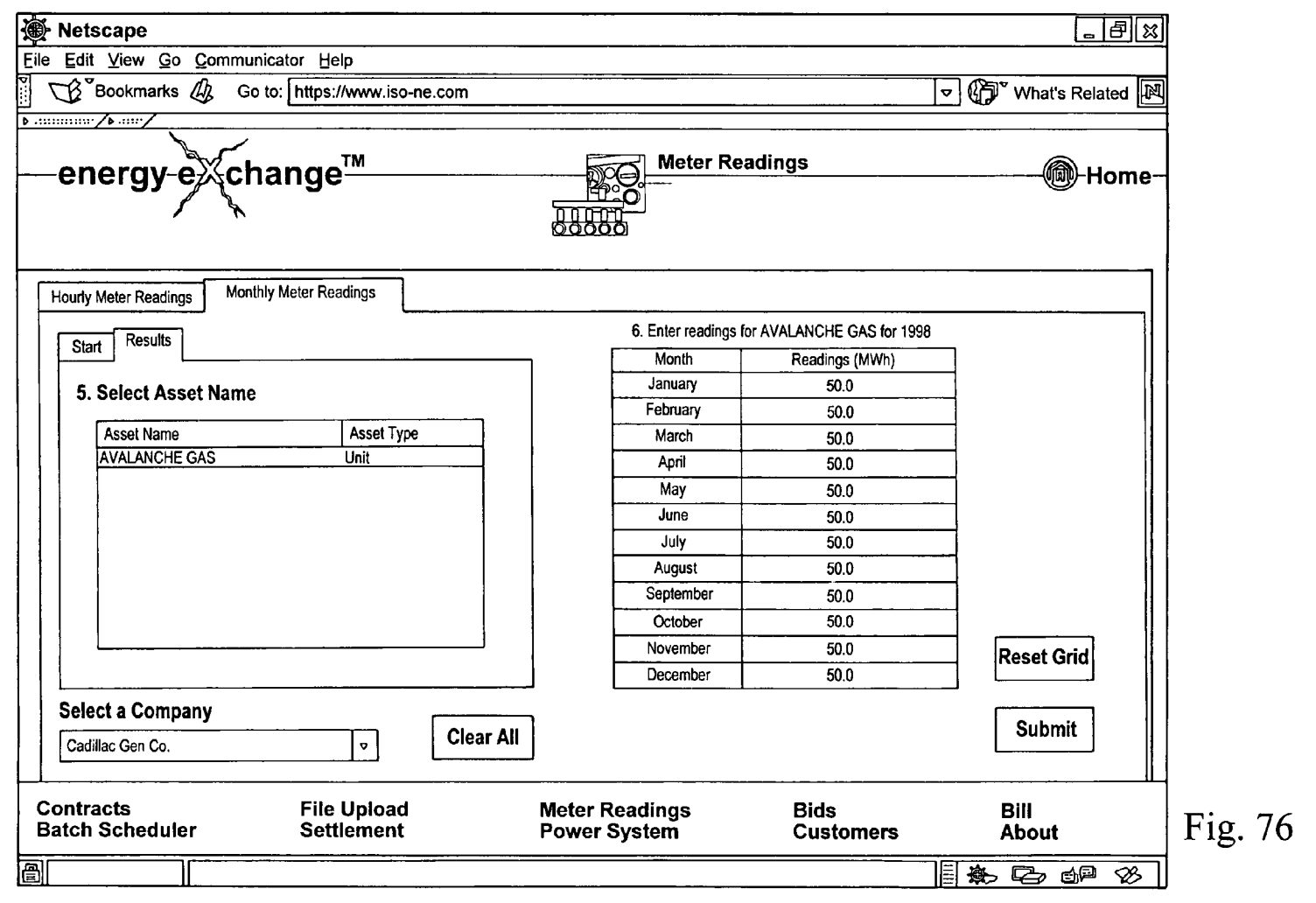

FIGS. 73–76 are display screens associated with the meter reading component. FIGS. 73–74 are directed to hourly meter reading data and FIGS. 75–76 are directed to monthly meter reading data. The hourly or monthly meter readings for a particular asset can be entered via these display screens by customers that are responsible for meter reading.

Technical Architecture

Figure 77:
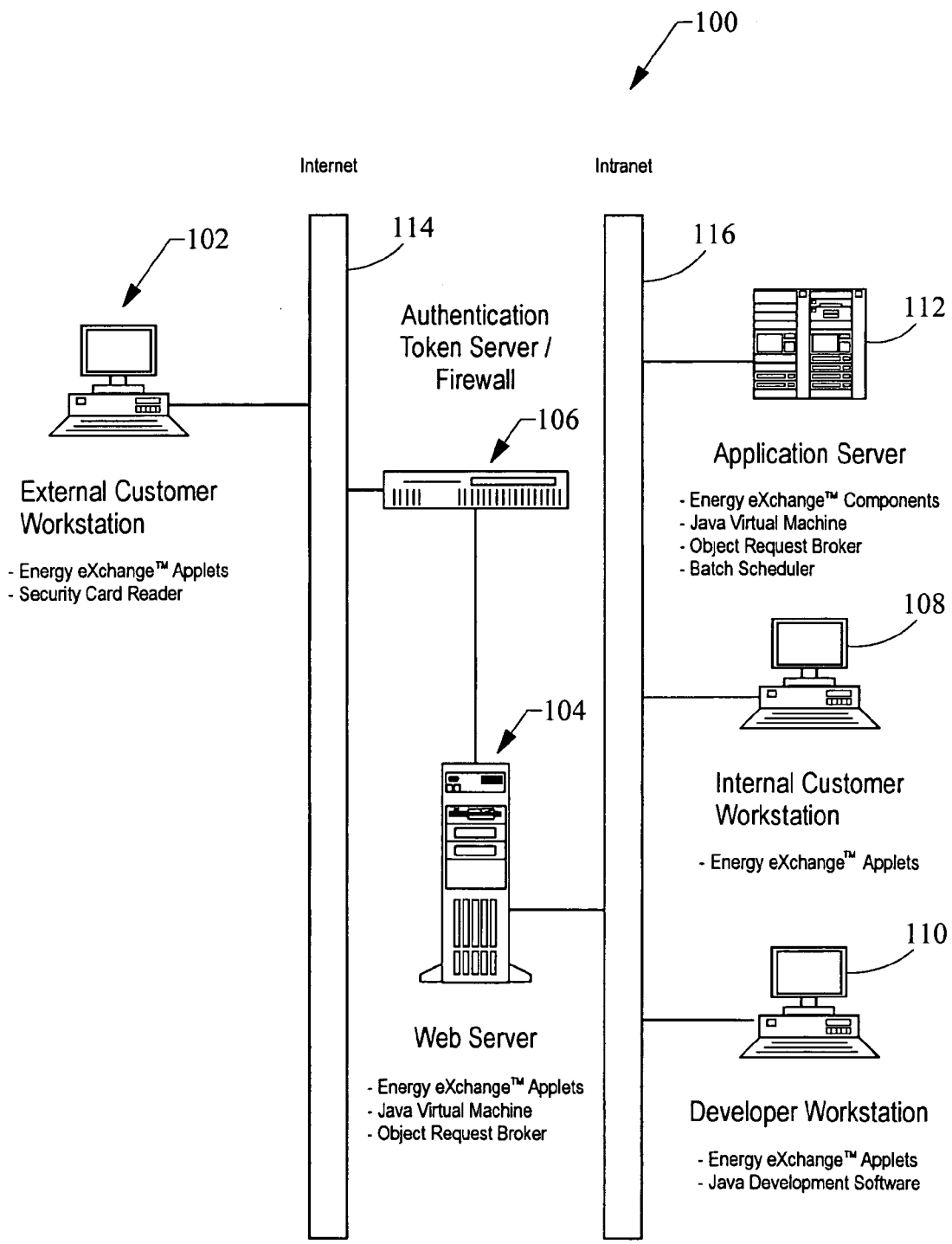
FIGS. 77–78 are schematics illustrating the technical architecture according to a preferred embodiment of the present invention.
Figure 78:
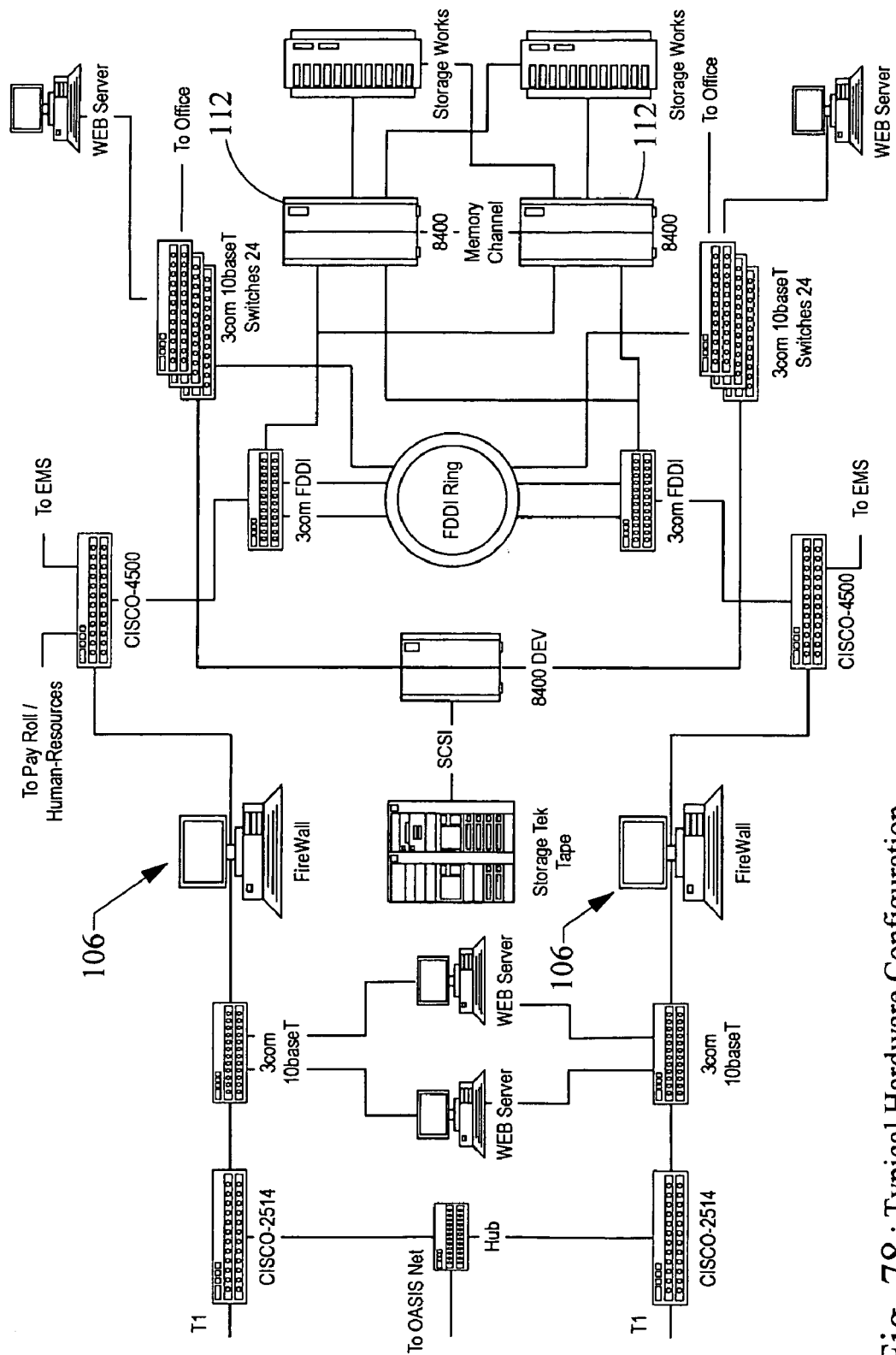

The overall technical architecture provides a flexible system that is easily and economically adaptable to changing environments. The technical architecture is designed to provide the system with several important benefits. These include a fault tolerant server/LAN combination, redundant communication interfaces, multiple distributed user interfaces, and archival storage media to ensure high system reliability as well as a plan for survivability in the event of a failure. The system is composed of a robust, highly secure network infrastructure and scaleable components to allow it to easily meet expected market operator transaction volume demands and to economically adapt to future ones. FIGS. 77–78 illustrate the major physical components of the system's technical architecture. With reference to FIG. 77, the system's architecture 100 preferably includes a plurality of external customer workstations 102, of which only one is shown, a Web server 104, an authentication token server/firewall 106, at least one market operator internal user workstation 108, preferably utilized by the market operator, at least one developer workstation 110 and at least one application server 112. The external user workstations 102 are coupled to the Web server 104 via the Internet 114. The Web server 104 communicates with the application server 112, internal user workstation 108 and developer workstation 110 over an Intranet 116, preferably a LAN, although other structures can be used.

The system shares key information and resources among many users throughout different organizations. Therefore, the ability of the system's network infrastructure to prevent unauthorized access to information is important. For enhanced security, the system preferably employs a multi-tier network security architecture. To access the system, each customer, external and internal, as well as the developer workstation have both a challenge token used to reveal a 'challenge' password based upon personal login information as well as an industry standard digital certificate, a unique digital signature issued and managed by the market operator itself. Challenge routers authenticate only customers who have valid credentials, consisting of the access code along with a digital certificate installed on the customer's workstation, thereby protecting sensitive resources and information attached to an Internet network from unauthorized access. Proxy services mediate traffic between the protected network and the Internet by establishing a screening server address, shielding outsiders from knowing (and later targeting) the specific addresses of servers within the private network. This level of security is totally transparent to the customer with the exception of needing to use a security card at the beginning of each session. The external customers 102, market operator internal users 108 and developer workstations 110 are all equipped with Web browsers.

With a secure connection established between the customer's workstation 102 and the web server 104, components of the system can be automatically loaded into the web browser of the customer's workstation 102. As a benefit of this technique, customers need not coordinate to update their software packages when enhanced versions of the application are released. In this way, new software to accommodate updated market rules or procedures is simple to release. Data is entered in and validated though graphical user interfaces at the workstations, while the transactions are entered in a database maintained by the application server 112. Customers internal to the system access the system in the same way as external customers, however additional functions are enabled as menu options as previously described. Thus, market operator internal users can initiate a settlement process or update a customer's information, for example, whereas external customers would preferably not be provided with this capability. Developers utilize Java development tools to maintain and enhance the architecture and application as necessary.

FIG. 78 illustrates a typical hardware configuration implementing a portion of the architecture shown in FIG. 77. Of course, other implementations can be used and the present invention is not limited to the particular embodiment shown. In this preferred embodiment, the application servers 112 are DEC 8400 Alpha servers on which Oracle's Version 8 Relational Database Management System runs in parallel mode to provide access to the database and maintain its integrity. Dual Silicon Graphics web servers, providing load balancing and fail-over protection, run Netscape Enterprise Server. The entire system communicates using TCP/IP, messaging protocol. As the principle method for transmitting data over the Internet today, this protocol is responsible for ensuring that data packets sent over the network arrive at the destination and are properly sequenced. Secure Hypertext Transfer Protocol (HTTPS) running on top of the TCP/IP layer is used as a light-weight file transfer protocol optimized for transferring these small files. Additionally, the system's execution environment is implemented using an Object Request Broker (ORB) to provide a mechanism that enables objects to transparently make requests of and receive responses from other objects located locally or remotely. The ORB uses Internet Inter-ORB Protocol (IIOP) based on Common Object Request Broker Architecture (CORBA) to send information across the network.

Application Architecture

Services provided by the application architecture are: presentation services, information services, communication services, environment services, transaction services and business logic.

Figure 79:
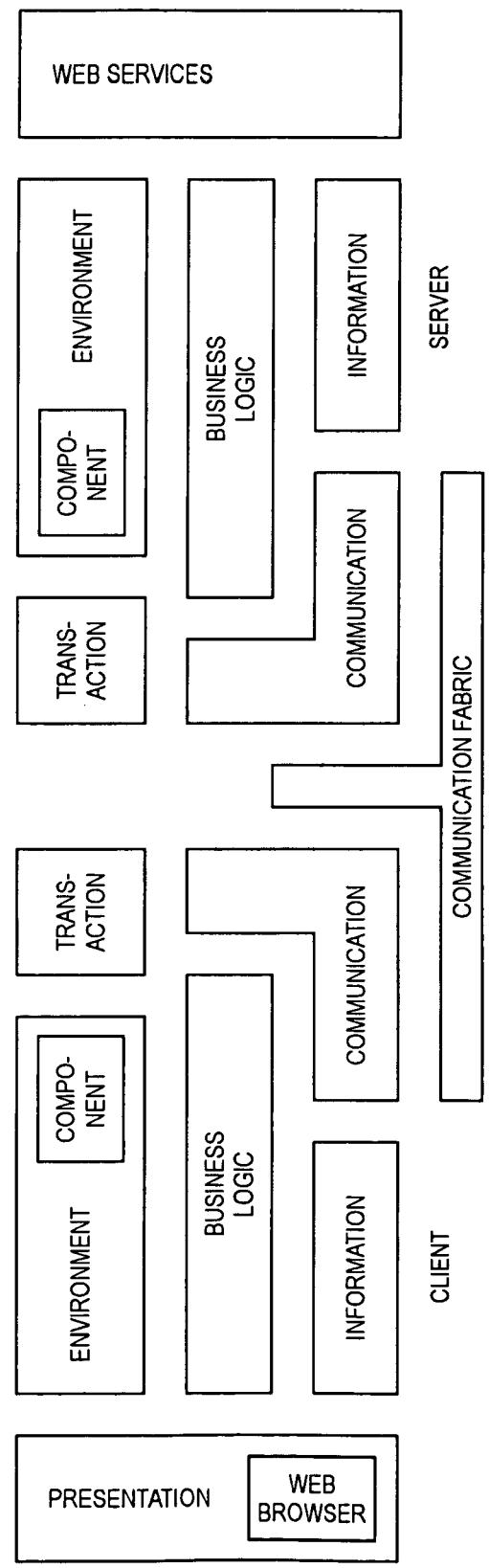
FIGS. 79–82 are schematics illustrating various features of the application architecture according to a preferred embodiment of the present invention.

The implementation of application architecture services is delivered using a network-centric architecture framework. The net-centric architecture framework is a common architecture that supports multiple electronic access channels to disparate sources of information reachable by customers using technologies that employ open, commonly accepted standards. FIG. 79 illustrates an example of the application architecture services according to a preferred embodiment of the present invention. For purposes of this description, the communication fabric and web services are considered part of the technical architecture.

Presentation Services

Figure 80:
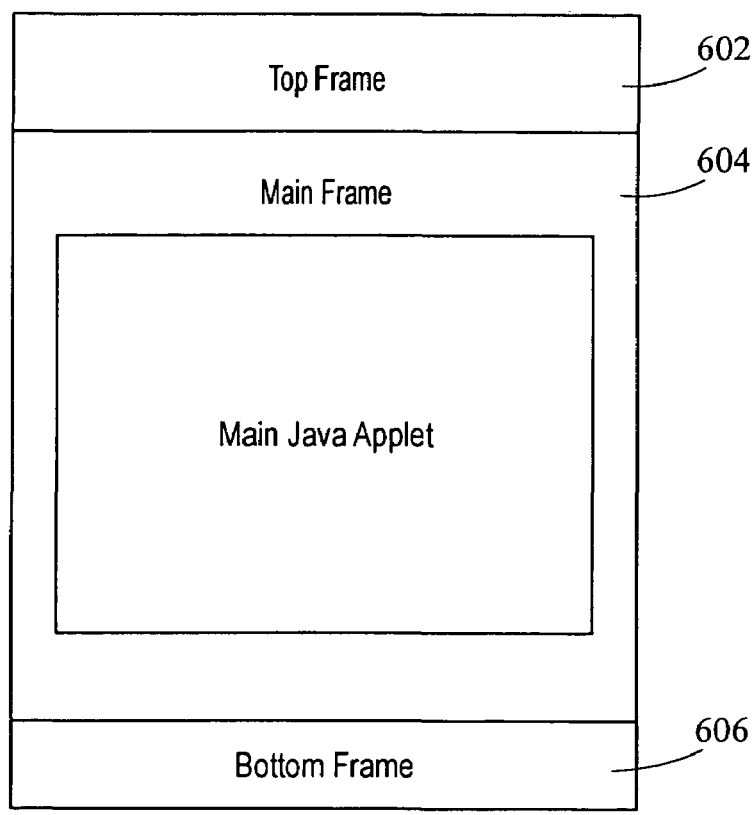

The presentation services enable the application to manage the human—computer interface. This includes capturing user actions and generating resulting events, presenting data to the user, and assisting in the management of the dialog flow of processing. The major presentation services include a window system, a desktop manager, a web browser, and an input device. FIG. 80 illustrates the basic user interface design. The user interface is divided into three hypertext markup language (HTML) frames. The top frame 602 contains a header applet, the middle, "main" frame 604 contains the main user interface applet, where component applets are displayed. The main frame 606 also contains a JavaScript function which can be invoked by the applets from the other frames. The bottom frame contains the MainMenu user interface applet which contains a menu to select a component to be displayed in the main user interface. FIG. 5 shows the application of this framework to the bid component user interface.

The user interface is preferably constructed using the Abstract Windowing Toolkit (AWT) available from Java 1.1. Applets are preferably constructed from core AWT classes (e.g. Canvas, Panel, and Label) as well as third party products (e.g., Tab Panel from Symantec) where necessary. In a preferred embodiment of the present invention Netscape's 4.5 web browser is used on the workstations. All functional areas are accessed through the web browser, however, Microsoft's Internet Explorer may be used. Some Netscape specific pieces related to security and software delivery would have to be altered before a full production deployment on Internet Explorer is possible.

The presentation layer is separated from the business logic and validation by the user interface/activity framework implementation. The user interface layer captures and handles the user-initiated events and displays the results of the event. The activity layer is responsible for validating the user's input and invoking services on the business components to process the transactions. That is, services to read data from a user interface and translate them into their corresponding data types and then validate the data types are handled by the user interface/activity framework implementation. The graphical user interface, such as that shown in FIG. 7, demonstrates many of the common user interface features of a component. As described above, the user is able to access the desired grouping of information using a tab panel metaphor. By clicking a tab, the user is shown a panel designed for the input and display of information related to the component. Button clicks and other user-initiated events are handled using standard object-oriented event handling implemented in the application architecture. Additionally, each panel of the user interface may contain any number of graphical user interface components or "widgets" such as editable text fields, list boxes, tables, sliders, combo boxes, and date spinners. Each graphic user interface component can capture events such as a click or key press and initiate some activity within the user interface's corresponding activity class. The activity is responsible for interpreting the event and initiating the correct business logic or validation.

Information Services

Information services manages information assets and enables the application to access and manipulate data from documents, databases or other external data sources stored locally or remotely. It minimizes an application's dependence on physical storage and location within a network. The primary storage services utilized in the present invention is provided by Oracle's Version 8.0 Relational Database Management System (RDBMS) resident on an application server. All persistent data is stored in relational tables within Oracle. In addition, Oracle provides data security and access services for database administration personnel. Database user accounts are protected with a password, and data/table access is governed by access rights established by database administration personnel.

Figure 81:
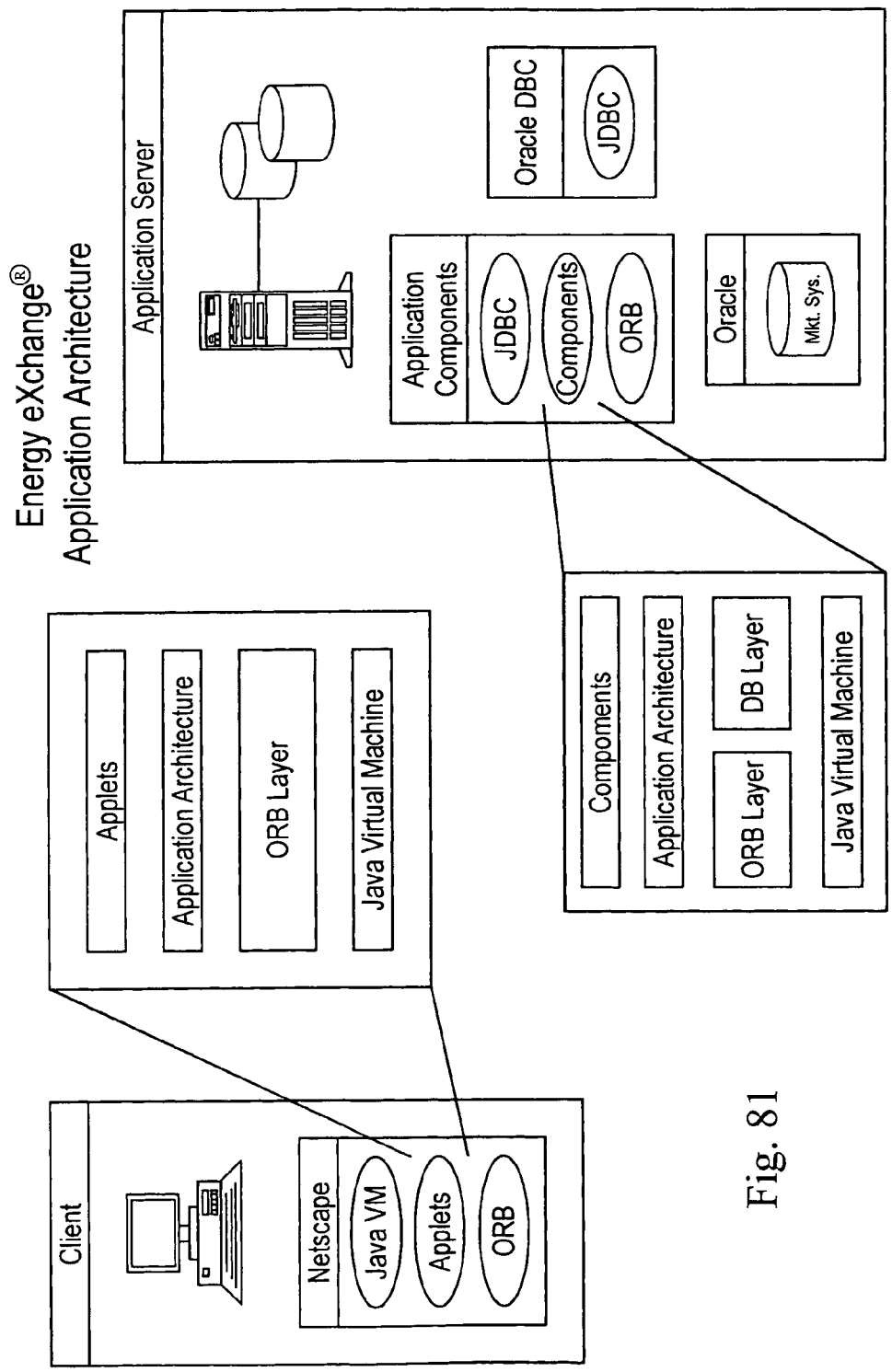

FIG. 81 illustrates a schematic of a portion of the application architecture according to a preferred embodiment of the present invention. Oracle's Java Database Connectivity (JDBC) ThinDriver provides the Java-based application program interface needed to access the database from within the system. All common database transaction services are accessed through the JDBC. Since JDBC is independent of the particular database management system, the system has the added benefit of being isolated from the particular database implementation. The application architecture also provides a layer of separation from the JDBC API with the Persistence framework. This framework provides mapping from an object-oriented implementation to a relational database model, as well as services for generating SQL statements.

Communication Services

Figure 82:
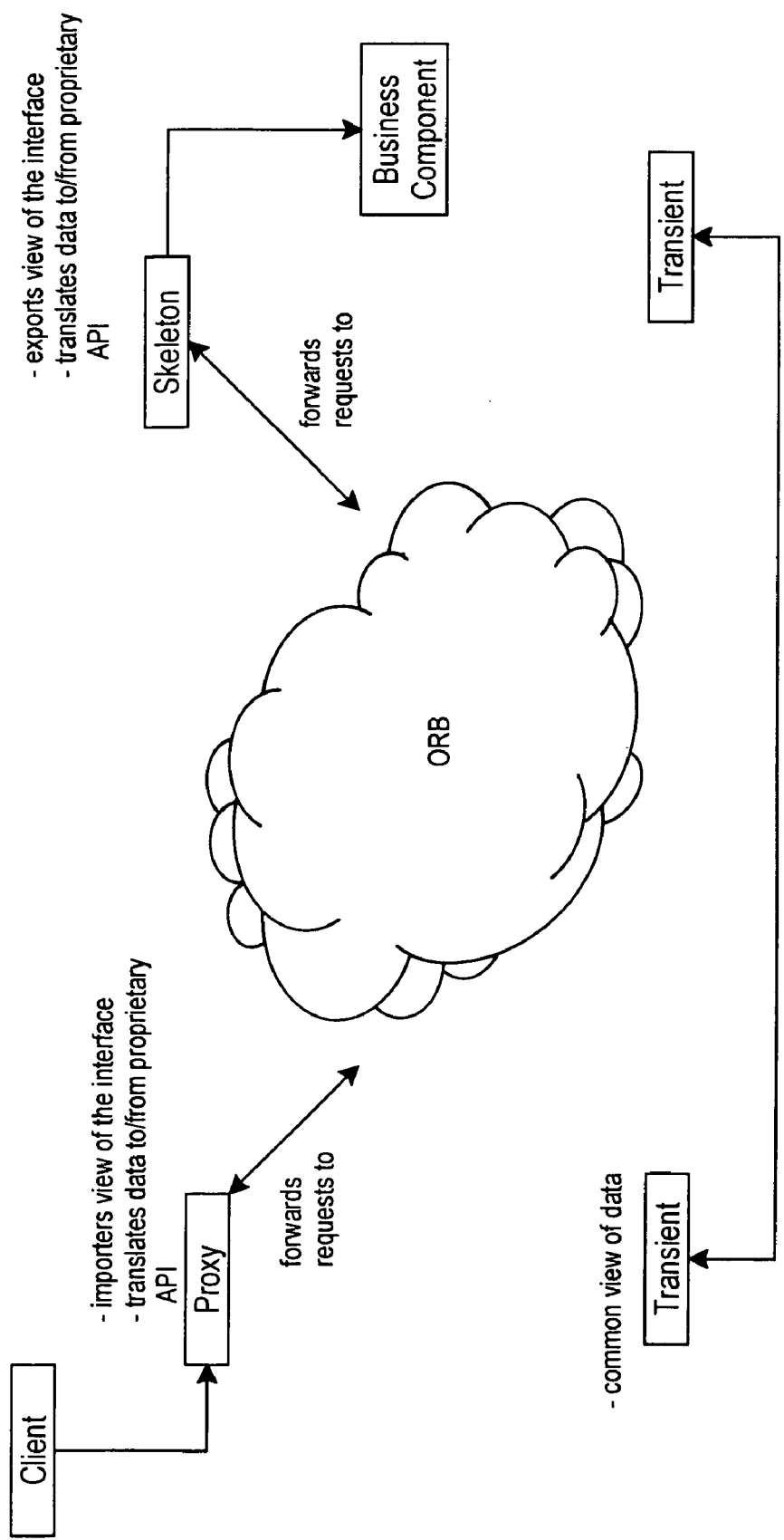

Communication services enable an application to transparently interact with other applications regardless of whether they reside on the same computer or on a remote computer. Once a component has been created and its services defined, a method must be established for customers to communicate with the component. The application architecture preferably implements a version of the "Proxy-Skeleton" pattern. This pattern defines two objects to act as the communication handlers between components. FIG. 82 illustrates component interaction overview. A Proxy is a version of the interface that exists in the client's space. This object has a method for each service on the interface that the component wishes to be public. A Skeleton is what a proxy communicates with. A Proxy sends a message across the ORB which is captured by a Skeleton. The Skeleton then forwards the message on to the component.

The system also provides customers the ability to upload files from their workstations. File upload services provide an alternative to entering information through a component's user interface. As previously described, component's user interfaces are implemented using applets. Since there are security restrictions imposed on downloaded applets by the browser, it is necessary to implement the Netscape Capabilities application program interfaces (APIs) to upload files. This requires the following: (1) all applets needing access to client files will be signed with a digital signature; (2) applets will utilize the Netscape Capabilities APIs to grant read privileges on the client hard drive; and (3) customers will be given a digital signing certificate and, using Netscape Security, file read permissions will be granted to the certificate.

To implement the first requirement, a VeriSign class 3 object signing digital id is preferably used. All applets that will be downloaded to client workstations are packaged in a ".jar" file and signed with this digital id. For the second requirement, Netscape Capabilities API's need to be installed on the web server to support object signing security. The SecurityManager class is used to grant file read permissions within applet code. For the last requirement, all customers are provided with a digital signature so that the identity of downloaded applets can be verified.

As previously described, the system's execution environment is implemented using an ORB. The ORB is the foundation for a distributed component solution. At its most basic level, an ORB is used to enable components to communicate with each other regardless of physical location, operating system, and programming language. ORB vendors implement these services using the Common Object Request Broker Architecture (CORBA) as defined by the Object Management Group (OMG). In a preferred embodiment, Inprise's Visibroker ORB product is used.

Assuming the system is implemented using the Java programming language, the application needs to work within Java's security standards. One of these security standards is that a customer can only establish and accept network connections from the host that served the applet. This is known as the Java Sandbox. In order to have successful customer—server communication in a distributed component environment within the Java Sandbox, the application architecture uses Visigenic's Gatekeeper product. The Gatekeeper acts as an initial point of connection for all requests. The Gatekeeper knows where to forward requests. Using the Gatekeeper, application components can be distributed without regard to Java Sandbox security restrictions. The Gatekeeper is enhanced with Inprise's SSL Pack. This enables the gatekeeper to encrypt communications between clients and the gatekeeper using the Secured Socket Layer protocol. By using the SSL Pack, all encryption logic is encapsulated and hidden away from the application architecture.

Environment Services

The environment services provide miscellaneous application and system level services that do not deal directly with managing the user-interface, communicating with other programs, or accessing data. These services are divided into operating system services, runtime services, system services, application services, component framework services, batch scheduling services, and report distribution services which need not be described herein.

The system requires a batch architecture as previously described that will support both manual and automated execution of batch processes. The system's batch architecture is preferably comprised of the following products/objects: "Maestro Batch Scheduler, a third party batch scheduler used for the automated kickoff of batch processes according to predefined timetables"; Batch Driver, a Java executable that acts as the interface between Maestro and the batch scheduler component. The driver connects to the batch scheduler component and calls an operation on the component to execute a batch job.

The environment services also includes Java's Virtual Machine (JVM) which translates Java bytecodes into machine language commands. At compile time, Java code is compiled from Java syntax into Java bytecode. Bytecode is a protocol that JVM's read at runtime. The JVM translates bytecode at runtime into machine specific commands. The system in this example uses DEC's JVM for the DEC application servers, Sun's JVM for Windows NT for the NT server, Sun's JVM for Solaris for the web servers, and Netscape's JVM for the customers.

Transaction Services

The transaction services provide the transaction integrity mechanism for the application. This allows all data activities within a single business event to be grouped as a single, logical unit of work. These transaction managers provide sharing of server processes across a large community of customers and can be more efficient than the DBMS. Key transaction services include: transaction monitor services, resource management services, transaction management services and transaction partitioning services. A transaction (or unit of work) is a collection of steps that accomplish a particular business function, such as creating a new customer or settling a market.

In terms of a procedural-based application, a single module or program would represent a single transaction. An object-based application is comprised of smaller, more cohesive modules (objects) than procedural-based applications. While this makes for better software characteristics, it makes the job of transaction management more difficult. A transaction management framework for an object-based application should be able to manage multiple transactions, each associated with one to many objects. Each transaction should manage the state of the objects in its domain whether they are new, persisted, changed, or deleted. Finally, the transaction management framework should isolate the functional developer from the technical details of the framework.

Business Logic

The business logic provides the expression of business rules and procedures (e.g., the steps and rules that govern how a sales order is fulfilled). As such, the business logic includes the control structure that specifies the flow for processing business events and user requests. There are many ways in which to organize business logic, including: rules based, object-oriented, component, structured programming, etc.

As is well known, object-oriented architectures, like traditional architectures, use layering to isolate different types of functionality. This simplifies the development environment by shielding complexity, enabling reuse, and sustaining greater consistency, i.e., separation of concern.

A common way to separate the concern of the application is to separate the user interface from the business logic. In this framework, a user interface object is used to capture user events, translate them into business messages, and trigger changes to the interface itself. Any business messages that the interface objects needs to send are directed towards its activity object. The activity object models a business unit of work. It exists on a client machine near the user interface objects, captures messages from interface and other activity objects, and either processes those messages or delegates the responsibility to the business components. This "separation of concern" allows the business logic (activity) to be separated from the presentation (user interface, file upload), which enables the reuse of business logic across multiple electronic access channels.

In the context of object-oriented programming and distributed object technology, a component is a reusable software building block that can interact with other components on the same computer or a distributed network of computers to form a complete application. A component encapsulates all of the data and behavior associated with a business entity or process. Its public attributes and behaviors are accessible to other components in the federated network. Components are much like large-grained objects. They share many of features of traditional objects, but on a larger scale. Objects are the basis of object-oriented technology.

The business objects (instances of classes) and components of the system encapsulate the business logic specific to a given implementation of the system; in this case, the rules and procedures of a particular electricity marketplace. A component or object effectively hides the details of the business logic and the underlying database structure from other components and objects. Components and objects "see" only the interfaces offered by other components or objects, not the objects that realize the component. As a result, the process flow and the business logic associated with a given business entity or process are completely encapsulated within the component, as is the data related to the business entity or process. There are many commercially available components on the market, commonly implemented using Microsoft's ActiveX or Java's Enterprise Java Bean technology.

The business components of the present invention share many common features. Each component is preferably implemented as object-oriented classes. In the context of object-oriented technology, classes encapsulate all of the data and behavior associated with finer-grained processes or entities within the business model. An instance of a class is called an object. For example, an instance of the customer class might be labeled as the "ABC Energy Traders Inc." object. Components are implemented by a collection of classes that have been coded and compiled into bytecode. This bytecode is interpreted at run time by a Java Virtual Machine™ (JVM) or some other just-in-time compiler and translated into instructions that can be interpreted by the processor running the JVM.

Those skilled in the art may also realize classes using another object-oriented programming language such as C++ or SmallTalk. Java has been selected as the preferred embodiment of this invention for example purposes only. Components can be further packaged in a single file that can be easily administered and distributed, such as a Java Archive (JAR, i.e., ".jar" file).

Business object instances in the system represent critical information relating to the operation of a competitive physical and financial marketplace. Given this high-risk environment, changes in the state of the system will need to be logged for auditing purposes. In addition to audit logging, certain operations will be required to be performed on the system as it existed in a given point in time. This will require some objects to be versioned in a way that they can be reconstructed as they once existed at a specified time. The versioning needs of business objects in the system can be broken into four separate categories: audit enabled, effectivity-enabled, versioned inputs, and versioned outputs. Audit enabled business objects will trigger an entry to an external audit log whenever their state changes. Effectivity-enabled business objects represent the state of some entity over a specified time interval. This time interval may be past, present, or future. These objects allow the system state to be programmed for future times. Versioned input business objects are those that will need to be recreated as they existed at a given point in time. These objects describe a system state that is used as an input to processes that are meant to perform on the system as it existed at some past time. This is different from effectively enabled objects in that objects that are versioned inputs represent different versions of entities that describe the same thing but are described with varying degrees of accuracy at any given point in time. Versioned output objects are those that need to be recreated as they existed in a given point in time and need to provide a basis for how they were created. These objects are created based on a system state that could have existed in the past.

The above specification, examples and data provide a complete description of the present invention. Since many embodiments of the invention can be made without departing from the spirit and scope of the invention, the invention resides in the claims hereinafter appended.

What is claimed is:

1. A method of facilitating, managing and coordinating operation of a competitive marketplace for an energy system comprising generating units using a communication network, the method comprising the steps of:
    (a) collecting for a predetermined time interval supply side bids for quantity and price of energy services from a plurality of energy services providers over the communication network and collecting demand side bids for quantity of energy services from a plurality of energy services consumers over the communication network;
    (b) receiving at least one real time condition comprising data related to at least one of the generating units for the predetermined time interval that is different from at least one quantity of the supply side bids or quantity of the demand side bids;
    (c) arranging, according to price, the supply side bids from the energy service providers that dispatched energy services for the predetermined interval based on the real time condition;
    (d) electronically calculating a clearing price for the dispatched energy services regardless of location in the energy system for the predetermined time interval, the calculating of the clearing price being performed after dispatching the energy services in order to account for the real time condition, wherein the clearing price is a price for a supply side bid arranged in step (c) at which quantities for supply side bids equals the energy services dispatched to the consumers, the clearing price being equal for the energy services dispatched to all consumers that received energy services; and
    (e) calculating settlement information based upon the clearing price calculated in step (d).

2. A method according to claim 1 further comprising step (f) of creating an invoice for each of the plurality of providers and consumers from the settlement information calculated in step (e) and forwarding the invoice for each providers and consumers to the provider's and consumer's work station over the Internet.

3. A method according to claim 1 wherein step (c) comprises stacking the supply side bids from the energy services providers that supplied energy services for the predetermined time interval from lowest price to highest; and
    wherein calculating the clearing price comprises matching demand for the energy services supplied with a bid in the stack.

4. The method of claim 1 further comprising step (f) of collecting contract information from at least one provider and consumer.

5. The method of claim 1 wherein step (e) comprises calculating accounts payable and accounts receivable.

6. The method of claim 1 wherein step (e) comprises steps (e)(i) of receiving meter information and (e)(ii) calculating accounts payable and receivable by multiplying the received meter reading data by the clearing price calculated in step (d).

7. The method of claim 1 wherein step (e) comprises step (e)(i) of confirming that data necessary to complete settlement for a trading interval is available.

8. The method of claim 4 further comprising step (g) of collecting hourly meter reading data and wherein step (f) of collecting contract information includes step (f)(ii) of overriding step (e) and calculating settlement information based upon contract price and meter reading data.

9. The method of claim 4 further comprising step (g) of sending a confirmation notice to the customer over the communication network that the contract collected in step (f) has been accepted.

10. The method of claim 1 further comprising step (f) of receiving trading interval meter reading data.

11. The method of claim 10 further comprising step (g) of receiving monthly meter reading data.

12. The method of claim 10 further comprising step (g) of validating each trading interval meter reading data.

13. The method of claim 10 further comprising step (g) of modifying trading interval meter reading data.

14. A method according to claim 1 wherein step (a) is implemented through a graphical user interface.

15. A method according to claim 1 wherein step (a) is implemented through a bulk file upload facility.

16. A method according to claim 1 further comprising step (f) of viewing bid information collected in step (a).

17. A method according to claim 1 further comprising step (f) of modifying bid information collected in step (a).

18. A method according to claim 1 further comprising step (f) of verifying that a price and energy level value exist for each trading interval within a scheduled dispatch period.

19. A method according to claim 1 further comprising step (a) of collecting AGC bid data per unit per scheduled dispatch period.

20. A method according to claim 1 further comprising step (f) of notifying a provider and consumer that the bid information collected in step (a) is accepted.

21. A method according to claim 4 wherein the contract information has pre-determined condition associated therewith and the dispatching of the energy services is performed only if the pre-determined condition associated with the contract is met.

22. The method of claim 1 further comprising a step (f) of providing a market information publishing component that supplies a variety of customer informational needs.

23. The method of claim 1 further comprising a step (f) of providing a database population component that reorganizes data from many different sources into a common repository designed to suit providers' and consumers' needs.

24. The method of claim 23 further comprising a step (g) of providing a report generation component that creates a report whenever a provider and consumer so requests wherein the report generation component takes data from the database population component.

25. A system for managing and coordinating the operation of a competitive energy marketplace, the system comprising:
a processor,
a memory,
wherein the memory stores a market operator;
a power system component that represents a network model of a physical power system comprising generating units for dispatching energy services;
a customer component that manages information about entities that have a business relationship with the market operator, wherein the power system component and customer component are operatively coupled to the market operator to receive data from the market operator;
a bid component that enables customers to submit bids for a predetermined period for energy services, wherein customers include energy services providers and energy services consumers;
a meter reading component that stores meter readings submitted by energy services consumers, wherein the bid component and meter reading component are operatively coupled to energy services consumers;
a settlement component that receives at least one real time condition comprising data related to at least one of the generating units for the predetermined time interval that are different from at least one of the submitted bids, the settlement component determines an equal energy services clearing price regardless of location in the power system during the predetermined time interval based on the bids from the providers and the consumers submitted for the predetermined period and based on the real time condition for the predetermined time interval, the determining of the equal energy services clearing price being performed after dispatching the energy services in order to account for the real time condition, and that financially settles all markets based upon meter readings, operational information, bids and clearing prices, wherein the settlement component is operatively coupled to the power system, customer, bid and meter reading components to receive data therefrom; and
a bill component operatively coupled to receive data from the customer and settlement components, wherein the bill component summarizes the financial activity for each customer to be used on an invoice for services provided and/or received; and
the processor executing the components.

26. The system of claim 25 wherein the bid component enables customers to submit bids via a graphical user interface.

27. The system of claim 25 wherein the bid component enables customers to submit bids via bulk file upload facility.

28. The system of claim 25 further comprising a contract component operatively coupled to the settlement component wherein the contract component enables customers to submit contracts for services.

29. The system of claim 28 wherein the contract component enables customers to submit contracts via a graphical user interface.

30. The system of claim 28 wherein the contract component enables customers to submit contracts via a bulk file upload facility.

31. The system of claim 28 further comprising a market information publishing component that receives data from the customer, settlement, bill, meter reading, contract bid and power system components.

32. The system of claim 31 wherein the market information publishing component includes a database population component and a report generation component.

33. A method of facilitating, managing and coordinating operation of a competitive marketplace for an energy system comprising generating units using a communication network, the method comprising the steps of:
(a) collecting for a predetermined time interval supply side bid information for quantity and price of energy services from a plurality of energy services providers and collecting demand side bid information for quantity of energy services from a plurality of energy services consumers;
(b) collecting contract information for energy services from at least one of the plurality of energy services providers and consumers;
(c) receiving at least one real time condition comprising data related to at least one of the generating units for the predetermined time interval that is different from at least one quantity of the supply side bid information or quantity of the demand side bid information;
(d) electronically scheduling operation of units that provide the energy services according to the bid and contract information collected in steps (a) and (b), according to the real time condition;
(e) deploying the operation of the units scheduled in step (d) in order to dispatch the energy services;
(f) electronically collecting meter reading information from the units scheduled in step (e); and
(g) electronically settling the market in accordance with the bid and contract information collected in steps (a) and (b), the real time condition, and meter reading information collected in step (f), wherein settling the market comprises calculating a clearing price for energy services regardless of location in the energy system for the predetermined time interval, the calculating of the clearing price being performed after dispatching the energy services in order to account for the real time condition, wherein the clearing price is a price for a supply side bid at which quantities for supply side bids equals the energy services deployed in step (e), the clearing price being equal for all energy services consumers that received energy services in step (e).

34. The method of claim 33 further comprising step (h) of billing the plurality of energy services consumers according to the settlement determined in step (g).

35. The method of claim 33 further comprising step (h) of providing the schedule determined in step (e) to the plurality of energy services providers and consumers.

36. The method of claim 33 further comprising step (h) of providing settlement information determined in step (g) to the plurality of energy services providers and consumers.

37. The method of claim 33 wherein steps (a), (b) and (f) are performed over the Internet.

38. A computer program embodied on a computer readable medium for interfacing with a competitive marketplace for an energy system comprising generating units, the computer program comprising:

computer executable code for collecting for a predetermined period supply side bids for quantity and price of energy services from a plurality of energy services providers over a communication network and collecting demand side bids for quantity of energy services from a plurality of energy services consumers over the communication network;

computer executable code for receiving at least one real time condition comprising data related to at least one of the generating units for the predetermined period that is different from at least one quantity of the supply side bids or quantity of the demand side bids;

computer executable code for scheduling operation of units that provide the energy services for the predetermined period;

computer executable code for dispatching the energy services;

computer executable code for calculating a clearing price for the energy services regardless of location in the energy system for the predetermined time interval, the calculating of the clearing price being performed after dispatching the energy services in order to account for the real time condition, wherein the clearing price is a price for a supply side bid at which quantities for supply side bids equals the energy services dispatched to the consumers in the predetermined period, the clearing price being equal for all consumers that received energy services for the predetermined period; and code for calculating settlement information based upon the clearing price calculated and: the bids collected.

39. An article of manufacture for facilitating operation of a competitive marketplace for an energy system comprising generating units, the article of manufacture comprising a computer readable medium having a management interface instructions comprising:

computer executable code for collecting supply side bids for a predetermined period for quantity and price of energy services from a plurality of energy services providers over a communication network and collecting demand side bids for quantity of energy services from a plurality of energy services consumers over the communication network;

computer executable code for receiving at least one real time condition comprising data related to at least one of the generating units for the predetermined period that is different from at least one quantity of the supply side bids or quantity of the demand side bids;

computer executable code for dispatching energy services for the predetermined period based on the real time condition;

computer executable code for arranging, according to price, the supply side bids from the energy services providers that supplied energy services in the predetermined period;

computer executable code for calculating a clearing price for the energy services regardless of location in the energy system for the predetermined time interval, the calculating of the clearing price being performed after dispatching the energy services in order to account for the real time condition, wherein the clearing price is a price for a supply side bid at which quantities for supply side bids equals the energy services dispatched to the consumers in the predetermined period, the clearing price being equal for all consumers; and computer executable code for calculating settlement information based upon the clearing price and the bids collected.

40. A method of facilitating, managing and coordinating operation of a competitive marketplace for an energy system comprising generating units using a communication network, the method comprising the steps of:

collecting for a predetermined time interval supply side bids for quantity and price of energy services from a plurality of energy services providers over the communication network and collecting demand side bids for quantity of energy services from a plurality of energy services consumers over the communication network;

receiving data related to at least one of the generating units for the predetermined time interval that is different from at least one quantity of the supply side bids;

arranging, according to price, the supply side bids from the energy service providers that dispatched energy services for the predetermined interval based on the data related to the at least one generating units;

electronically calculating a clearing price regardless of location in the energy system for the dispatched energy services for the predetermined time interval, the calculating of the clearing price being performed after dispatching the energy services in order to account for the data related to the at least one generating units, wherein the clearing price is a price for a supply side bid arranged for the predetermined period at which quantities for supply side bids equals the energy services dispatched to the consumers in the predetermined period; and calculating settlement information based upon the clearing price calculated.

41. A computer program embodied on a computer readable medium for interfacing with a competitive marketplace for an energy system comprising generating units, the computer program comprising:

computer executable code for collecting for a predetermined time interval supply side bids for quantity and price of energy services from a plurality of energy services providers over the communication network and collecting demand side bids for quantity of energy services from a plurality of energy services consumers over the communication network;

computer executable code for receiving data related to at least one of the generating units for the predetermined time interval that is different from at least one quantity of the supply side bids;

computer executable code for arranging, according to price, the supply side bids from the energy service providers that dispatched energy services for the predetermined interval based on the data related to the at least one generating units;

computer executable code for calculating a clearing price regardless of location in the energy system for the dispatched energy services for the predetermined time interval, the calculating of the clearing price being performed after dispatching the energy services, wherein the clearing price is a price for a supply side bid arranged for the predetermined period at which quantities for supply side bids equals the energy services dispatched to the consumers in the predetermined period; and computer executable code for calculating settlement information based upon the clearing price calculated.

* * * * *

UNITED STATES PATENT AND TRADEMARK OFFICE
CERTIFICATE OF CORRECTION

| | |
|---|---|
| PATENT NO. | : 7,085,739 B1 |
| APPLICATION NO. | : 09/421713 |
| DATED | : August 1, 2006 |
| INVENTOR(S) | : Larry A. Winter et al. |

It is certified that error appears in the above-identified patent and that said Letters Patent is hereby corrected as shown below:

In the Claims

Column 27, in claim 38, line 52, immediately after "price calculated and" delete ":" (colon).

Signed and Sealed this

Tenth Day of April, 2007

JON W. DUDAS
*Director of the United States Patent and Trademark Office*